United States Patent
Sugio et al.

(10) Patent No.: US 11,218,708 B2
(45) Date of Patent: Jan. 4, 2022

(54) PICTURE DECODING METHOD FOR DECODING USING A MERGING CANDIDATE SELECTED FROM A FIRST MERGING CANDIDATE DERIVED USING A FIRST DERIVATION PROCESS AND A SECOND MERGING CANDIDATE DERIVED USING A SECOND DERIVATION PROCESS

(71) Applicant: Panasonic Intellectual Property Corporation of America, Torrance, CA (US)

(72) Inventors: Toshiyasu Sugio, Osaka (JP); Takahiro Nishi, Nara (JP); Youji Shibahara, Osaka (JP); Kyoko Tanikawa, Osaka (JP); Hisao Sasai, Osaka (JP); Toru Matsunobu, Osaka (JP); Kengo Terada, Osaka (JP)

(73) Assignee: SUN PATENT TRUST, New York, NY (US)

( * ) Notice: Subject to any disclaimer, the term of this patent is extended or adjusted under 35 U.S.C. 154(b) by 968 days.

(21) Appl. No.: 13/652,643

(22) Filed: Oct. 16, 2012

(65) Prior Publication Data
US 2013/0101042 A1    Apr. 25, 2013

Related U.S. Application Data

(60) Provisional application No. 61/548,828, filed on Oct. 19, 2011.

(51) Int. Cl.
*H04N 19/192* (2014.01)
*H04N 19/105* (2014.01)
(Continued)

(52) U.S. Cl.
CPC ......... *H04N 19/192* (2014.11); *H04N 19/105* (2014.11); *H04N 19/149* (2014.11);
(Continued)

(58) Field of Classification Search
None
See application file for complete search history.

(56) References Cited

U.S. PATENT DOCUMENTS

| 5,905,535 A | 5/1999 | Kerdranvat |
| 5,995,080 A | 11/1999 | Biro et al. |

(Continued)

FOREIGN PATENT DOCUMENTS

| CN | 1525762 | 9/2004 |
| CN | 1537390 | 10/2004 |

(Continued)

OTHER PUBLICATIONS

"Advanced Video Coding for Generic Audiovisual Services," ITU-T Recommendation H.264, Mar. 2010.
(Continued)

*Primary Examiner* — Michael J Hess
(74) *Attorney, Agent, or Firm* — Wenderoth, Lind & Ponack, L.L.P.

(57) ABSTRACT

A picture coding method includes: performing a first derivation process for deriving a first merging candidate which includes a candidate set of a prediction direction, a motion vector, and a reference picture index for use in coding of a current block; performing a second derivation process for deriving a second merging candidate; selecting a merging candidate to be used in the coding of the current block from among the first and second merging candidates; and attaching an index for identifying the selected merging candidate to the bitstream; wherein the first derivation process is performed so that a total number of the first merging candidates does not exceed a predetermined number, and the second derivation process is performed when the total number of the first merging candidates is less than a predetermined maximum number of merging candidates.

6 Claims, 44 Drawing Sheets

(51) Int. Cl.
*H04N 19/176* (2014.01)
*H04N 19/149* (2014.01)
*H04N 19/52* (2014.01)
*H04N 19/46* (2014.01)

(52) U.S. Cl.
CPC .......... *H04N 19/176* (2014.11); *H04N 19/52* (2014.11); *H04N 19/46* (2014.11)

(56) References Cited

U.S. PATENT DOCUMENTS

| | | |
|---|---|---|
| 6,192,080 B1 | 2/2001 | Sun et al. |
| 6,424,676 B1 | 7/2002 | Kono et al. |
| 6,427,027 B1 | 7/2002 | Suzuki et al. |
| 6,594,313 B1 | 7/2003 | Hazra et al. |
| 6,795,499 B1 | 9/2004 | Kato et al. |
| 6,842,483 B1 | 1/2005 | Au et al. |
| 7,154,952 B2 | 12/2006 | Tourapis et al. |
| 7,266,147 B2 | 9/2007 | Deshpande |
| 7,301,482 B1 | 11/2007 | Oberg |
| 7,372,905 B2 | 5/2008 | Foo et al. |
| 7,394,851 B2 | 7/2008 | Kato et al. |
| 7,660,354 B2 | 2/2010 | Shi et al. |
| 7,664,180 B2 | 2/2010 | Kondo et al. |
| 7,680,186 B2 | 3/2010 | Lee et al. |
| 7,697,783 B2 | 4/2010 | Lee et al. |
| 7,702,168 B2 | 4/2010 | Thoreau et al. |
| 7,742,526 B2 | 6/2010 | Kondo et al. |
| 7,746,929 B2 | 6/2010 | Valente |
| 7,801,219 B2 | 9/2010 | Kondo et al. |
| 7,835,436 B2 | 11/2010 | Aridome et al. |
| 7,852,936 B2 | 12/2010 | Mukerjee et al. |
| 7,856,060 B2 | 12/2010 | Kondo et al. |
| 7,940,845 B2 | 5/2011 | Kondo et al. |
| 8,005,144 B2 | 8/2011 | Ji et al. |
| RE43,062 E | 1/2012 | Deshpande |
| 8,175,444 B2 | 5/2012 | Kang et al. |
| 8,180,201 B2 | 5/2012 | Kang et al. |
| 8,190,003 B2 | 5/2012 | Kang et al. |
| 8,208,541 B2 | 6/2012 | Iguchi et al. |
| 8,208,544 B2 | 6/2012 | Song et al. |
| 8,249,147 B2 | 8/2012 | Watanabe et al. |
| 8,275,235 B2 | 9/2012 | Kang et al. |
| 8,325,819 B2 | 12/2012 | Karczewicz |
| 8,355,438 B2 | 1/2013 | Shimizu et al. |
| 8,374,245 B2 | 2/2013 | Tourapis et al. |
| 8,379,722 B2 | 2/2013 | Tourapis et al. |
| 8,396,344 B2 | 3/2013 | Kang et al. |
| 8,538,248 B2 | 9/2013 | Kang et al. |
| 8,542,977 B2 | 9/2013 | Kang et al. |
| 8,565,314 B2 | 10/2013 | Karczewicz et al. |
| 8,599,926 B2 | 12/2013 | Karczewicz |
| 8,670,486 B2 | 3/2014 | Hannuksela |
| 8,675,735 B2 | 3/2014 | Shimizu et al. |
| 8,718,141 B2 | 5/2014 | Kondo et al. |
| 8,761,258 B2 | 6/2014 | Au et al. |
| 8,774,280 B2 | 7/2014 | Tourapis et al. |
| 8,873,630 B2 | 10/2014 | Tourapis et al. |
| 9,185,427 B2 | 11/2015 | Tourapis et al. |
| RE45,983 E | 4/2016 | Deshpande |
| 9,319,700 B2 | 4/2016 | Karczewicz |
| 2003/0202605 A1 | 10/2003 | Hazra et al. |
| 2004/0001546 A1 | 1/2004 | Tourapis et al. |
| 2004/0008786 A1 | 1/2004 | Boyce |
| 2004/0028134 A1 | 2/2004 | Subramaniyan et al. |
| 2004/0047418 A1 | 3/2004 | Tourapis et al. |
| 2004/0052507 A1 | 3/2004 | Kondo et al. |
| 2004/0086044 A1 | 5/2004 | Kondo et al. |
| 2004/0136461 A1 | 7/2004 | Kondo et al. |
| 2004/0146109 A1 | 7/2004 | Kondo et al. |
| 2004/0179620 A1 | 9/2004 | Foo et al. |
| 2004/0190606 A1 | 9/2004 | Deshpande |
| 2004/0223551 A1 | 11/2004 | Hannuksela |
| 2004/0234143 A1 | 11/2004 | Hagai et al. |
| 2004/0264566 A1 | 12/2004 | Kato et al. |
| 2005/0013497 A1 | 1/2005 | Hsu et al. |
| 2005/0025244 A1 | 2/2005 | Lee et al. |
| 2005/0062885 A1 | 3/2005 | Kadono et al. |
| 2005/0078683 A1 | 4/2005 | Page |
| 2005/0141612 A1 | 6/2005 | Abe et al. |
| 2005/0152452 A1 | 7/2005 | Suzuki |
| 2005/0152682 A1 | 7/2005 | Kang et al. |
| 2005/0185928 A1 | 8/2005 | Kang et al. |
| 2005/0213828 A1 | 9/2005 | Thoreau et al. |
| 2005/0243927 A1 | 11/2005 | Hubrich et al. |
| 2005/0243928 A1 | 11/2005 | Hubrich et al. |
| 2006/0023790 A1 | 2/2006 | Tsai et al. |
| 2006/0050778 A1 | 3/2006 | Aridome et al. |
| 2006/0088094 A1 | 4/2006 | Cieplinski et al. |
| 2006/0088286 A1 | 4/2006 | Shibata et al. |
| 2006/0182436 A1 | 8/2006 | Tabuchi et al. |
| 2006/0204228 A1 | 9/2006 | Kang et al. |
| 2006/0209963 A1 | 9/2006 | Valente |
| 2006/0215999 A1 | 9/2006 | Kang et al. |
| 2006/0216000 A1 | 9/2006 | Kang et al. |
| 2006/0233530 A1 | 10/2006 | Kang et al. |
| 2006/0239358 A1 | 10/2006 | Soh et al. |
| 2006/0269153 A1 | 11/2006 | Shi et al. |
| 2006/0280253 A1 | 12/2006 | Tourapis et al. |
| 2006/0291556 A1 | 12/2006 | Watanabe et al. |
| 2007/0000143 A1 | 1/2007 | Tourapis et al. |
| 2007/0014360 A1 | 1/2007 | Botzko et al. |
| 2007/0025621 A1 | 2/2007 | Lee et al. |
| 2007/0030899 A1 | 2/2007 | Iguchi et al. |
| 2007/0041452 A1 | 2/2007 | Kondo et al. |
| 2007/0110156 A1 | 5/2007 | Ji et al. |
| 2007/0154103 A1 | 7/2007 | Au et al. |
| 2007/0183499 A1 | 8/2007 | Kimata et al. |
| 2007/0200949 A1 | 8/2007 | Walker et al. |
| 2008/0063060 A1 | 3/2008 | Kondo et al. |
| 2008/0063061 A1 | 3/2008 | Kondo et al. |
| 2008/0063075 A1 | 3/2008 | Kondo et al. |
| 2008/0069231 A1 | 3/2008 | Kondo et al. |
| 2008/0069232 A1 | 3/2008 | Kondo et al. |
| 2008/0084927 A1 | 4/2008 | Rosenzweig et al. |
| 2008/0089420 A1 | 4/2008 | Karczewicz |
| 2008/0089422 A1 | 4/2008 | Karczewicz |
| 2008/0089423 A1 | 4/2008 | Karczewicz |
| 2008/0089424 A1 | 4/2008 | Karczewicz et al. |
| 2008/0117978 A1 | 5/2008 | Kapasi et al. |
| 2008/0175491 A1 | 7/2008 | Kondo |
| 2008/0219350 A1 | 9/2008 | Guo et al. |
| 2008/0240245 A1 | 10/2008 | Lee et al. |
| 2009/0074069 A1 | 3/2009 | Jeon |
| 2009/0147855 A1 | 6/2009 | Song et al. |
| 2009/0304084 A1 | 12/2009 | Hallapuro et al. |
| 2010/0086053 A1 | 4/2010 | Okada et al. |
| 2010/0118939 A1 | 5/2010 | Shimizu et al. |
| 2010/0124273 A1 | 5/2010 | Divorra Escoda et al. |
| 2010/0135387 A1 | 6/2010 | Divorra Escoda et al. |
| 2010/0177824 A1 | 7/2010 | Koo et al. |
| 2010/0284465 A1 | 11/2010 | Benzler et al. |
| 2011/0038420 A1 | 2/2011 | Lee et al. |
| 2011/0080954 A1 | 4/2011 | Bossen et al. |
| 2011/0090969 A1 | 4/2011 | Sung et al. |
| 2011/0113451 A1 | 5/2011 | Kang et al. |
| 2011/0176612 A1 | 7/2011 | Tsai et al. |
| 2011/0194608 A1 | 8/2011 | Rusert et al. |
| 2011/0194609 A1 | 8/2011 | Rusert et al. |
| 2011/0206123 A1 | 8/2011 | Panchal et al. |
| 2011/0261882 A1 | 10/2011 | Zheng et al. |
| 2011/0286527 A1 | 11/2011 | Kadono et al. |
| 2012/0008688 A1 | 1/2012 | Tsai et al. |
| 2012/0207221 A1 | 4/2012 | Aono et al. |
| 2012/0106645 A1 | 5/2012 | Lin et al. |
| 2012/0128060 A1 | 5/2012 | Lin et al. |
| 2012/0128072 A1 | 5/2012 | Kobayashi et al. |
| 2012/0134415 A1 | 5/2012 | Lin et al. |
| 2012/0195368 A1 | 8/2012 | Chien et al. |
| 2012/0230408 A1 | 9/2012 | Zhou |
| 2012/0243609 A1 | 9/2012 | Zheng et al. |
| 2012/0263235 A1 | 10/2012 | Sugio et al. |
| 2012/0300846 A1 | 11/2012 | Sugio et al. |
| 2012/0307902 A1 | 12/2012 | Sugio et al. |

(56) References Cited

U.S. PATENT DOCUMENTS

| | | | |
|---|---|---|---|
| 2012/0307903 A1 | 12/2012 | Sugio et al. | |
| 2012/0307905 A1 | 12/2012 | Kim et al. | |
| 2012/0307906 A1* | 12/2012 | Kim | H04N 19/176 375/240.16 |
| 2012/0320969 A1* | 12/2012 | Zheng et al. | 375/240.02 |
| 2012/0320984 A1 | 12/2012 | Zhou | |
| 2012/0328021 A1 | 12/2012 | Sugio et al. | |
| 2013/0010869 A1 | 1/2013 | Sugio et al. | |
| 2013/0023801 A1 | 1/2013 | Wang et al. | |
| 2013/0034161 A1 | 2/2013 | Sugio et al. | |
| 2013/0051469 A1* | 2/2013 | Park | H04N 19/159 375/240.14 |
| 2013/0101038 A1 | 4/2013 | Shimizu et al. | |
| 2013/0107959 A1 | 5/2013 | Park et al. | |
| 2013/0148737 A1 | 6/2013 | Tourapis et al. | |
| 2013/0208798 A1 | 8/2013 | Tourapis et al. | |
| 2014/0037003 A1 | 2/2014 | Kadono et al. | |
| 2014/0037009 A1 | 2/2014 | Kadono et al. | |
| 2014/0105302 A1 | 4/2014 | Takehara et al. | |
| 2014/0140408 A1 | 5/2014 | Lee et al. | |
| 2014/0146890 A1* | 5/2014 | Chiu | H04N 19/44 375/240.16 |
| 2014/0241434 A1* | 8/2014 | Lin et al. | 375/240.16 |
| 2014/0301472 A1 | 10/2014 | Kadono et al. | |
| 2015/0016527 A1 | 1/2015 | Tourapis et al. | |
| 2015/0288968 A1 | 10/2015 | Kadono et al. | |
| 2015/0312585 A1 | 10/2015 | Kadono et al. | |
| 2016/0088311 A1 | 3/2016 | Kadono et al. | |
| 2016/0094857 A1 | 3/2016 | Kadono et al. | |
| 2016/0094858 A1 | 3/2016 | Kadono et al. | |
| 2016/0134890 A1 | 5/2016 | Tourapis et al. | |
| 2016/0269741 A1 | 9/2016 | Kim et al. | |

FOREIGN PATENT DOCUMENTS

| | | |
|---|---|---|
| CN | 1578469 | 2/2005 |
| CN | 1833259 | 9/2006 |
| CN | 101090491 | 12/2007 |
| CN | 101198064 | 6/2008 |
| CN | 101379816 | 3/2009 |
| CN | 101600114 | 12/2009 |
| CN | 101860754 | 10/2010 |
| EP | 0 314 018 | 5/1989 |
| EP | 1 414 245 | 4/2004 |
| EP | 1 521 477 | 4/2005 |
| EP | 1 906 676 | 4/2008 |
| EP | 2 250 816 | 9/2009 |
| EP | 2 448 266 | 5/2012 |
| EP | 2 717 573 | 4/2014 |
| JP | 08-251601 | 9/1996 |
| JP | 10-224800 | 8/1998 |
| JP | 2002-152750 | 5/2002 |
| JP | 2002-534014 | 10/2002 |
| JP | 2005-136979 | 5/2005 |
| JP | 2005-318576 | 11/2005 |
| JP | 2006-519517 | 8/2006 |
| JP | 2007-028617 | 2/2007 |
| JP | 2007-142637 | 6/2007 |
| JP | 2008-211697 | 9/2008 |
| JP | 2008-283490 | 11/2008 |
| JP | 2009-124748 | 6/2009 |
| JP | 2010-529811 | 8/2010 |
| JP | 2013-517853 | 5/2013 |
| JP | 2014-514814 | 6/2014 |
| KR | 10-2007-0120416 | 12/2007 |
| KR | 10-2008-0088040 | 10/2008 |
| KR | 1020090058954 | 6/2009 |
| RU | 2 310 231 | 11/2007 |
| RU | 2 381 630 | 2/2010 |
| RU | 2 387 093 | 4/2010 |
| RU | 2009 114 363 | 10/2010 |
| RU | 2 419 244 | 5/2011 |
| TW | 545058 | 8/2003 |
| TW | 200604847 | 2/2006 |
| TW | I259726 | 8/2006 |
| TW | I264227 | 10/2006 |
| TW | 200742443 | 11/2007 |
| TW | I317107 | 11/2009 |
| TW | I325281 | 5/2010 |
| TW | I328357 | 8/2010 |
| TW | I329843 | 9/2010 |
| TW | I330976 | 9/2010 |
| TW | I331877 | 10/2010 |
| TW | I335183 | 12/2010 |
| WO | 2004/014060 | 2/2004 |
| WO | 2004/088988 | 10/2004 |
| WO | 2005/013201 | 2/2005 |
| WO | 2006/019093 | 2/2006 |
| WO | 2007/018626 | 2/2007 |
| WO | 2008/086197 | 7/2008 |
| WO | 2009/011501 | 1/2009 |
| WO | 2009/051419 | 4/2009 |
| WO | 2009/115901 | 9/2009 |
| WO | 2009/126260 | 10/2009 |
| WO | 2010/148919 | 12/2010 |
| WO | 2011/046008 | 4/2011 |
| WO | 2011/047994 | 4/2011 |
| WO | 2011/062392 | 5/2011 |
| WO | 2011/064673 | 6/2011 |
| WO | 2011/103482 | 8/2011 |
| WO | 2012/128903 | 9/2012 |
| WO | 2012/173415 | 12/2012 |
| WO | 2013/001803 | 1/2013 |

OTHER PUBLICATIONS

Thomas Wiegand et al., "WD3: Working Draft 3 of High-Efficiency Video Coding", Joint Collaborative Team on Video Coding (JCT-VC) of ITU-T SG16 WP3 and ISO/IEC JTC1/SC29/WG11, JCTVC-E603, 5th Meeting: Geneva, CH, Mar. 16-23, 2011.

International Search Report dated May 22, 2012 in International (PCT) Application No. PCT/JP2012/001351.

International Search Report dated Aug. 21, 2012 in International (PCT) Application No. PCT/JP2012/003316.

International Search Report dated Aug. 28, 2012 in International (PCT) Application No. PCT/JP2012/003386.

International Search Report dated Aug. 28, 2012 in International (PCT) Application No. PCT/JP2012/003416.

International Search Report dated Aug. 28, 2012 in International (PCT) Application No. PCT/JP2012/003496.

International Search Report dated Aug. 28, 2012 in International (PCT) Application No. PCT/JP2012/003493.

International Search Report dated Oct. 30, 2012 in International (PCT) Application No. PCT/JP2012/004924.

International Preliminary Report on Patentability dated Dec. 3, 2013 in International (PCT) Application No. PCT/JP2012/004924.

Extended European Search Report dated Feb. 4, 2014 in European Application No. 12771702.3.

International Preliminary Report on Patentability dated Feb. 18, 2014 in International (PCT) Application No. PCT/JP2012/006110.

Thomas Wiegand et al., "WD2: Working Draft 2 of High-Efficiency Video Coding", Joint Collaborative Team on Video Coding (JCT-VC) of ITU-T SG16 WP3 and ISO/IEC JTC1/SC29/WG11, JCTVC-D503, 4th Meeting: Daegu, KR, Jan. 20-28, 2011, pp. i-viii, 9, 10, and 85-94.

J. Jung et al., "Temporal MV predictor modification for MV-Comp, Skip, Direct and Merge schemes", Joint Collaborative Team on Video Coding (JCT-VC) of ITU-T SG16 WP3 and ISO/IEC JTC1/SC29/WG11, JCTVC-D164, 4th Meeting: Daegu, KR, Jan. 20-28, 2011, pp. 1-5.

Hideki Takehara et al., "Bi-derivative merge candidate", Joint Collaborative Team on Video Coding (JCT-VC) of ITU-T SG16 WP3 and ISO/IEC JTC1/SC29/WG11, JCTVC-F372, 6th Meeting: Torino, IT, Jul. 14-22, 2011, pp. 1-5.

Guillaume Laroche et al., "Robust solution for the AMVP parsing issue", Joint Collaborative Team on Video Coding (JCT-VC) of ITU-T SG16 WP3 and ISO/IEC JTC1/SC29/WG11, JCTVC-E219, 5th Meeting: Geneva, CH, Mar. 16-23, 2011.

(56) References Cited

OTHER PUBLICATIONS

Minhua Zhou et al., "A study on HM2.0 bitstream parsing and error resiliency issue", Joint Collaborative Team on Video Coding (JCT-VC) of ITU-T SG16 WP3 and ISO/IEC JTC1/SC29/WG11, JCTVC-E0118, 5th Meeting: Geneva, CH, Mar. 16-23, 2011.
J. Jung et al., "Proposition for robust parsing with temporal predictor", Joint Collaborative Team on Video Coding (JCT-VC) of ITU-T SG16 WP3 and ISO/IEC JTC1/SC29/WG11, JCTVC-D197, 4th Meeting: Daegu, KR, Jan. 20-28, 2011.
Bin Li et al., "On merge candidate construction", Joint Collaborative Team on Video Coding (JCT-VC) of ITU-T SG16 WP3 and ISO/IEC JTC1/SC29/WG11, JCTVC-E146, 5th Meeting: Geneva, CH, Mar. 16-23, 2011.
Jianle Chen et al., "MVP index parsing with fixed number of candidates", Joint Collaborative Team on Video Coding (JCT-VC) of ITU-T SG16 WP3 and ISO/IEC JTC1/SC29/WG11, JCTVC-F402, 6th Meeting: Torino, IT, Jul. 14-22, 2011.
Steffan Kamp et al., "Multihypothesis Prediction using Decoder Side Motion Vector Derivation in Inter Frame Video Coding", Visual Communications and Image Processing, Jan. 20-22, 2009, XP030081712.
Byeong-Moon Jeon, "New syntax for Bi-directional mode in MH pictures", Joint Video Team (JVT) of ISO/IEC MPEG & ITU-T VCEG (ISO/IEC JTC1/SC29/WG11 and ITU-T SG16 Q.6), JVT-C121, 3rd Meeting: Fairfax, VA, USA, May 6-10, 2002, XP030005233.
Yoshinori Suzuki et al., "Extension of uni-prediction simplification in B slices", Joint Collaborative Team on Video Coding (JCT-VC) of ITU-T SG16 WP3 and ISO/IEC JTC1/SC29/WG11, JCTVC-D421, 4th Meeting, Daegu, KR, Jan. 20-28, 2011, XP030047967.
Markus Flierl et al., "Generalized B Pictures and the Draft H.264/AVC Video Compression Standard", IEEE Transactions on Circuits and Systems for Video Technology, vol. 13, No. 7, Jul. 1, 2003, pp. 587-597, XP011099251.
Hideaki Kimata et al., "Spatial Temporal Adaptive Direct Prediction for Bi-Directional Prediction Coding on H.264", Picture Coding Symposium, Apr. 23-25, 2003, XP030080000.
Athanasios Leontaris et al., "Weighted Prediction Methods for Improved Motion Compensation", 2009 16th IEEE International Conference on Image Processing (ICIP), Nov. 7, 2009, pp. 1029-1032, XP031628457.
Benjamin Bross et al., "WD4: Working Draft 4 of High-Efficiency Video Coding", Joint Collaborative Team on Video Coding (JCT-VC) of ITU-T SG16 WP3 and ISO/IEC JTC1/SC29/WG11, JCTVC-F803_d4, 6th Meeting: Torino, IT, Jul. 14-22, 2011.
Toshiyasu Sugio, Takahiro Nishi, "Parsing Robustness for Merge/AMVP", Joint Collaborative Team on Video Coding (JCT-VC) of ITU-T SG16 WP3 and ISO/IEC JTC1/SC29/WG11 6th Meeting: Torino, IT, Jul. 14-22, 2011, [JCTVC-F470].
Minhua Zhou, Vivienne Sze, Yasutomo Matsuba, "A study on HM3.0 parsing throughput issue", Joint Collaborative Team on Video Coding (JCT-VC) of ITU-T SG16 WP3 and ISO/IEC JTC1/SC29/WG11 6th Meeting: Torino, IT, Jul. 14-22, 2011, [JCTVC-F068].
Thomas Wiegand et al., "WD3: Working Draft 3 of High-Efficiency Video Coding", Joint Collaborative Team on Video Coding (JCT-VC) of ITU-T SG16 WP3 and ISO/IEC JTC1/SC29/WG11, JCTVC-E603_d2, Ver. 2, 5th Meeting: Geneva, CH, Mar. 16-23, 2011.
Extended European Search Report dated Sep. 11, 2014 in European Application No. 12792164.1.
Extended European Search Report dated Oct. 1, 2014 in European Application No. 12789922.7.
Extended European Search Report dated Oct. 2, 2014 in European Application No. 12793588.0.
Extended European Search Report dated Nov. 12, 2014 in European Application No. 12819464.4.
Extended European Search Report dated Nov. 17, 2014 in European Application No. 12793037.8 (corrected version).
Thomas Wiegand et al., "WD1: Working Draft 1 of High-Efficiency Video Coding", Joint Collaborative Team on Video Coding (JCT-VC) of ITU-T SG16 WP3 and ISO/IEC JTC1/SC29/WG11, JCTVC-C403, 3$^{rd}$ Meeting: Guangzhou, CN, Oct. 7-15, 2010, XP030008032.
Thomas Wiegand et al., "WD2: Working Draft 2 of High-Efficiency Video Coding", JCT-VC Meeting, MPEG Meeting, Jan. 20-28, 2011, Daegu (Joint Collaborative Team on Video Coding of ISO/IEC JTC1/SC29/WG11 and ITU-T SG16), JCTVC-D503, Apr. 15, 2011, XP030113315, pp. 62-63.
Jaehyun Lim et al., "Extended merging scheme using motion-hypothesis inter prediction", Joint Collaborative Team on Video Coding (JCT-VC) of ITU-T SG16 WP3 and ISO/IEC JTC1/SC29/WG11, JCTVC-B023, 2$^{nd}$ Meeting: Geneva, CH, Jul. 21-28, 2010, XP030007603.
Jungyoup Yang et al., "Motion Vector Coding with Optimal Predictor", MPEG Meeting, Feb. 2-6, 2009, Lausanne, Switzerland (Motion Picture Expert Group or ISO/IEC JTC1/SC29/WG11, No. M16209, Jan. 29, 2009, XP030044806.
Toshiyasu Sugio et al., "Modified usage of predicted motion vectors in forward directional bi-predictive coding frame", Joint Collaborative Team on Video Coding (JCT-VC) of ITU-T SG16 WP3 and ISO/IEC JTC1/SC29/WG11, JCTVC-D274, 4$^{th}$ Meeting: Daegu, KR, Jan. 20-28, 2011, XP030008314.
Shijun Sun et al., "Predictive Motion Estimation with Global Motion Predictor", Visual Communications and Image Processing, Jan. 20, 2004, XP030081305.
B. Bross et al., "CE9: Motion Vector Coding Test Report by Fraunhofer HHI", Joint Collaborative Team on Video Coding (JCT-VC) of ITU-T SG16 WP3 and ISO/IEC JTC1/SC29/WG11, JCTVC-D314, 4$^{th}$ Meeting: Daegu, KR, Jan. 20-28, 2011, XP030008354.
Yi-Jen Chiu et al., "CE1 Subtest 1: A joint proposal of candidate-based decoder-side motion vector derivation", Joint Collaborative Team on Video Coding (JCT-VC) of ITU-T SG16 WP3 and ISO/IEC JTC1/SC29/WG11, JCTVC-D448, 4$^{th}$ Meeting: Daegu, KR, Jan. 20-28, 2011, XP030008487.
Edouard Francois et al., "Robust solution for the AMVP parsing issue", Joint Collaborative Team on Video Coding (JCT-VC) of ITU-T SG16 WP3 and ISO/IEC JTC1/SC29/WG11, JCTVC-E219, 5$^{th}$ Meeting: Geneva, CH, Mar. 16-23, 2011, XP030008725.
Toshiyasu Sugio et al., "Parsing Robustness for Merge/AMVP", Joint Collaborative Team on Video Coding (JCT-VC) of ITU-T SG16 WP3 and ISO/IEC JTC1/SC29/WG11, JCTVC-F470, 6$^{th}$ Meeting: Torino, IT, Jul. 14-22, 2011, XP030009493.
Jianle Chen et al., "MVP index parsing with fixed number of candidates", Joint Collaborative Team on Video Coding (JCT-VC) of ITU-T SG16 WP3 and ISO/IEC JTC1/SC29/WG11, JCTVC-F402, 6$^{th}$ Meeting: Torino, IT, Jul. 14-22, 2011, XP030009425.
Minhua Zhou et al., "A study on HM3.0 parsing throughput issue", Joint Collaborative Team on Video Coding (JCT-VC) of ITU-T SG16 WP3 and ISO/IEC JTC1/SC29/WG11, JCTVC-F068, 6$^{th}$ Meeting: Torino, IT, Jul. 14-22, 2011, XP030009091.
Bin Li et al., "An investigation on robust parsing", Joint Collaborative Team on Video Coding (JCT-VC) of ITU-T SG16 WP3 and ISO/IEC JTC1/SC29/WG11, JCTVC-E148, 5$^{th}$ Meeting: Geneva, CH, Mar. 16-23, 2011, XP030008654.
Office Action dated Jul. 11, 2016 in U.S. Appl. No. 15/140,949.
Office Action dated Jul. 29, 2016 in U.S. Appl. No. 14/725,180.
Search and Examination Report dated Sep. 26, 2016 in Singapore Application No. 2013078837.
Office Action dated Oct. 19, 2016 in U.S. Appl. No. 13/536,309.
Office Action dated Oct. 26, 2016 in U.S. Appl. No. 15/140,962.
Office Action and Search Report dated Nov. 4, 2016 in Chinese Patent Application No. 201280049393.4, with English translation of Search Report.
Yunfei Zheng et al., "Extended Motion Vector Prediction for Bi predictive Mode", Joint Collaborative Team on Video Coding (JCT-VC) of ITU-T SG16 WP3 and ISO/IEC JTC1/SC29/WG11, JCTVC-E343, WG11 No. m19871, 5th Meeting: Geneva, Mar. 16-23, 2011, pp. 1-4.
Toshiyasu Sugio et al., "Parsing Robustness for Merge/AMVP", Joint collaborative Team on Video Coding (JCT-VC) of ITU-T SG16 WP3 and ISO/IEC JTC1/SC29/WG11, JCTVC-F470_r4, WG11 No. m20900, 6th Meeting: Torino, IT, Jul. 14-22, 2011.
Extended European Search Report dated Jan. 5, 2016 in European Patent Application No. 12793067.5.
Laroche et al., "Competition Based Prediction for Skip Mode Motion Vector Using Macroblock Classification for the H.264 JM

(56) References Cited

OTHER PUBLICATIONS

KTA Software," Advanced Concepts for Intelligent Vision Systems, Lecture Notes in Computer Science, pp. 789-799, Springer Berlin Heidelberg, Aug. 28, 2007, XP19069087.
Extended European Search Report dated Apr. 15, 2016 in European Patent Application No. 12804429.4.
Jung et al., "Proposition for robust parsing with temporal predictor," Joint Collaborative Team on Video Coding (JCT-VC) of ITU-T SG16 WP3 and ISO/IEC JTC1/SC29/WG11, $4^{th}$ Meeting: Daegu, KR, Jan. 20-28, 2011, JCTVC-D197, WG11 No. m18957, XP30008237.
Su et al., "On motion vector composition," Joint Collaborative Team on Video Coding (JCT-VC) of ITU-T SG16 WP3 and ISO/IEC JTC1/SC29/WG11, $3^{th}$ Meeting: Guangzhou, CN, Oct. 7-15, 2010, JCTVC-C257, WG11 No. m18298, XP30007964.
Laroche et al., "RD Optimized Coding for Motion Vector Predictor Selection," IEEE Transactions on Circuits and Systems for Video Technology, vol. 18, No. 9, Sep. 2008.
Winken et al., "Description of video coding technology proposal by Fraunhofer HHI," Joint Collaborative Team on Video Coding (JCT-VC) of ITU-T SG16 WP3 and ISO/IEC JTC1/SC29/WG11, $1^{st}$ Meeting: Dresden, DE, Apr. 15-23, 2010 JCTVC-A116.
Sugio et al., "Parsing Robustness for Merge/AMVP," 97 MPEG Meeting, Jul. 18, 2011-Jul. 22, 2011, Torino, IT, (Motion Picture Expert Group or ISO/IEC JTC1/SC29/WG11), JCTVC-F470, Version 6, Jul. 22, 2011, XP002758863.
Extended European Search Report dated Jun. 27, 2016 in European Patent Application No. 12841970.2.
Li et al., "Constrained temporal motion vector prediction for error resilience," Joint Collaborative Team on Video Coding (JCT-VC) of ITU-T SG16 WP3 and ISO/IEC JTC1/SC29/WG11, $4^{th}$ Meeting: Daegu, KR, Jan. 20-28, 2011, JCT-VC-D139.
Lin et al., "Syntax for AMVP Parsing Error Control," Joint Collaborative Team on Video Coding (JCT-VC) of ITU-T SG16 WP3 and ISO/IEC JTC1/SC29/WG11, $4^{th}$ Meeting: Daegu, KR, Jan. 20-28, 2011, JCTVC-D126.
Office Action dated Jun. 27, 2017 in European Patent Application No. 12804429.4.
Benjamin Brass et al., "WD4: Working Draft 4 of High-Efficiency Video Coding", Joint Collaborative Team on Video Coding (JCT-VC) of ITU-T SG16 WP3 and ISO/IEC JTC1/SC29/WG11, 6th Meeting: Torino, IT, Jul. 14-22, 2011, JCTVC-F803_d6.
Office Action dated Jul. 26, 2017 in U.S. Appl. No. 15/140,949.
Toshiyasu Sugio et al., "Parsing Robustness for Merge/AMVP", Joint Collaborative Team on Video Coding (JCT-VC) of ITU-T SG16 WP3 and ISO/IEC JTC1/SC29/WG11, 6th Meeting: Torino, IT, Jul. 14-22, 2011, JCTVC-F470_r3.
Communication pursuant to Article 94(3) EPC dated Oct. 6, 2016 in European Patent Application No. 12 792 164.1.
Communication pursuant to Article 94(3) EPC dated Oct. 19, 2016 in European Patent Application No. 12 819 464.4.
Office Action dated Nov. 16, 2016 in U.S. Appl. No. 15/228,009.
Office Action dated Nov. 18, 2016 in U.S. Appl. No. 15/140,921.
Commumcation pursuant to Article 94(3) EPC dated Oct. 19, 2016 in European Patent Application No. 12 789 922.7.
Communication pursuant to Article 94(3) EPC dated Oct. 19, 2016 in European Patent Application No. 12 793 588.0.
Communication pursuant to Article 94(3) EPC dated Oct. 19, 2016 in European Patent Application No. 12 793 037.8.
Office Action dated Nov. 28, 2016 in U.S. Appl. No. 15/140,949.
Office Action dated Jan. 19, 2017 in U.S. Appl. No. 15/266,004.
Office Action dated Feb. 9, 2017 in U.S. Appl. No. 15/379,993.
Extended European Search Report dated Jan. 27, 2017 in European Patent Application No. 16193061.5.
Office Action dated Feb. 24, 2017 in U.S. Appl. No. 14/725,180.
Office Action dated Mar. 15, 2017 in U.S. Appl. No. 15/140,962.
Office Action dated May 5, 2017 in U.S. Appl. No. 15/434,094.
Office Action dated May 30, 2017 in U.S. Appl. No. 15/228,009.
Office Action dated Jun. 14, 2017 in U.S. Appl. No. 15/228,018.
Summons to attend oral proceedings pursuant to Rule 115(1) EPC issued May 24, 2017 in European Patent Application No. 12789922.7.
Communication pursuant to Article 94(3) EPC dated June 8, 2017 in European Patent Application No. 12 793 067.5.
Office Action dated Dec. 8, 2017 in Canadian Application No. 2,830,036.
Office Action dated Jan. 26, 2018 in U.S. Appl. No. 15/729,006.
Office Action dated Jan. 26, 2018 in U.S. Appl. No. 15/629,101.
Office Action dated Feb. 5, 2018 in U.S. Appl. No. 14/725,180
Office Action dated Feb. 8, 2018 in Canadian Application No. 2,834,191.
Office Action dated Feb. 14, 2018 in European Application No. 12793588.0.
Office Action dated Feb. 14, 2018 in European Application No. 12793037.8.
Office Action dated Feb. 20, 2018 in Canadian Application No. 2,834,123.
Office Action dated Feb. 20, 2018 in Canadian Application No. 2,834,125.
Office Action dated Feb. 20, 2018 in Canadian Application No. 2,834,190.
Office Action dated Mar. 16, 2018 in Canadian Application No. 2,836,063.
Summons to attend oral proceedings pursuant to Rule 115(1) EPC issued Mar. 5, 2018 in European Application No. 12819464.4.
Office Action dated Apr. 17, 2018 in U.S. Appl. No. 15/228,009.
Office Action dated May 7, 2018 in U.S. Appl. No. 15/602,631.
Office Action dated Apr. 30, 2018 in Canadian Application No. 2,843,560.
Office Action dated May 18, 2018 in U.S. Appl. No. 15/729,006.
Office Action dated May 18, 2018 in U.S. Appl. No. 15/629,101.
Yoshinori Suzuki et al., "Extension of uni-prediction simplification in B slices", Joint Collaborative Team on Video Coding (JCT-VC) of ITU-T SG16 WP3 and ISO/IEC JTC1/SC29/WG11 4th Meeting: Daegu, Korea, Jan. 20-28, 2011 Document: JCTVC-D421 WG11 No. m19400.
Office Action dated Jun. 15, 2018 in U.S. Appl. No. 14/725,180.
Office Action dated Jun. 20, 2018 in Canadian Application No. 2,850,595.
Office Action dated Aug. 15, 2017 in U.S. Appl. No. 14/725,180.
Office Action dated Aug. 30, 2017 in Malaysian Patent Application No. PI 2013702134.
Office Action dated Nov. 22, 2017 in U.S. Appl. No. 15/140,949.
Office Action dated Nov. 22, 2017 in U.S. Appl. No. 15/602,631.
Office Action dated Aug. 9, 2018 in U.S. Appl. No. 15/228,009.
Office Action dated Oct. 12, 2018 in U.S. Appl. No. 15/729,006.
Office Action issued for Indian Patent Application No. 8519/CHENP/2013 dated Oct. 25, 2018.
Office Action issued for Canadian Patent Application No. 2,834,123 dated Oct. 16, 2018.
Decision to refuse dated Oct. 26, 2018 in European Patent Application No. 12819464.4.
Benjamin Brass et al., "WD4: Working Draft 4 of High-Efficiency Video Coding", Joint Collaborative Team on Video Coding (JCT-VC) of ITU-T SG16 WP3 and ISO/IEC JTC1/SC29/WG11, JCTVC-F803_d1, 6th Meeting: Torino, IT, Jul. 14-22, 2011.
Office Action dated Nov. 29, 2018 in Indian Patent Application No. 8520/CHENP/2013.
Office Action dated Dec. 24, 2018 in Indian Patent Application No. 729/CHENP/2014.
Office Action dated Jan. 30, 2019 in U.S. Appl. No. 15/729,006.
Office Action dated Jan. 23, 2019 in U.S. Appl. No. 14/725,180.
Benjamin Bross et al., "WD4: Working Draft 4 of High-Efficiency Video Coding", Joint Collaborative Team on Video Coding (JCT-VC) of ITU-T SG16 WP3 and ISO/IEC JTC1/SC29/WG11, JCTVC-F803_d2, Ver.4, 6th Meeting: Torino, IT, Jul. 14-22, 2011.
Office Action dated Aug. 18, 2021 in U.S. Appl. No. 16/516,689.
Office Action dated Sep. 2, 2021 in Canadian Patent Application No. 3062382.
Office Action dated Sep. 29, 2021 in European Patent Application No. 19208547.0.

(56) References Cited

OTHER PUBLICATIONS

Extended European Search Report issued for European patent Application No. 21176324.8 dated Oct. 28, 2021.
Jung J et al.: "Description of Core Experiment CE13: Motion data parsing robustness and throughput", 97.MPEG Meeting; Jul. 18, 2011- Jul. 22, 2011; Torino; No. m21437, Jul. 22, 2011, XP03005000.

* cited by examiner

FIG. 5

Size of merging candidate list = 2

| Merging candidate index | Assigned bit sequence |
|---|---|
| 0 | 0 |
| 1 | 1 |

Size of merging candidate list = 3

| Merging candidate index | Assigned bit sequence |
|---|---|
| 0 | 0 |
| 1 | 10 |
| 2 | 11 |

Size of merging candidate list = 4

| Merging candidate index | Assigned bit sequence |
|---|---|
| 0 | 0 |
| 1 | 10 |
| 2 | 110 |
| 3 | 111 |

Size of merging candidate list = 5

| Merging candidate index | Assigned bit sequence |
|---|---|
| 0 | 0 |
| 1 | 10 |
| 2 | 110 |
| 3 | 1110 |
| 4 | 1111 |

FIG. 11

| Merging candidate index | Merging candidate |
|---|---|
| 0 | Spatial merging candidate (Bi-predictive, (MvL0_ A, RefL0_ A), (MvL1_ A, RefL1_ A)) |
| 1 | Temporal merging candidate (Bi-predictive, (MvL0_Col, RefL0_Col), (MvL1_Col, RefL1_Col)) |
| 2 | Combined merging candidate (Bi-predictive, (MvL0_A, RefL0_A), (MvL1_Col, RefL1_Col)) |
| 3 | Combined merging candidate (Bi-predictive, (MvL0_Col, RefL0_Col), (MvL1_A, RefL1_A)) |
| 4 | Zero merge (Bi-predictive, ((0, 0), 0), ((0, 0), 0)) |

FIG. 30

| |
|---|
| Video stream (PID=0x1011, Primary video) |
| Audio stream (PID=0x1100) |
| Audio stream (PID=0x1101) |
| Presentation graphics stream (PID=0x1200) |
| Presentation graphics stream (PID=0x1201) |
| Interactive graphics stream (PID=0x1400) |
| Video stream (PID=0x1B00, Secondary video) |
| Video stream (PID=0x1B01, Secondary video) |

FIG. 33
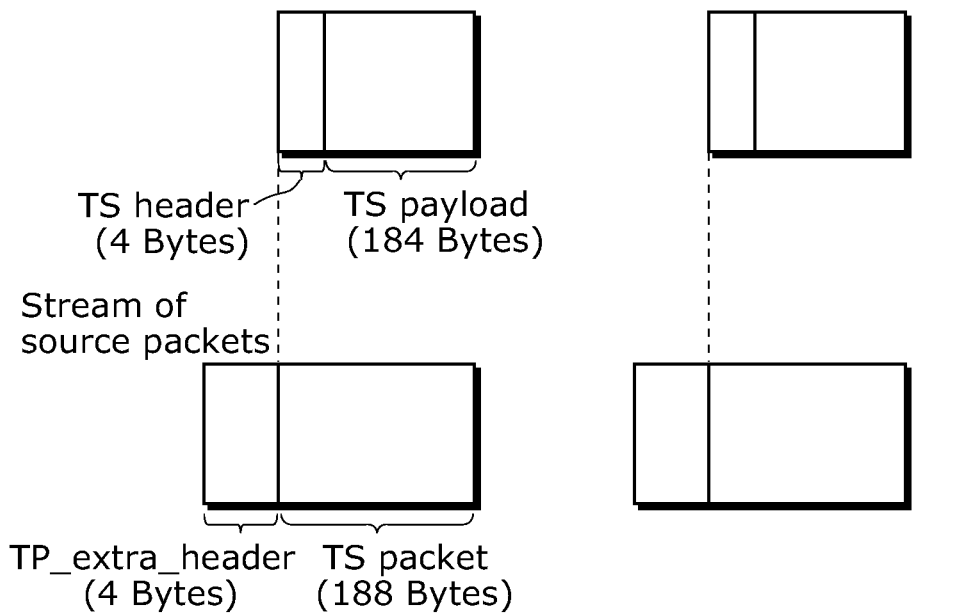
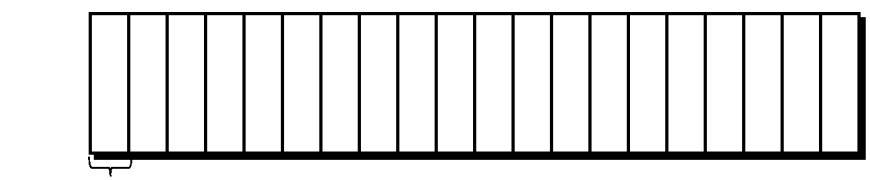

Data structure of PMT

FIG. 41

| Corresponding standard | Driving frequency |
|---|---|
| MPEG-4 AVC | 500 MHz |
| MPEG-2 | 350 MHz |
| ⋮ | ⋮ |

PICTURE DECODING METHOD FOR DECODING USING A MERGING CANDIDATE SELECTED FROM A FIRST MERGING CANDIDATE DERIVED USING A FIRST DERIVATION PROCESS AND A SECOND MERGING CANDIDATE DERIVED USING A SECOND DERIVATION PROCESS

CROSS REFERENCE TO RELATED APPLICATION

The present application claims the benefit of U.S. Provisional Patent Application No. 61/548,828 filed on Oct. 19, 2011. The entire disclosure of the above-identified application, including the specification, drawings and claims is incorporated herein by reference in its entirety.

FIELD

One or more exemplary embodiments disclosed herein relate to a picture coding method and a picture decoding method.

BACKGROUND

Generally, in coding processing of a moving picture, the amount of information is reduced by compression for which temporal redundancy and spatial redundancy in a moving picture is utilized. Generally, transform into frequency domain is performed as a method in which spatial redundancy is utilized, and coding using prediction between pictures (the prediction is hereinafter referred to as inter prediction) is performed as a method of compression for which temporal redundancy is utilized. In the inter prediction coding, a current picture is coded using, as a reference picture, a coded picture which precedes or follows the current picture in order of display time. A motion vector is derived by estimating motion between the current picture and the reference picture. Then, difference between picture data of the current picture and prediction picture data obtained by motion compensation based on the derived motion vector is calculated to reduce temporal redundancy (see Non-patent Literature 1, for example). In the motion estimation, difference values between current blocks in the current picture and blocks in the reference picture are calculated, and a block having the smallest difference value in the reference picture is determined as a reference block. Then, a motion vector is estimated for the current block and the reference block.

CITATION LIST

Non Patent Literature

[Non-patent Literature 1] ITU-T Recommendation H.264 "Advanced video coding for generic audiovisual services", March 2010

[Non-patent Literature 2] JCT-VC, "WD3: Working Draft 3 of High-Efficiency Video Coding", JCTVC-E603, March 2011

SUMMARY

Technical Problem

It is still desirable to increase coding efficiency in coding and decoding of pictures using inter prediction with the above-described conventional technique.

Non-limiting and exemplary embodiments provide picture coding methods and picture decoding methods with which coding efficiency in coding and decoding of pictures using inter prediction is increased.

Solution to Problem

In one general aspect, the techniques disclosed here feature a picture coding method which is a method for coding a picture on a block-by-block basis to generate a bitstream and includes: performing a first derivation process for deriving a first merging candidate which includes a candidate set of a prediction direction, a motion vector, and a reference picture index for use in coding of a current block; performing a second derivation process for deriving a second merging candidate which includes a candidate set of a prediction direction, a motion vector, and a reference picture index for use in the coding of the current block, the second derivation process being different from the first derivation process; selecting a merging candidate to be used in the coding of the current block from among the first merging candidate and the second merging candidate; and attaching an index for identifying the selected merging candidate to the bitstream, wherein in the performing of a first derivation process, the first derivation process is performed so that a total number of the first merging candidates does not exceed a predetermined number, and the second derivation process is performed when the total number of the first merging candidates is less than a predetermined maximum number of merging candidates.

These general and specific aspects can be implemented as a system, a method, an integrated circuit, a computer program, a computer-readable recording medium such as a CD-ROM (compact disc read-only memory), or as any combination of a system, a method, an integrated circuit, a computer program, and a computer-readable recording medium.

Additional benefits and advantages of the disclosed embodiments will be apparent from the Specification and Drawings. The benefits and/or advantages may be individually obtained by the various embodiments and features of the Specification and Drawings, which need not all be provided in order to obtain one or more of such benefits and/or advantages.

Advantageous Effects

A picture coding method according to one or more exemplary embodiments or features disclosed herein provide increased coding efficiency in coding and decoding of pictures using inter prediction.

BRIEF DESCRIPTION OF DRAWINGS

These and other advantages and features will become apparent from the following description thereof taken in conjunction with the accompanying Drawings, by way of non-limiting examples of embodiments disclosed herein.

FIG. 5 shows a relationship between the size of a merging candidate list and bit sequences assigned to merging candidate indices.

FIG. 11 shows an example of a merging candidate list generated by the picture coding apparatus according to Embodiment 1.

FIG. 30 illustrates a structure of multiplexed data.

FIG. 33 shows a structure of TS packets and source packets in the multiplexed data.

FIG. 41 shows an example of a look-up table in which video data standards are associated with driving frequencies.

DESCRIPTION OF EMBODIMENTS

Underlying Knowledge Forming Basis of the Present Disclosure

In a moving picture coding scheme already standardized, which is referred to as H.264, the amount of information is reduced by compression using three types of pictures: I-picture, P-picture, and B-picture.

The I picture is not coded using inter prediction. Specifically, the I-picture is coded by prediction within the picture (the prediction is hereinafter referred to as intra prediction). The P-picture is coded using inter prediction with reference to one previously coded picture preceding or following the current picture in order of display time. The B-picture is coded using inter prediction with reference to two previously coded pictures preceding and following the current picture in order of display time.

In coding using inter prediction, a reference picture list for identifying a reference picture is generated. In the reference picture list, reference picture indices are assigned to coded reference pictures to be referenced in inter prediction. For example, two reference picture lists (L0 and L1) are generated for a B-picture because it is coded with reference to two pictures.

Figure 1:
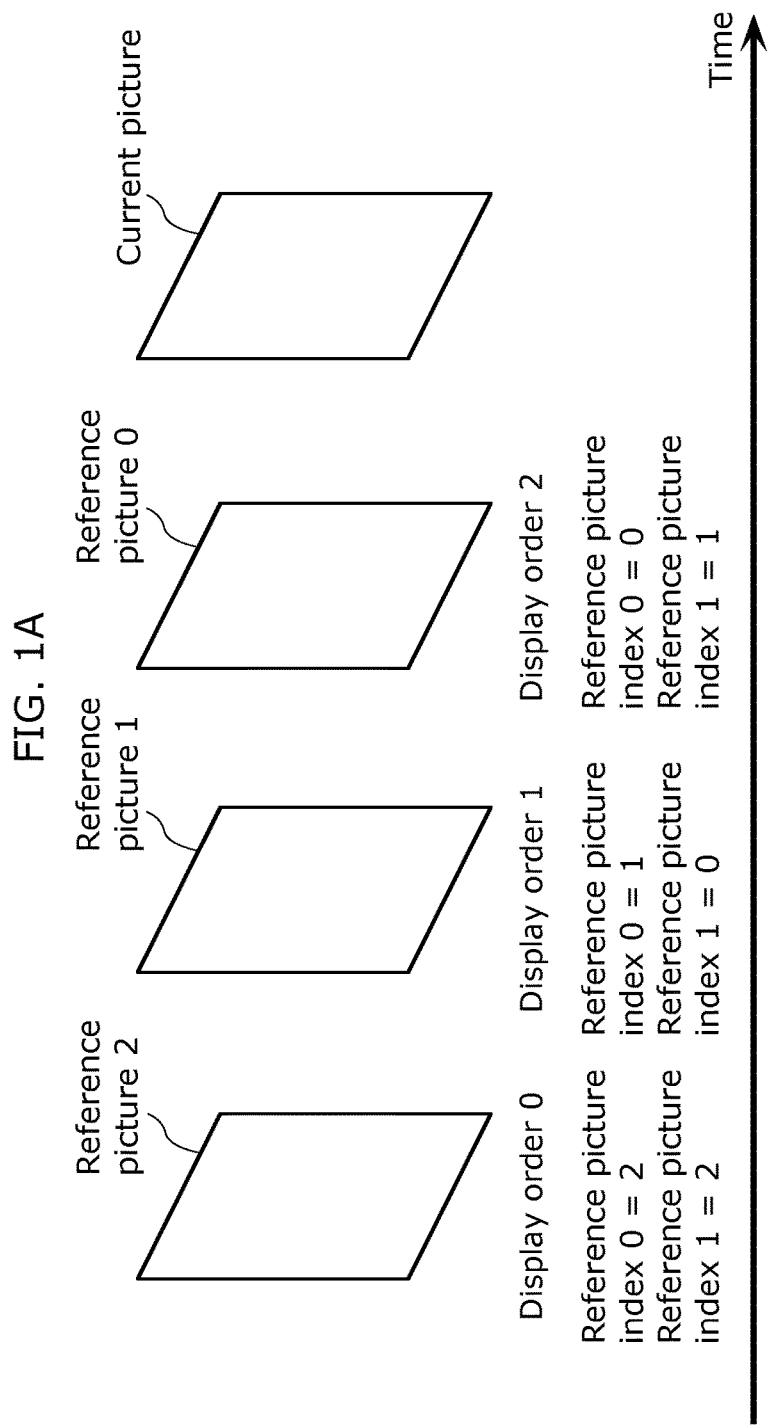
FIG. 1A is a diagram for illustrating an exemplary reference picture list for a B-picture.
FIG. 1B shows an example of a reference picture list 0 (L0) for a prediction direction 0 in bi-prediction of a B-picture.
FIG. 1C shows an example of a reference picture list 1 (L1) for a prediction direction 1 in bi-prediction of a B-picture.

FIG. 1A is a diagram for illustrating an exemplary reference picture list for a B-picture. FIG. 1B shows an example of a reference picture list 0 (L0) for a prediction direction 0 in bi-prediction. In the reference picture list 0, the reference picture index 0 having a value of 0 is assigned to a reference picture 0 with a display order of 2. The reference picture index 0 having a value of 1 is assigned to a reference picture 1 with a display order of 1. The reference picture index 0 having a value of 2 is assigned to a reference picture 2 with a display order of 0. In other words, a reference picture temporally closer to the current picture in display order is assigned with a reference picture index having a smaller value.

FIG. 1C shows an example of a reference picture list 1 (L1) for a prediction direction 1 in bi-prediction. In the reference picture list 1, the reference picture index 1 having a value of 0 is assigned to a reference picture 1 with a display order of 1. The reference picture index 1 having a value of 1 is assigned to a reference picture 0 with a display order of 2. The reference picture index 1 having a value of 2 is assigned to a reference picture 2 with a display order of 0.

In this manner, reference picture indices assigned to a reference picture may have values different between prediction directions (the reference pictures 0 and 1 in FIG. 1A), and may have the same value for both directions (the reference picture 2 in FIG. 1A).

In a moving picture coding method referred to as H.264 (see Non-patent Literature 1), a motion vector estimation mode is available as a coding mode for inter prediction of each current block in a B-picture. In the motion vector estimation mode, a difference value between picture data of a current block and prediction picture data and a motion vector used for generating the prediction picture data are coded. In addition, in the motion vector estimation mode, bi-prediction and uni-prediction can be selectively performed. In bi-prediction, a prediction picture is generated with reference to two coded pictures one of which precedes a current picture to be coded and the other of which follows the current picture. In uni-prediction, a prediction picture is generated with reference to one coded picture preceding or following a current picture to be coded.

Furthermore, in the moving picture coding method referred to as H.264, a coding mode referred to as a temporal motion vector prediction mode can be selected for derivation of a motion vector in coding of a B-picture. The inter prediction coding method performed in temporal motion vector prediction mode will be described below using FIG. 2.

Figure 2:
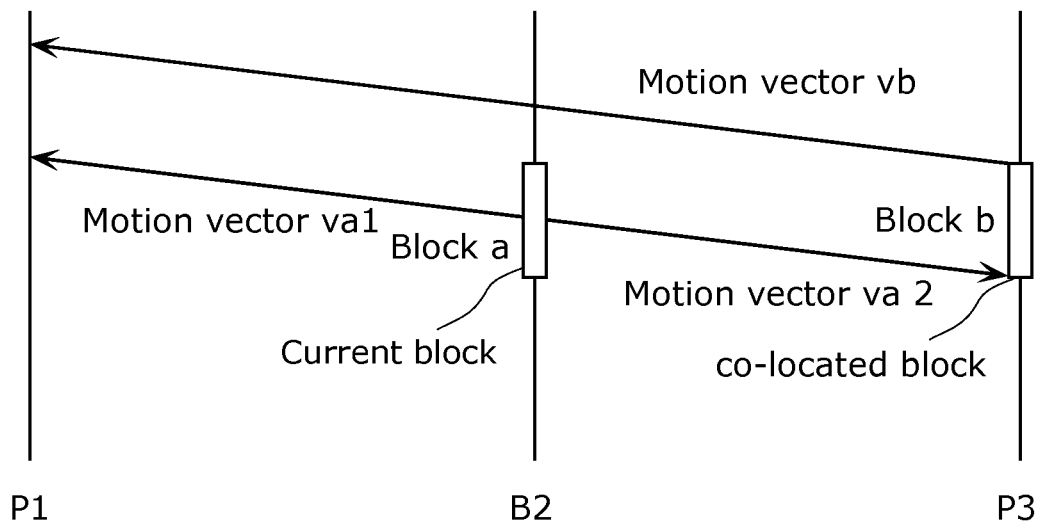
FIG. 2 is a diagram for illustrating motion vectors for use in a temporal motion vector prediction mode.

FIG. 2 is a diagram for illustrating motion vectors for use in the temporal motion vector prediction mode. Specifically, FIG. 2 shows a case where a block a in a picture B2 is coded in temporal motion vector prediction mode.

In the coding, a motion vector vb is used which has been used for coding of a block b in a picture P3, which is a reference picture following the picture B2. The position of the motion vector vb in the picture P3 is the same as the position of the block a in the picture B2 (the block b is hereinafter referred to as a "co-located block" of the block a). The motion vector vb has been used for coding the block b with reference to the picture P1.

Motion vectors parallel to the motion vector vb are used for obtaining two reference blocks for the block a from a preceding reference picture and a following reference picture, that is, a picture P1 and a picture P3. Then, the block a is coded using bi-prediction based on the two obtained reference blocks. Specifically, the block a is coded with reference the picture P1 using a motion vector va1 and with reference to the picture P3 using a motion vector vat.

In addition, a merging mode has been discussed which is an inter prediction mode for coding of each current block in a B-picture or a P-picture (see Non-patent Literature 2). In the merging mode, a current block is coded using a set of a prediction direction, a motion vector, and a reference picture index which is a copy of a set thereof used for coding a neighboring block of the current block. In the coding of a current block, an index and others indicating the set of a prediction direction, a motion vector, and a reference picture index which is used as a set for the coding of the neighboring block is attached to a bitstream. This makes it possible to select, in decoding of the current block, the set of a prediction direction, a motion vector, and a reference picture index used as a set for the coding of the neighboring block. A concrete example is given below with reference to FIG. 3.

Figure 3:
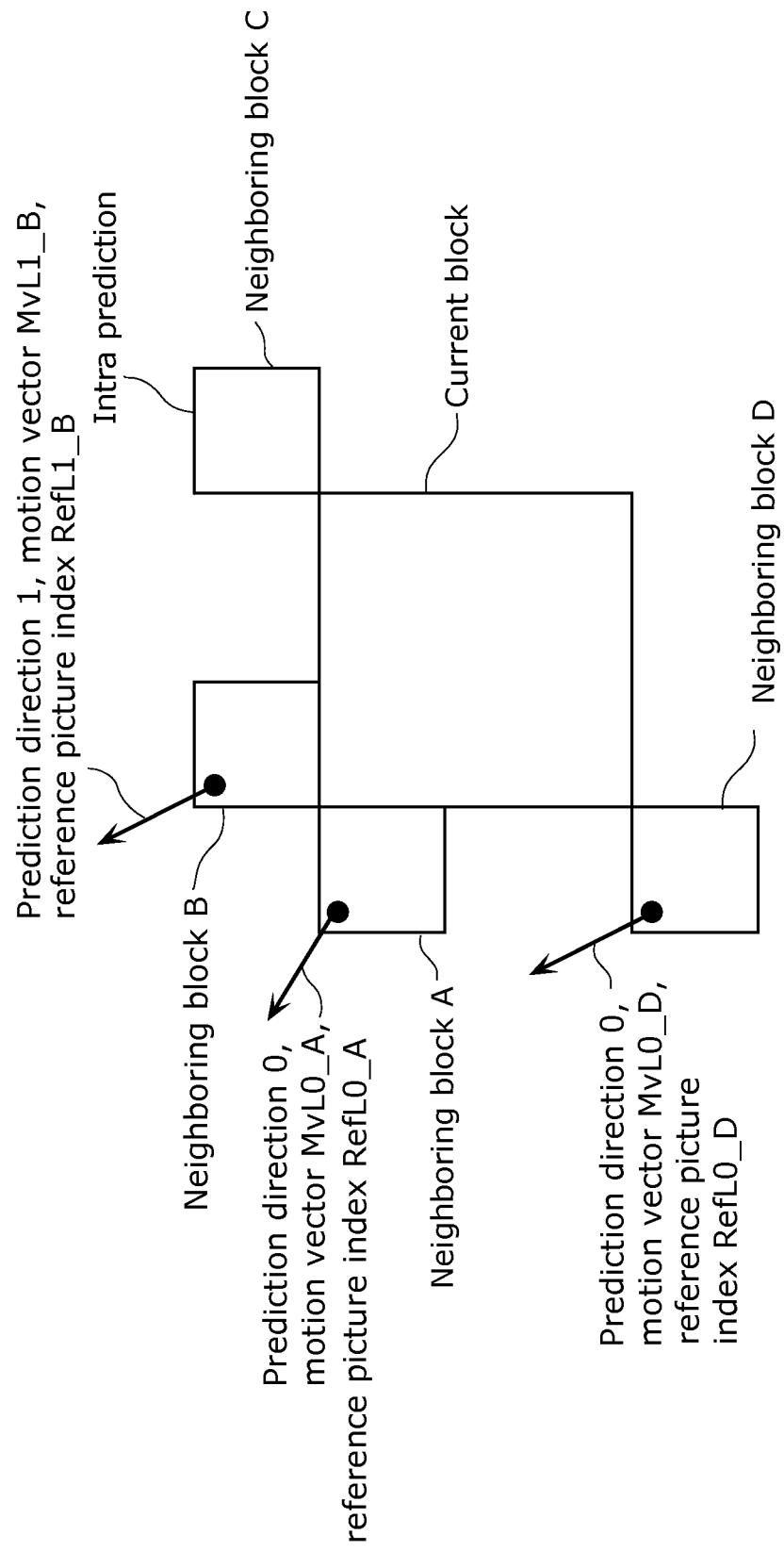
FIG. 3 shows an exemplary motion vector of a neighboring block used in the merging mode.

FIG. 3 shows an exemplary motion vector of a neighboring block used in the merging mode. In FIG. 3, a neighboring block A is a coded block located on the immediate left of a current block. A neighboring block B is a coded block located immediately above the current block. A neighboring block C is a coded block located immediately above to the right of the current block. A neighboring block D is a coded block located immediately below to the left of the current block.

The neighboring block A is a block coded using uni-prediction in the prediction direction 0. The neighboring block A has a motion vector MvL0_A having the prediction direction 0, which is a motion vector to a reference picture indicated by a reference picture index RefL0_A for the prediction direction 0. Here, MvL0 represents a motion vector which references a reference picture specified in a reference picture list 0 (L0). MvL1 represents a motion vector which references a reference picture specified in a reference picture list 1 (L1).

The neighboring block B is a block coded using uni-prediction in the prediction direction 1. The neighboring block B has a motion vector MvL1_B having the prediction direction 1, which is a motion vector to a reference picture indicated by a reference picture index RefL1_B for the prediction direction 1.

The neighboring block C is a block coded using intra prediction.

The neighboring block D is a block coded using uni-prediction in the prediction direction 0. The neighboring block D has a motion vector MvL0_D having the prediction direction 0, which is a motion vector to a reference picture indicated by a reference picture index RefL0_D for the prediction direction 0.

In the case illustrated in FIG. 3, for example, a set of a prediction direction, a motion vector, and a reference picture index with which the current block can be coded with the highest coding efficiency is selected as a set of a prediction direction, a motion vector, and a reference picture index of the current block from among such sets of the neighboring blocks A to D and a set of a prediction direction, a motion vector, and a reference picture index which are calculated using a co-located block in temporal motion vector prediction mode. One or more candidate sets of a prediction direction, a motion vector, and a reference picture index compose a merging candidate. A merging candidate index indicating the selected merging candidate is attached to a bitstream.

Figure 4:
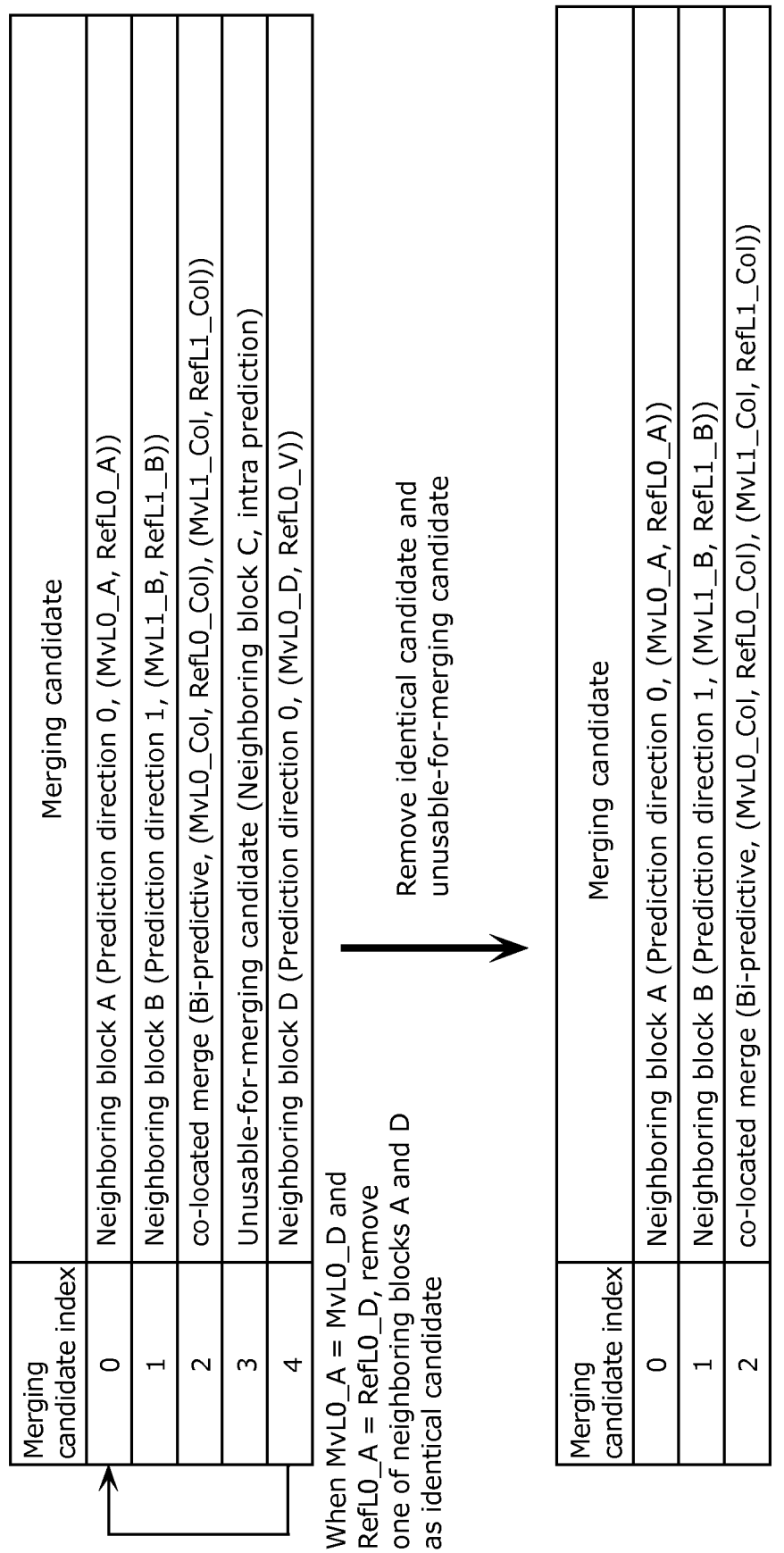
FIG. 4 is a diagram for illustrating an example of a merging candidate list.

For example, when the merging candidate of the neighboring block A is selected, the current block is coded using the reference picture index RefL0_A and the motion vector MvL0_A having the prediction direction 0. Then, only a merging candidate index having a value of 0 is attached to a bitstream, indicating that the merging candidate of the neighboring block A as shown in FIG. 4 is used for the coding of the current block. The amount of information on a prediction direction, a motion vector, and a reference picture index is thereby reduced.

Furthermore, in the merging mode, a candidate which cannot be used for coding of a current block (hereinafter referred to as an "unusable-for-merging candidate"), and a candidate having a set of a prediction direction, a motion vector, and a reference picture index identical to a set of a prediction direction, a motion vector, and a reference picture index of any other merging block (hereinafter referred to as an "identical candidate") are removed from the merging candidate list as shown in FIG. 4.

The total number of merging candidates is thus reduced, and thereby the amount of codes assigned to merging candidate indices is saved. Examples of the merging candidate which cannot be used for coding of a current block includes: (1) a merging candidate of a block coded using intra prediction, (2) a merging candidate of a block outside the slice including the current block or outside the boundary of a picture including the current block, and (3) a merging candidate of a block yet to be coded.

In the example shown in FIG. 4, the neighboring block C is a block coded using intra prediction. The merging candidate of the neighboring block C (indicated by the merging candidate index having a value of 3) is an unusable-for-merging candidate and therefore removed from the merging candidate list. In addition, the neighboring block D is identical in prediction direction, motion vector, and reference picture index to the neighboring block A. The merging candidate of the neighboring block D (indicated by the merging candidate index having a value of 4) is therefore removed from the merging candidate list. As a result, the final total number of merging candidates is three, and the size of the merging candidate list is set at three.

Merging candidate indices are coded by variable-length coding by assigning bit sequences according to the size of each merging candidate list as shown in FIG. 5. In the merging mode, bit sequences assigned to merging candidate indices are thus changed depending on the size of each merging candidate list, and thereby the amount of code is reduced.

Figure 6:
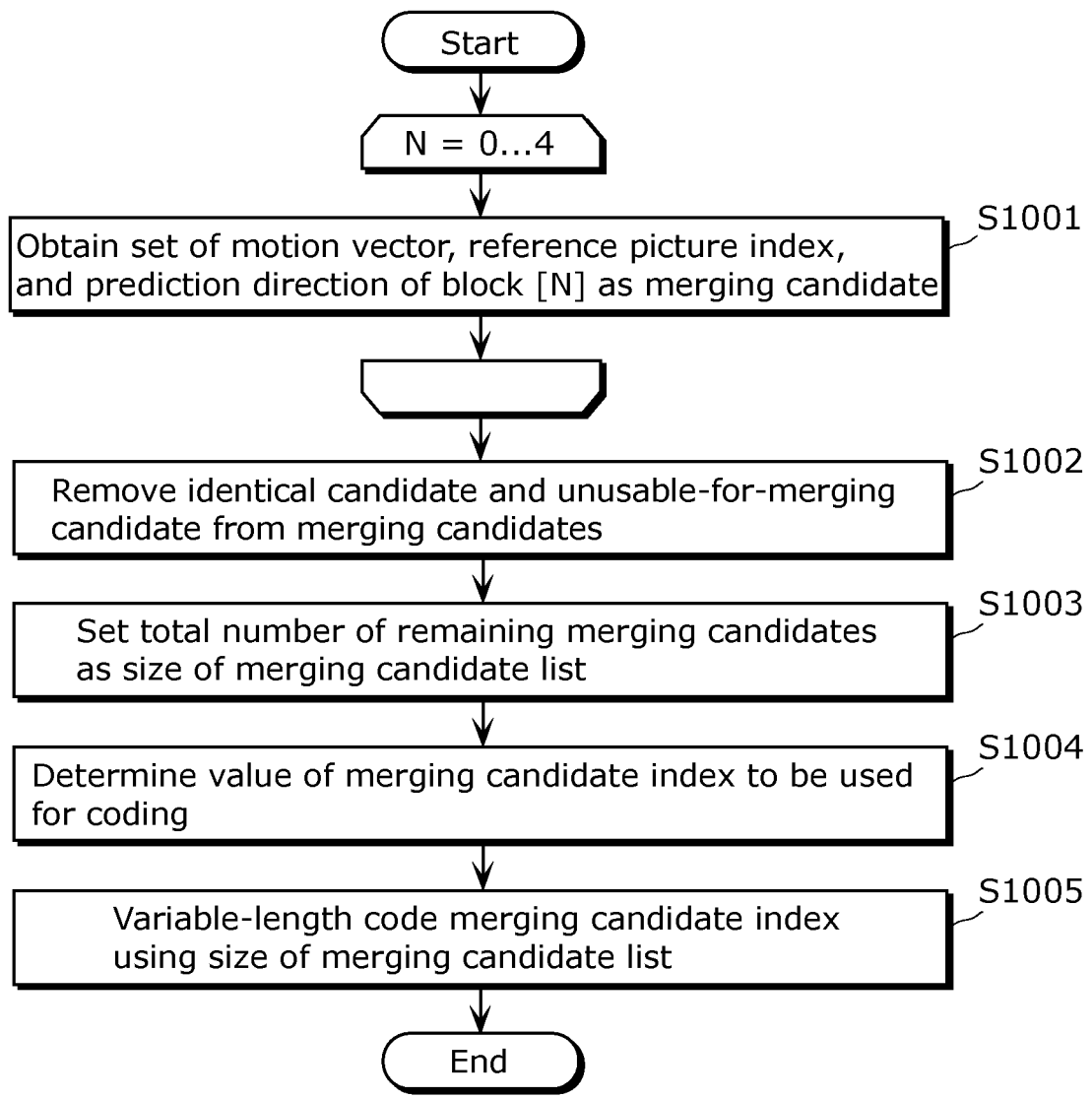
FIG. 6 is a flowchart showing an example of a process for coding of a current block when the merging mode is used.

FIG. 6 is a flowchart showing an example of a process for coding of a current block when the merging mode is used. In Step S1001, sets each including a prediction direction, a motion vector, and a reference picture index of neighboring blocks and a co-located block are obtained as merging candidates. In Step S1002, identical candidates and unusable-for-merging candidates are removed from the merging candidates. In Step S1003, the total number of the merging candidates after the removing is set as the size of the merging candidate list. In Step S1004, a merging candidate index to be used for coding of the current block is determined. In Step S1005, the determined merging candidate index is coded by variable-length coding in bit sequence according to the size of the merging candidate list.

Figure 7:
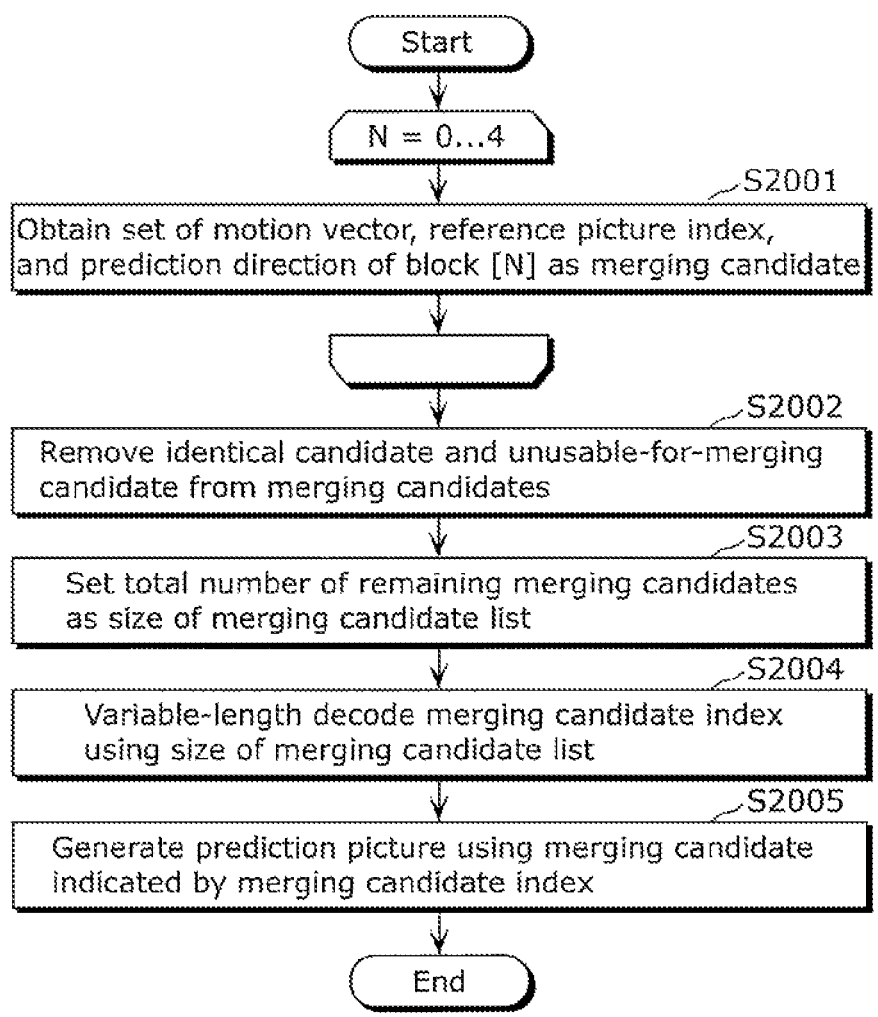
FIG. 7 is a flowchart showing a process for decoding using the merging mode.

FIG. 7 is a flowchart showing an example of a process for decoding using the merging mode. In Step S2001, sets each including a prediction direction, a motion vector, and a reference picture index of neighboring blocks and a co-located block are obtained as merging candidates. In Step S2002, identical candidates and unusable-for-merging candidates are removed from the merging candidates. In Step S2003, the total number of the merging candidates after the removing is set as the size of the merging candidate list. In Step S2004, the merging candidate index to be used in decoding of a current block is decoded from a bitstream using the size of the merging candidate list. In Step S2005, the current block is decoded by generating a prediction picture using the merging candidate indicated by the decoded merging candidate index.

Figure 8:
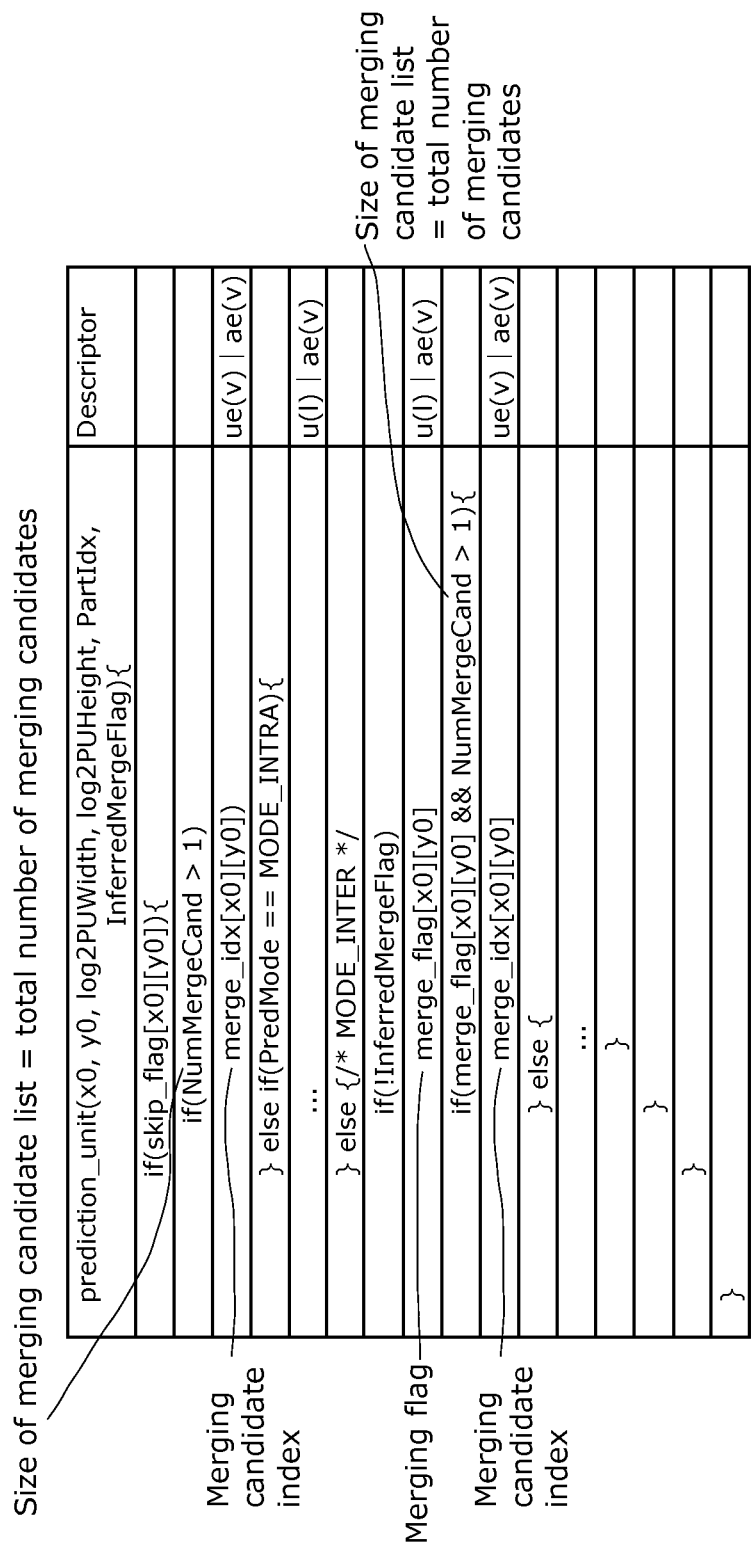
FIG. 8 shows syntax for attachment of merging candidate indices to a bitstream.

FIG. 8 shows syntax for attaching a merging candidate index to a bitstream. In FIG. 8, merge_idx represents a merging candidate index, and merge_flag represents a merging flag. NumMergeCand represents the size of a merging candidate list. NumMergeCand is set at the total number of merging candidates after unusable-for-merging candidates and identical candidates are removed from the merging candidates.

In the merging mode, when identical candidates are removed from merging candidates, a merging candidate index cannot be correctly decoded due to a discrepancy in bit sequence assigned to merging candidate indices between a picture coding apparatus and a picture decoding apparatus. Such a discrepancy may occur when, for example, there is a difference in the total number of merging candidates between the picture coding apparatus and the picture decoding apparatus.

Use of merging candidate lists having a fixed size has been discussed as a solution to the problem.

When the total number of merging candidates is equivalent to the size of a merging candidate list, it is more likely that the merging candidate list has a merging candidate including a motion vector for accurate prediction. It is therefore possible to achieve increased coding efficiency.

On the other hand, when the size of merging candidate lists is fixed, the total number of merging candidates after removing of identical candidates may be smaller than the size. In such a case, it is less likely that the merging candidate list has a merging candidate including a motion vector for accurate prediction. This may lead to decrease in coding efficiency.

In one general aspect, the techniques disclosed here feature a picture coding method which is a method for coding a picture on a block-by-block basis to generate a bitstream and includes: performing a first derivation process for deriving a first merging candidate which includes a candidate set of a prediction direction, a motion vector, and a reference picture index for use in coding of a current block; performing a second derivation process for deriving a second merging candidate which includes a candidate set of a prediction direction, a motion vector, and a reference picture index for use in the coding of the current block, the second derivation process being different from the first derivation process; selecting a merging candidate to be used in the coding of the current block from among the first merging candidate and the second merging candidate; and attaching an index for identifying the selected merging candidate to the bitstream, wherein in the performing of a first derivation process, the first derivation process is performed so that a total number of the first merging candidates does not exceed a predetermined number, and the second derivation process is performed when the total number of the first merging candidates is less than a predetermined maximum number of merging candidates.

With this, it is possible to perform the first derivation process so that the total number of first merging candidates does not exceed a predetermined number. The total number of first merging candidates is thus controlled, and the variety of merging candidates thereby increases. As a result, coding efficiency increases.

For example, the picture coding method may further include performing a third derivation process for deriving a third merging candidate which includes a candidate set of a prediction direction, a motion vector, and a reference picture index for use in the coding of the current block, the third derivation process being different from the first derivation process and the second derivation process, wherein the second derivation process is performed when the total number of the first merging candidates and third merging candidates is less than the predetermined maximum number of merging candidates, and in the selecting, the merging candidate to be used in the coding of the current block is selected from among the first merging candidate, the second merging candidate, and the third merging candidate.

With this, it is possible to further perform the third derivation process in which a method different from methods used in the first derivation process and the second derivation process is used. The variety of merging candidates thus further increases, and coding efficiency thereby increases.

For example, in the performing of a third derivation process, a plurality of the third merging candidates may be derived by performing the third derivation process, and in the performing of a first derivation process, the first derivation process may be a process for deriving, as the first merging candidate, a bi-predictive merging candidate which is a combination of two sets each including a prediction direction, a motion vector, and a reference picture index and included in the third merging candidates.

With this, it is possible to derive a bi-predictive first merging candidate by making a combination from a plurality of third merging candidates. A new bi-predictive first merging candidate can be thus derived even when none of the plurality of third merging candidates is a bi-predictive merging candidate. As a result, the variety of merging candidates is increased, and coding efficiency thereby increases.

For example, in the performing of a third derivation process, the third derivation process may be a process for deriving the third merging candidate using a set of a prediction direction, a motion vector, and a reference picture index which are used as a set for coding a block spatially or temporally neighboring the current block.

With this, it is possible to derive a third merging candidate using a set of a prediction direction, a motion vector, and a reference picture index used for coding of a block spatially or temporally neighboring the current block. The third merging candidate derived in this manner is reliable, and coding efficiency therefore increases.

For example, the second derivation process may be repeatedly performed until a total number of the first merging candidates, second merging candidates, and third merging candidates reaches the predetermined maximum number of merging candidates.

With this, it is possible to repeat the second derivation process until the total number of second merging candidates and third merging candidates reaches the predetermined maximum number of merging candidates. Merging candidates are thus derived to the maximum number, and coding efficiency therefore increases.

For example, in the performing of a second derivation process, the second derivation process may be a process for deriving, as the second merging candidate, a merging candidate including a motion vector which is a zero vector.

With this, it is possible to derive a second merging candidate having a zero vector as a motion vector. The merging candidate derived in this manner is reliable when the current block is a stationary region, and coding efficiency therefore increases.

For example, the predetermined number may depend on a maximum number of the first merging candidates to be derived using the first derivation process.

With this, it is possible to derive a first merging candidate using, as a predetermined number, a number dependent on the total number of first merging candidates which can be derived by the first derivation process. A first merging candidate is thus derived using an appropriate predetermined number so that the variety of merging candidates may increase, and coding efficiency therefore increases.

For example, the picture coding method may further include switching a coding process between a first coding process conforming to a first standard and a second coding process conforming to a second standard; and attaching, to the bitstream, identification information indicating either the first standard or the second standard to which the coding process after the switching conforms, wherein when the coding process after the switching is the first coding process, the first coding process is performed by performing the first derivation process, the second derivation process, the selecting, and the attaching.

With this, it is possible to switchably perform the first coding process conforming to the first standard and the second coding process conforming to the second standard.

Furthermore, in one general aspect, the techniques disclosed here feature a picture decoding method which is a method for decoding, on a block-by-block basis, a coded image included in a bitstream, and includes: performing a first derivation process for deriving a first merging candidate which includes a candidate set of a prediction direction, a motion vector, and a reference picture index for use in decoding of a current block; performing a second derivation process for deriving a second merging candidate which includes a candidate set of a prediction direction, a motion vector, and a reference picture index for use in the decoding of the current block, the second derivation process being different from the first derivation process; obtaining an index from the bitstream; and selecting, based on the obtained index, a merging candidate to be used in the decoding of the current block from among the first merging candidate and the second merging candidate, wherein in the performing of a first derivation process, the first derivation process is performed so that a total number of the first merging candidates does not exceed a predetermined number, and the second derivation process is performed when the total number of the first merging candidates is less than a predetermined maximum number of merging candidates.

With this, it is possible to perform the first derivation process so that the total number of first merging candidates does not exceed a predetermined number. The total number of first merging candidates is thus controlled, and the variety of merging candidates thereby increases. As a result, a bitstream coded with increased coding efficiency can be appropriately decoded.

For example, the picture decoding method may further include performing a third derivation process for deriving a third merging candidate which includes a candidate set of a prediction direction, a motion vector, and a reference picture index for use in the coding of the current block, the third derivation process being different from the first derivation process and the second derivation process, performing a third derivation process for deriving a third merging candidate which includes a candidate set of a prediction direction, a motion vector, and a reference picture index for use in the coding of the current block, the third derivation process being different from the first derivation process and the second derivation process, wherein the second derivation process is performed when the total number of the first merging candidates and third merging candidates is less than the predetermined maximum number of merging candidates, and in the selecting, the merging candidate to be used in the decoding of the current block is selected from among the first merging candidate, the second merging candidate, and the third merging candidate.

With this, it is possible to further possible to derive a third merging candidate by performing the third derivation process in which a method different from methods used in the first derivation process and the second derivation process is used. The variety of merging candidates thus further increases, and therefore a bitstream coded with increased coding efficiency can be appropriately decoded.

For example, in the performing of a third derivation process, a plurality of the third merging candidates may be derived by performing the third derivation process, and in the performing of a first derivation process, the first derivation process may be a process for deriving, as the first merging candidate, a bi-predictive merging candidate which is a combination of two sets each including a prediction direction, a motion vector, and a reference picture index and included in the third merging candidates.

With this, it is possible to derive a bi-predictive first merging candidate by making a combination from a plurality of third merging candidates. A new bi-predictive first merging candidate can be thus derived even when none of the plurality of third merging candidates is a bi-predictive merging candidate. As a result, the variety of merging candidates is thus increased, and therefore a bitstream coded with increased coding efficiency can be appropriately decoded.

For example, in the performing of a third derivation process, the third derivation process may be a process for deriving the third merging candidates using a set of a prediction direction, a motion vector, and a reference picture index which are used as a set in decoding a block spatially or temporally neighboring the current block.

With this, it is possible to derive a third merging candidate using a set of a prediction direction, a motion vector, and a reference picture index used for coding of a block spatially or temporally neighboring the current block. The third merging candidate derived in this manner is reliable, and therefore a bitstream coded with increased coding efficiency can be appropriately decoded.

For example, the second derivation process may be repeatedly performed until a total number of the first merging candidates, second merging candidates, and third merging candidates reaches the predetermined maximum number of merging candidates.

With this, it is possible to repeat the second derivation process until the total number of second merging candidates and the third merging candidates reaches the predetermined maximum number of merging candidates. Merging candidates are thus derived to the maximum number, and therefore a bitstream coded with increased coding efficiency can be appropriately decoded.

For example, in the performing of a second derivation process, the second derivation process may be a process for deriving, as the second merging candidate, a merging candidate including a motion vector which is a zero vector.

With this, it is possible to derive a second merging candidate having a zero vector as a motion vector. The merging candidate derived in this manner is reliable when the current block is a stationary region, and therefore a bitstream coded with increased coding efficiency can be appropriately decoded.

For example, the predetermined number may depend on a maximum number of the first merging candidates to be derived using the first derivation process.

With this, it is possible to derive a first merging candidate using, as a predetermined number, a number dependent on the total number of first merging candidates which can be derived by the first derivation process. A first merging candidate is thus derived using an appropriate predetermined number so that the variety of merging candidates may be increased, and therefore a bitstream coded with increased coding efficiency can be appropriately decoded.

For example, the picture decoding method may further include: switching a decoding process between a first decoding process conforming to a first standard and a second decoding process conforming to a second standard, according to identification information attached to the bitstream and indicating either the first standard or the second standard, wherein when the decoding process after the switching is the first decoding process, the first decoding process is performed by performing the first derivation process, the second derivation process, the obtaining, and the selecting.

With this, it is possible to switchably perform the first coding process conforming to the first standard and the second coding process conforming to the second standard.

These general and specific aspects can be implemented as a system, a method, an integrated circuit, a computer program, a computer-readable recording medium such as a CD-ROM, or as any combination of a system, a method, an integrated circuit, a computer program, and a computer-readable recording medium.

Exemplary embodiments will be described below with reference to the drawings.

Each of the exemplary embodiments described below shows a general or specific example. The numerical values, shapes, materials, structural elements, the arrangement and connection of the structural elements, steps, the processing order of the steps, etc. shown in the following exemplary embodiments are mere examples, and therefore do not limit the scope of the appended Claims and their equivalents. Therefore, among the constituent elements in the following exemplary embodiments, constituent elements not recited in any one of the independent claims defining the most generic part of the inventive concept are described as structural elements included as appropriate.

Embodiment 1

Figure 9:
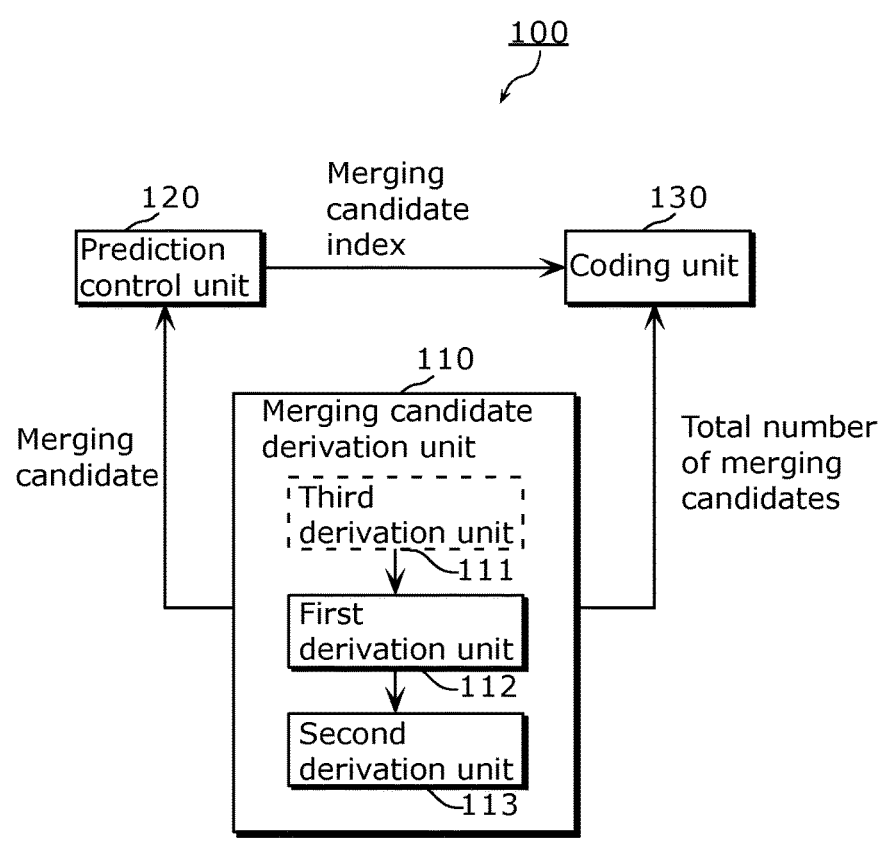
FIG. 9 is a block diagram showing a configuration of a picture coding apparatus according to Embodiment 1.

FIG. 9 is a block diagram showing a configuration of a picture coding apparatus 100 according to Embodiment 1. The picture coding apparatus 100 codes a picture on a block-by-block basis to generate a bitstream. As shown in FIG. 9, the picture coding apparatus 100 includes a merging candidate derivation unit 110, a prediction control unit 120, and a coding unit 130.

The merging candidate derivation unit 110 derives merging candidates. Then, the merging candidate derivation unit 110 generates a merging candidate list in which each of the derived merging candidates is associated with an index for identifying the merging candidate (hereinafter referred to as merging candidate index). Specifically, the merging candidate derivation unit 110 includes a third derivation unit 111, a first derivation unit 112, and a second derivation unit 113 as shown in FIG. 9.

The third derivation unit 111 performs a third derivation process in which a merging candidate is derived using a third derivation method. The merging candidate derived using the third derivation process is hereinafter referred to as a third merging candidate. Then, the third derivation unit 111 registers the third merging candidate in the merging candidate list in association with a merging candidate index.

Specifically, the third derivation unit 111 performs, as the third derivation process, a process for deriving a third merging candidate using, for example, a set of a prediction direction, a motion vector, and a reference picture index used for coding of a block spatially or temporally neighboring a current block. Third merging candidate derived from spatially neighboring blocks in this manner are referred to as spatial merging candidates, and third merging candidates derived from temporally neighboring blocks are referred to as temporal merging candidates.

The spatially neighboring block is a block within a picture including the current block and neighbors the current block. Specifically, the neighboring blocks A to D shown in FIG. 3 are examples of the spatially neighboring block.

The spatially neighboring block is not limited to the neighboring blocks A to D shown in FIG. 3. Examples of the spatially neighboring block may further include blocks neighboring any of the neighboring blocks A to D.

The temporally neighboring block is a block which is within a picture different from a picture including the current block and corresponds to the current block. Specifically, a co-located block is an example of the temporally neighboring block.

The temporally neighboring block is not limited to a block located in a position which is the same as the position of the current block in the respective picture (co-located block). For example, the temporally neighboring block may be a block neighboring the co-located block.

The third derivation unit 111 may perform the third derivation process in which a merging candidate is derived using a method other than the third derivation method. In other words, the third derivation unit 111 need not perform the process for deriving a spatial merging candidate or a temporal merging candidate as the third derivation process.

The first derivation unit 112 performs a first derivation process for deriving a merging candidate, using a first derivation method which is different from the third derivation method. The merging candidate derived using the first derivation process is hereinafter referred to as a first merging candidate. The first derivation unit 112 performs the first derivation process so that the total number of first merging candidates does not exceed a predetermined number. Then, the first derivation unit 112 registers the first merging candidate in the merging candidate list in association with a merging candidate index.

The predetermined number is a maximum number of first merging candidates. The predetermined number may be fixed or variable. For example, the predetermined number may be set depending on the total number of merging candidates which can be derived using the first derivation process. Specifically, the first derivation unit 112 may set the predetermined number depending on, for example, the total number of third merging candidates or the total number of referable pictures. Because of dependency of the predetermined number on the total number of merging candidates which can be derived using the first derivation process, the variety of merging candidates can be increased by deriving first merging candidates using an appropriate predetermined number, and coding efficiency thereby increases.

Specifically, the first derivation unit 112 performs, as the first derivation process, a process for deriving, for example, a bi-predictive merging candidate as a first merging candidate by making a combination of sets each including a prediction direction, a motion vector, and a reference picture index. The sets are included in the third merging candidates. Merging candidates derived in this manner are hereinafter referred to as combined merging candidates. The process for deriving a combined merging candidate will be described in detail in Embodiment 6.

The first derivation unit 112 may perform the first derivation process in which a merging candidate is derived using a method other than the first derivation method. In other words, the first derivation unit 112 may perform, as the first derivation process, a process other than the process for deriving a combined merging candidate.

The second derivation unit 113 performs a second derivation process for deriving a merging candidate, using a second derivation method when the total number of first merging candidates and third merging candidates is smaller than a predetermined maximum number of merging candidates. The second derivation method is different from the first derivation method and the third derivation method. The merging candidate derived using the second derivation process is hereinafter referred to as a second merging candidate. Then, the second derivation unit 113 registers the second merging candidate in the merging candidate list in association with a merging candidate index.

Specifically, the second derivation unit 113 performs, as the second derivation process, a process for deriving, for example, a merging candidate including a motion vector which is a zero vector. Merging candidates derived in this manner are hereinafter referred to as zero merging candidates. The process for deriving a zero merging candidate will be described in detail in Embodiment 5.

The second derivation unit 113 may perform the second derivation process in which a merging candidate is derived using a method other than the second derivation method. In other words, the second deriving unit 113 need not perform the process for deriving a zero merging candidate as the second derivation process.

The predetermined maximum number of merging candidates is a number provided in a standard, for example. Optionally, the predetermined maximum number of merging candidates may be determined according to, for example, features of a current picture. In this case, the determined maximum number may be attached to a bitstream.

The prediction control unit 120 selects a merging candidate to be used for coding a current block from the first to third merging candidates. In other words, the prediction control unit 120 selects a merging candidate to be used for coding a current block from the merging candidate list.

The coding unit 130 attaches an index for identifying the selected merging candidate (merging candidate index) to a bitstream. For example, the coding unit 130 codes an index using the total number of first to third merging candidates (total number of merging candidates), and attaches the coded index to a bitstream. Then, the coding unit 130 attaches the coded index to a bitstream.

Optionally, the coding unit 130 may code an index using not the total number of first to third merging candidates but, for example, a predetermined maximum number of merging candidates. Specifically, the coding unit 130 may determine a bit sequence assigned to the value of an index using a predetermined maximum number of merging candidates as shown in FIG. 5 and code the determined bit sequence by variable-length coding. By doing this, the coding unit 130 can code an index independently of the total number of actually derived merging candidates. Therefore, even when information necessary for derivation of a merging candidate (for example, information on a co-located block) is lost, an index can be still decoded and error resistance is thereby enhanced. Furthermore, an index can be decoded independently of the total number of actually derived merging candidates. In other words, an index can be decoded without waiting for derivation of merging candidates. In other words, a bitstream can be generated with which deriving of merging candidates and decoding of indices can be performed in parallel.

Operations of the picture coding apparatus 100 in the above-described configuration will be described below.

Figure 10A:
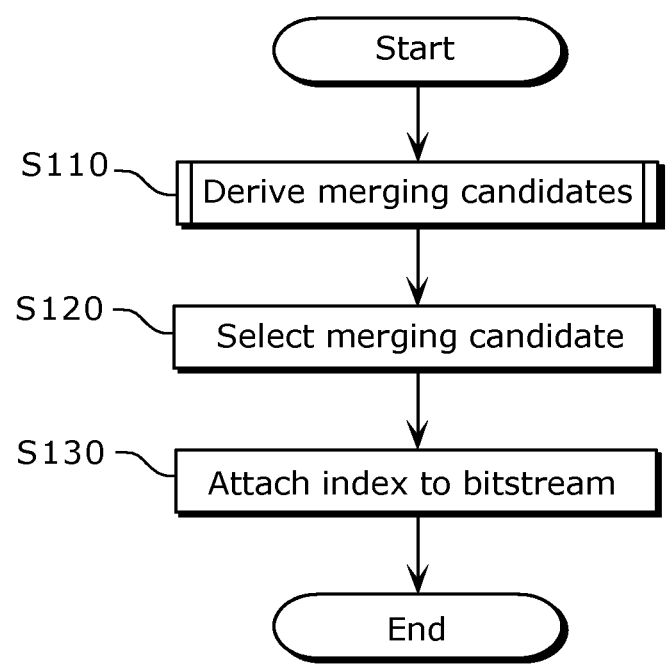
FIG. 10A is a flowchart showing processing operations of a picture coding apparatus according to Embodiment 1.

FIG. 10A is a flowchart showing processing operations of the picture coding apparatus 100 according to Embodiment 1.

First, the merging candidate derivation unit 110 derives merging candidates (S110), and registers the derived merging candidates in a merging candidate list.

Next, the prediction control unit 120 selects a merging candidate to be used for coding a current block from the first to third merging candidates (S120). For example, the prediction control unit 120 selects, from the derived merging candidates, a merging candidate which minimizes cost indicating the amount of code for the current block and others.

Next, the coding unit 130 attaches an index for identifying the selected merging candidate to a bitstream (S130). Furthermore, the coding unit 130 generates inter-prediction picture of the current block by performing inter prediction using the selected merging candidate. Input picture data is coded using inter-prediction picture generated in this manner.

Step S110 in FIG. 10A will be described in detail below with reference to FIG. 10B and FIG. 11.

Figure 10B:
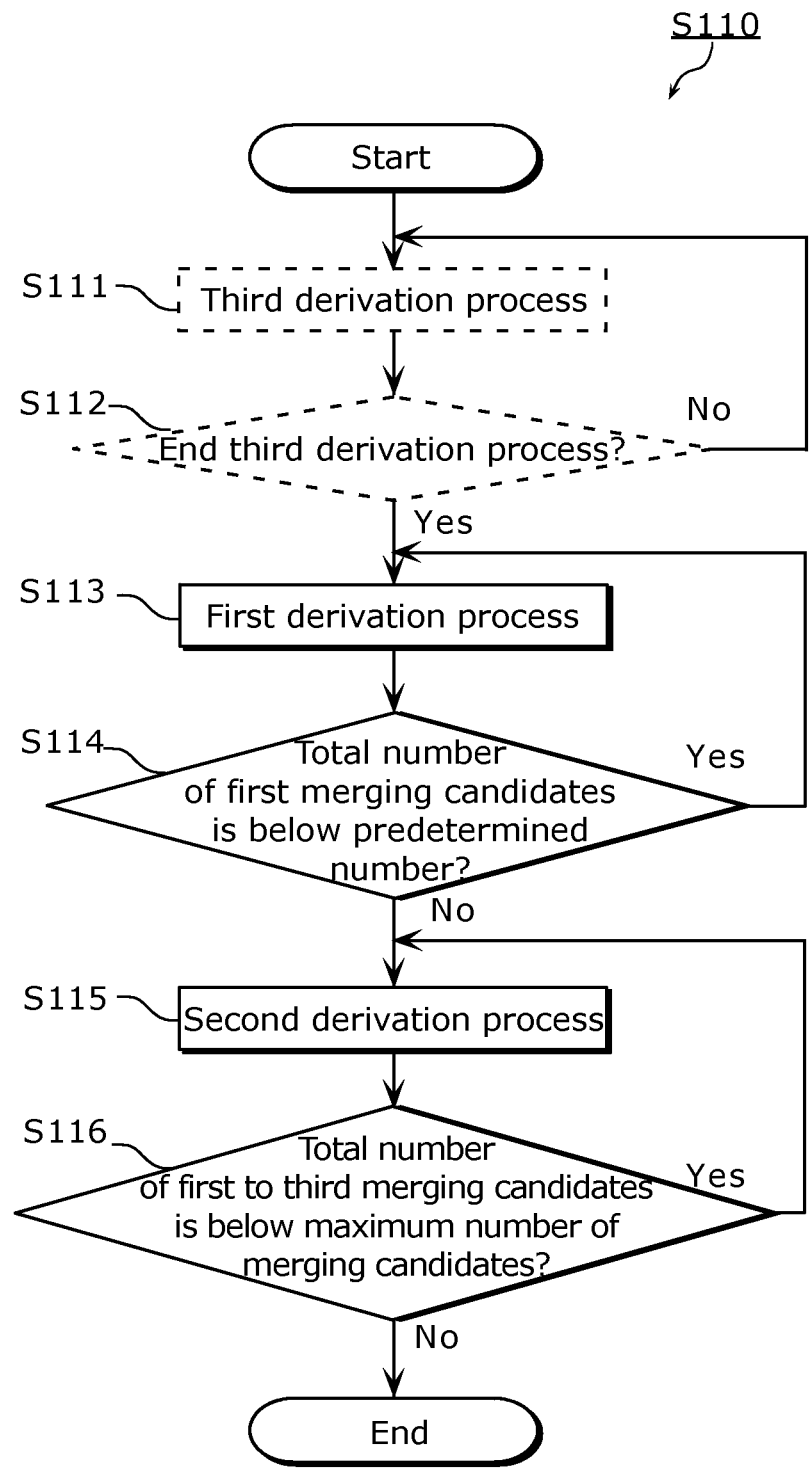
FIG. 10B is a flowchart showing derivation of merging candidates according to Embodiment 1.

FIG. 10B is a flowchart of the deriving of merging candidates according to Embodiment 1. FIG. 11 shows an example of the merging candidate list generated by the picture coding apparatus 100 according to Embodiment 1. For FIG. 11, it is assumed that a predetermined maximum number of merging candidates is five, and a predetermined number is two.

First, the third derivation unit 111 performs the third derivation process (S111). Note that a third merging candidate is not always derived in Step S111. For example, the third derivation unit 111 derives no third merging candidate by performing the third derivation process when a third merging candidate to be derived as a result of the third derivation process presently performed is identical to a previously derived third merging candidate. Here, one merging candidate being identical to another merging candidate means that the sets each including a prediction direction, a motion vector, and a reference picture index and included in the respective merging candidates are identical to each other. In other examples, the third derivation unit 111 does not derive a third merging candidate from a block spatially or temporally neighboring a current block when the block is (1) a block coded by intra prediction, (2) a block outside a slice including the current block or outside the boundary of a picture including the current block, or (3) a block yet to be coded.

Next, the third derivation unit 111 determines whether or not to end the third derivation process (S112). For example, to determine whether or not to end the third derivation process, the third derivation unit 111 determines whether the third derivation process has been performed for all predetermined neighboring blocks.

When the third derivation unit 111 determines not to end the third derivation process (S112, No), the third derivation unit 111 performs the third derivation process again (S111).

Referring to FIG. 11, two third merging candidates (a spatial merging candidate and a temporal merging candidate) are derived from the neighboring blocks A to D and a co-located block. The third merging candidates are provided with merging candidate indices having values of "0" and "1", respectively.

When the third derivation unit 111 determines to end the third derivation process (S112, Yes), the first derivation unit 112 performs the first derivation process (S113). Next, the first derivation unit 112 determines whether or not the total number of first merging candidates derived using the first derivation process is below a predetermined number (S114).

When the total number of first merging candidates is below the predetermined number (S114, Yes), the first derivation unit 112 performs the first derivation process again (S113). In other words, the first derivation unit 112 performs the first derivation process so that the total number of first merging candidates does not exceed a predetermined number.

Referring to FIG. 11, two first merging candidates (combined merging candidates) are derived by making combinations from the two third merging candidates. The first merging candidates are provided with merging candidate indices having values of "2" and "3", which are larger than those of the third merging candidates.

When the total number of first merging candidates is not below the predetermined number (S114, No), the second derivation unit 113 performs the second derivation process (S115). Next, the second derivation unit 113 determines whether or not the total number of first to third merging candidates is below a predetermined maximum number of merging candidates (S116).

When the total number of first to third merging candidates is below the predetermined maximum number (S116, Yes), the second derivation unit 113 performs the second derivation process again (S115). In other words, the second derivation unit 113 repeats the second derivation process until the total number of first to third merging candidates reaches the predetermined maximum number of merging candidates.

Referring to FIG. 11, the total number of first and third merging candidates is four, and the predetermined maximum number of merging candidates is five, and therefore one second merging candidate (zero merging candidate) is derived. The second merging candidate is provided with a merging candidate index having a value of "4", which is larger than those of the first and third merging candidates.

When the total number of first to third merging candidates is not below the maximum number (S116, No), the process proceeds to Step S120 shown in FIG. 10A.

In this manner, the picture coding apparatus 100 according to Embodiment 1 performs the first derivation process so that the total number of first merging candidates does not exceed a predetermined number. The picture coding apparatus 100 thereby controls the total number of first merging candidates to increase the variety of merging candidates. As a result, the picture coding apparatus 100 can code pictures with increased efficiency.

Furthermore, the second derivation unit 113 can repeat the second derivation process until the total number of first to third merging candidates reaches a predetermined maximum number of merging candidates. The second derivation unit 113 thereby derives merging candidates to the maximum number of merging candidates, and coding efficiency therefore increases.

Furthermore, merging candidates can be derived in descending order of reliability by performing the deriving in an order of spatial or temporal merging candidates as third merging candidates, combined merging candidates as first merging candidates, and zero merging candidates as second merging candidates as shown in FIG. 11. It is therefore more likely that derived merging candidates are more reliable.

The merging candidate derivation unit may assign merging candidate indices to merging candidates in such a manner that the merging candidate indices of combined merging candidates (first merging candidates) are larger than those of the spatial or temporal merging candidates (third merging candidates) and the merging candidate indices of zero merging candidates (second merging candidates) are larger than those of the combined merging candidates (first merging candidates) as shown in FIG. 11. The merging candidate derivation unit 110 thereby assigns indices having smaller values to merging candidates which are more likely to be selected, and therefore the amount of codes assigned to merging candidate indices is saved.

Note that the first to third merging candidates are not limited to combined merging candidates, zero merging candidates, or spatial or temporal merging candidates. Note also that the values of the indices assigned to the first to third merging candidates are not limited to the values of the indices shown in FIG. 11.

Note that the picture coding apparatus 100 need not derive third merging candidates in Embodiment 1. In other words, the merging candidate derivation unit 110 may not include the third derivation unit 111 shown in FIG. 9. In this case, the picture coding apparatus 100 skips Step S111 and Step S112 in the process shown in FIG. 10B. The process is performed without using third merging candidates in Step S113 to Step S116. For example, in Step S115, the second derivation unit 113 determines whether or not the total number of first merging candidates is below a predetermined maximum number of merging candidates.

For example, the picture coding apparatus 100 may further derive fourth merging candidates. For example, the merging candidate derivation unit 110 may derive a scaling merging candidate as a fourth merging candidate when it is impossible to derive as many second merging candidates as to make the total number of first to third merging candidates equal to a maximum number of merging candidates. The process for deriving a scaling merging candidate will be described in detail in Embodiment 7.

Note also that in Embodiment 1, the second derivation unit need not repeat the second derivation process until the total number of first to third merging candidates reaches a predetermined maximum number of merging candidates. For example, the total number of first to third merging candidates is not equal to a predetermined maximum number of merging candidates when the difference between the predetermined maximum number of merging candidates and the total number of first to third merging candidates is larger than the total number of second merging candidates which can be derived using the second derivation process.

Embodiment 2

Embodiment 2 will be described below.

Figure 12:
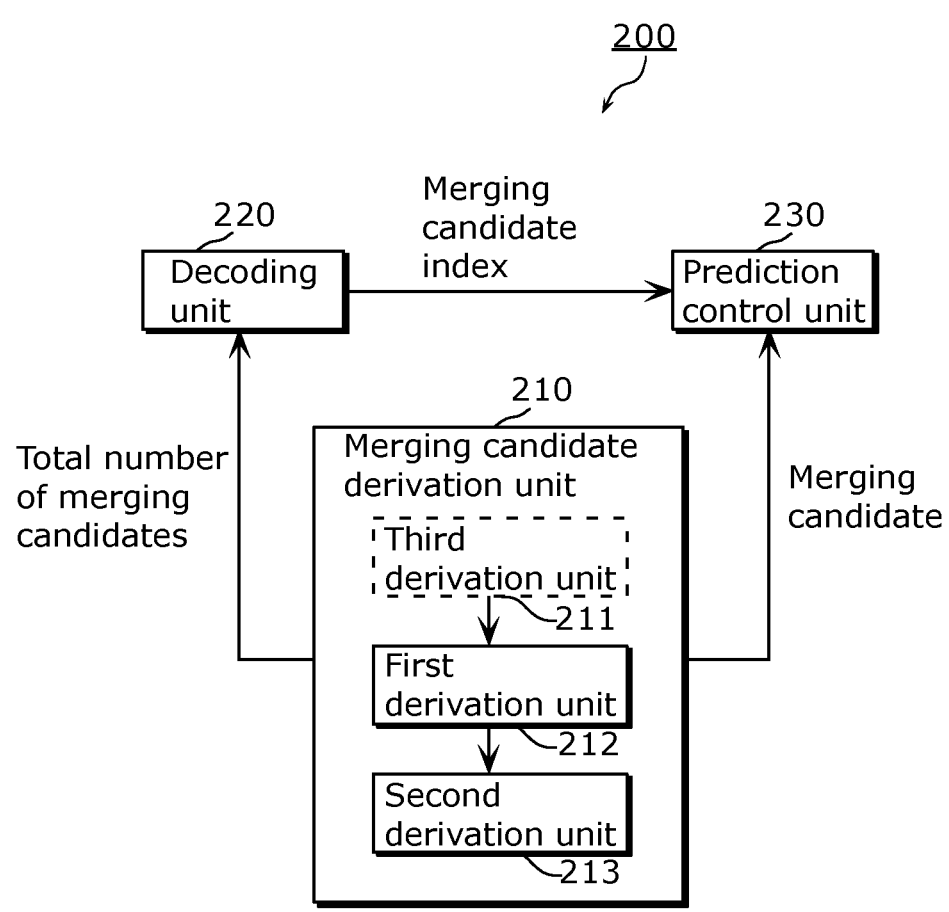
FIG. 12 is a block diagram showing a configuration of a picture decoding apparatus according to Embodiment 2.

FIG. 12 is a block diagram showing a configuration of a picture decoding apparatus 200 according to Embodiment 2. The picture decoding apparatus 200 is an apparatus corresponding to the picture coding apparatus 100 according to Embodiment 1. Specifically, for example, the picture decoding apparatus 200 decodes, on a block-by-block basis, coded pictures included in a bitstream generated by the picture coding apparatus 100 according to Embodiment 1. As shown in FIG. 12, the picture decoding apparatus 200 includes a merging candidate derivation unit 210, a decoding unit 220, and a prediction control unit 230.

As with the merging candidate derivation unit 110 in Embodiment 1, the merging candidate derivation unit 210 derives merging candidates. The merging candidate derivation unit 210 generates a merging candidate list in which each of the derived merging candidates is associated with a merging candidate index. Specifically, the merging candidate derivation unit 210 includes a third derivation unit 211, a first derivation unit 212, and a second derivation unit 213 as shown in FIG. 12.

The third derivation unit 211 performs the same process as the process performed by the third derivation unit 111 in Embodiment 1. In other words, the third derivation unit 211 performs the third derivation process for deriving a third merging candidate using the third derivation method. Then, the third derivation unit 111 registers the third merging candidate in the merging candidate list in association with a merging candidate index.

Specifically, the third derivation unit 211 performs, as the third derivation process, a process for deriving a third merging candidate using, for example, a set of a prediction direction, a motion vector, and a reference picture index used for decoding of a block spatially or temporally neighboring a current block.

The first derivation unit 212 performs the same process as the process performed by the first derivation unit 112 in Embodiment 1. In other words, the first derivation unit 212 performs the first derivation process for deriving a first merging candidate, using the first derivation method. The first derivation unit 212 performs the first derivation process so that the total number of first merging candidates does not exceed a predetermined number. Then, the first derivation unit 212 registers the first merging candidate in the merging candidate list in association with a merging candidate index.

Specifically, the first derivation unit 212 performs, as the first derivation process, a process for deriving, for example, a bi-predictive merging candidate as a first merging candidate by making a combination of sets each including a prediction direction, a motion vector, and a reference picture index. The sets are included the third merging candidates.

The term "bi-predictive" means prediction with reference to the first reference picture list and the second reference picture list. Note that being "bi-predictive" does not always involve references both to a temporally preceding reference picture and to a temporally following reference picture. In other words, a bi-predictive merging candidate may be coded and decoded with reference to reference pictures in the same direction (preceding reference pictures or following reference pictures).

The second derivation unit 213 performs the same process as the process performed by the second derivation unit 113 in Embodiment 1. In other words, the second derivation unit 213 performs a second derivation process for deriving a second merging candidate, using the second derivation method when the total number of first merging candidates and third merging candidates is smaller than a predetermined maximum number of merging candidates. Then, the second derivation unit 213 registers the second merging candidate in the merging candidate list in association with a merging candidate index.

Specifically, the second derivation unit 213 performs, as the second derivation process, a process for deriving, for example, a merging candidate including a motion vector which is a zero vector (zero merging candidate). In this case, the second derivation unit 213 performs the second derivation process using indices of referable pictures sequentially as reference picture indices included in zero merging candidates.

The decoding unit 220 obtains an index for identifying a merging candidate (merging candidate index) from a bitstream. For example, the decoding unit 220 obtains a merging candidate index by decoding, using the total number of first to third merging candidates or a predetermined maximum number of merging candidates, a merging candidate index coded and attached to a bitstream.

The prediction control unit 230 selects, using the index obtained by the decoding unit 220, a merging candidate to be used for decoding a current block from the first to third merging candidates. In other words, the prediction control unit 230 selects a merging candidate from the merging candidate list. The selected merging candidate is to be used for generating a prediction picture of a current block to be decoded.

Operations of the picture decoding apparatus 200 in the above-described configuration will be described below.

Figure 13A:
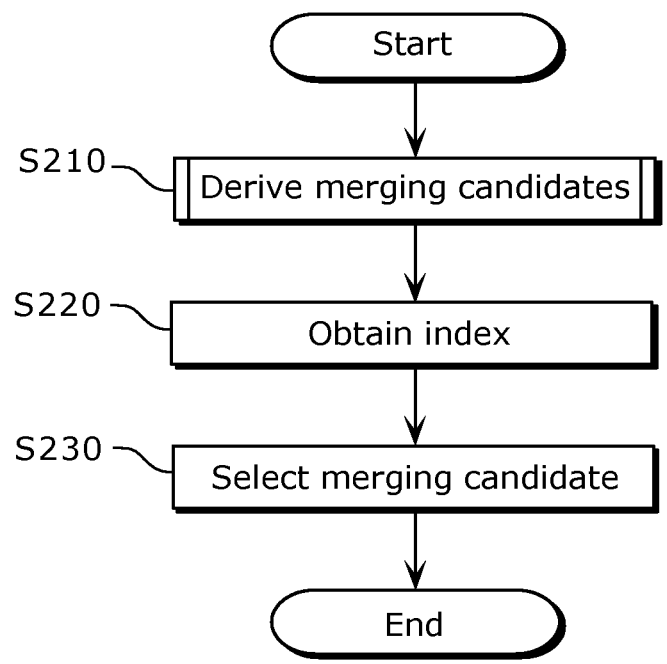
FIG. 13A is a flowchart showing processing operations of the picture decoding apparatus according to Embodiment 2.

FIG. 13A is a flowchart showing processing operations of the picture decoding apparatus 200 according to Embodiment 2.

First, the merging candidate derivation unit 210 derives merging candidates in the same manner as in Step S110 in FIG. 10A (S210).

Next, the decoding unit 220 obtains a merging candidate index from a bitstream (S220). For example, the decoding unit 220 obtains a merging candidate index by decoding a coded merging candidate index using the total number of first to third merging candidates (the number of merging candidates).

Optionally, the decoding unit 220 may obtain a merging candidate index by decoding a coded merging candidate index using a predetermined maximum number of merging candidates. In this case, the decoding unit 220 may obtain a merging candidate index (S220) before the deriving of merging candidates (S210). Alternatively, the decoding unit 220 may obtain a merging candidate index (S220) in parallel with the deriving of merging candidates (S210).

Next, the prediction control unit 230 selects, using the obtained merging candidate index, a merging candidate to be used for decoding a current block from the first to third merging candidates (S230).

Step S210 in FIG. 13A will be described in detail below with reference to FIG. 13B.

Figure 13B:
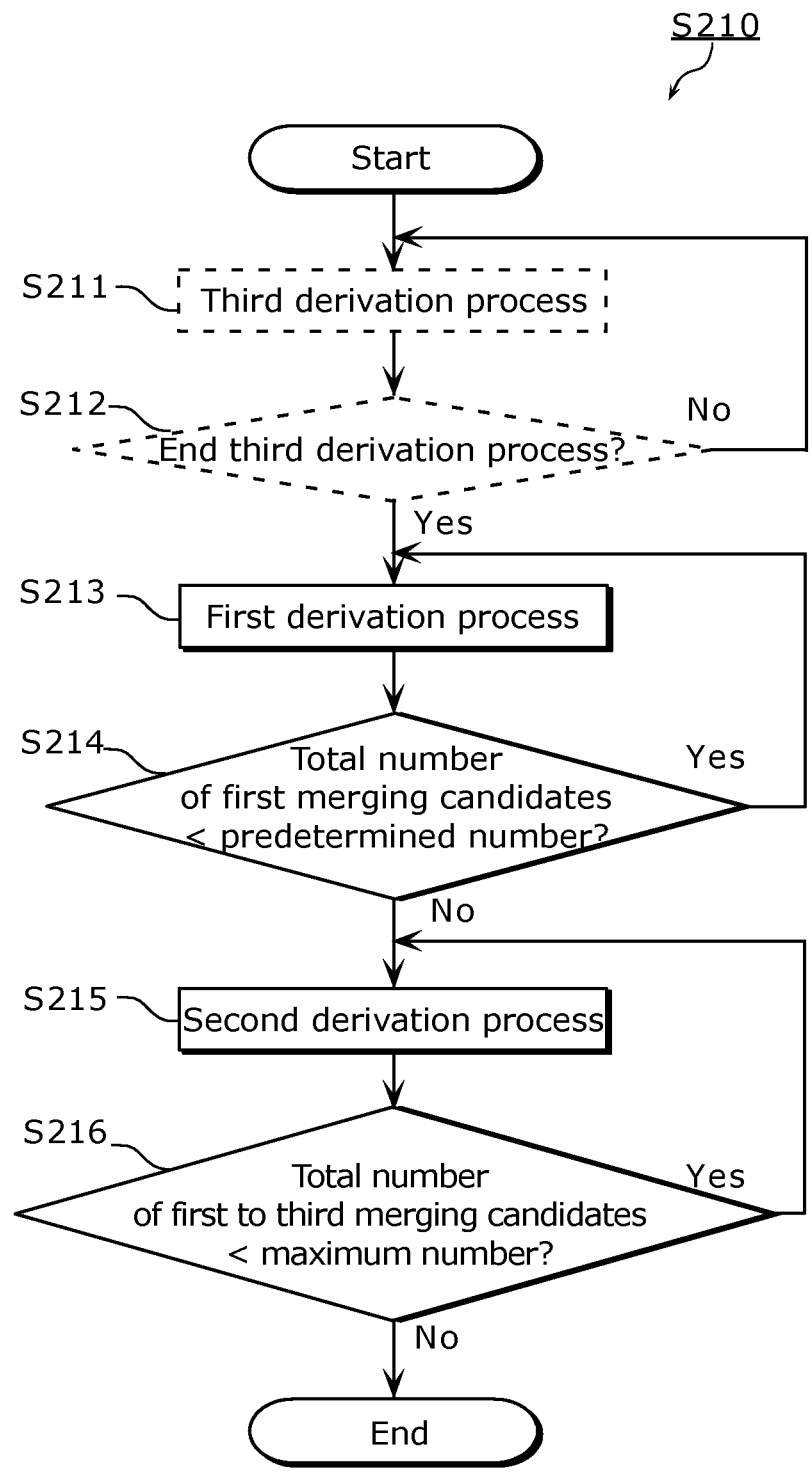
FIG. 13B is a flowchart showing derivation of merging candidates according to Embodiment 2.

FIG. 13B is a flowchart showing the deriving of merging candidates according to Embodiment 2.

First, the third derivation unit 111 performs the third derivation process in the same manner as in Step S111 in FIG. 10B (S211). Next, the third derivation unit 211 determines whether or not to end the third derivation process (S212). When the third derivation unit 211 determines not to end the third derivation process (S212, No), the third derivation unit 211 performs the third derivation process again (S211).

When the third derivation unit 211 determines to end the third derivation process (S212, Yes), the first derivation unit 212 performs the first derivation process in the same manner as in Step S113 in FIG. 10B (S213). Next, the first derivation unit 212 determines whether or not the total number of first merging candidates derived using the first derivation process is below a predetermined number (S214).

When the total number of first merging candidates is not below the predetermined number (S214, No), the second derivation unit 213 performs the second derivation process in the same manner as in Step S115 in FIG. 10B (S215). Next, the second derivation unit 213 determines whether or not the total number of first to third merging candidates is below a predetermined maximum number of merging candidates (S216).

When the total number of first to third merging candidates is below the predetermined maximum number (S216, Yes), the second derivation unit 213 performs the second derivation process again (S215). In other words, the second derivation unit 213 repeats the second derivation process until the total number of first to third merging candidates reaches the predetermined maximum number of merging candidates.

When the total number of first to third merging candidates is not below the maximum number (S216, No), the process proceeds to Step S220 shown in FIG. 13A.

In this manner, the picture decoding apparatus 200 according to Embodiment 2 performs the first derivation process so that the total number of first merging candidates does not exceed a predetermined number. The picture decoding apparatus 200 thereby controls the total number of first merging candidates, and the variety of merging candidates thereby increases. As a result, the picture decoding apparatus 200 can appropriately decode a bitstream coded with increased coding efficiency.

Furthermore, the second derivation unit 213 can repeat the second derivation process until the total number of first to third merging candidates reaches a predetermined maximum number of merging candidates. The second derivation unit 213 thereby derives merging candidates to the maximum number of merging candidates, and coding efficiency therefore increases. The increase allows the picture decoding apparatus 200 to appropriately decode a bitstream coded with increased coding efficiency.

Note that the picture decoding apparatus 200 need not derive third merging candidates in Embodiment 2. In other words, the merging candidate derivation unit 210 may not include the third derivation unit 211 shown in FIG. 12. In this case, the picture decoding apparatus 200 skips Step S211 and Step S212 in the process shown in FIG. 10B. The process is performed without using third merging candidates in Step S213 to Step S216. For example, in Step S215, the second derivation unit 213 determines whether or not the total number of first merging candidates is below a predetermined maximum number of merging candidates.

Embodiment 3

A picture coding apparatus according to Embodiment 3 will be specifically described below with reference to drawings. The picture coding apparatus according to Embodiment 3 is an example of possible applications of the picture coding apparatus according to Embodiment 1.

Figure 14:
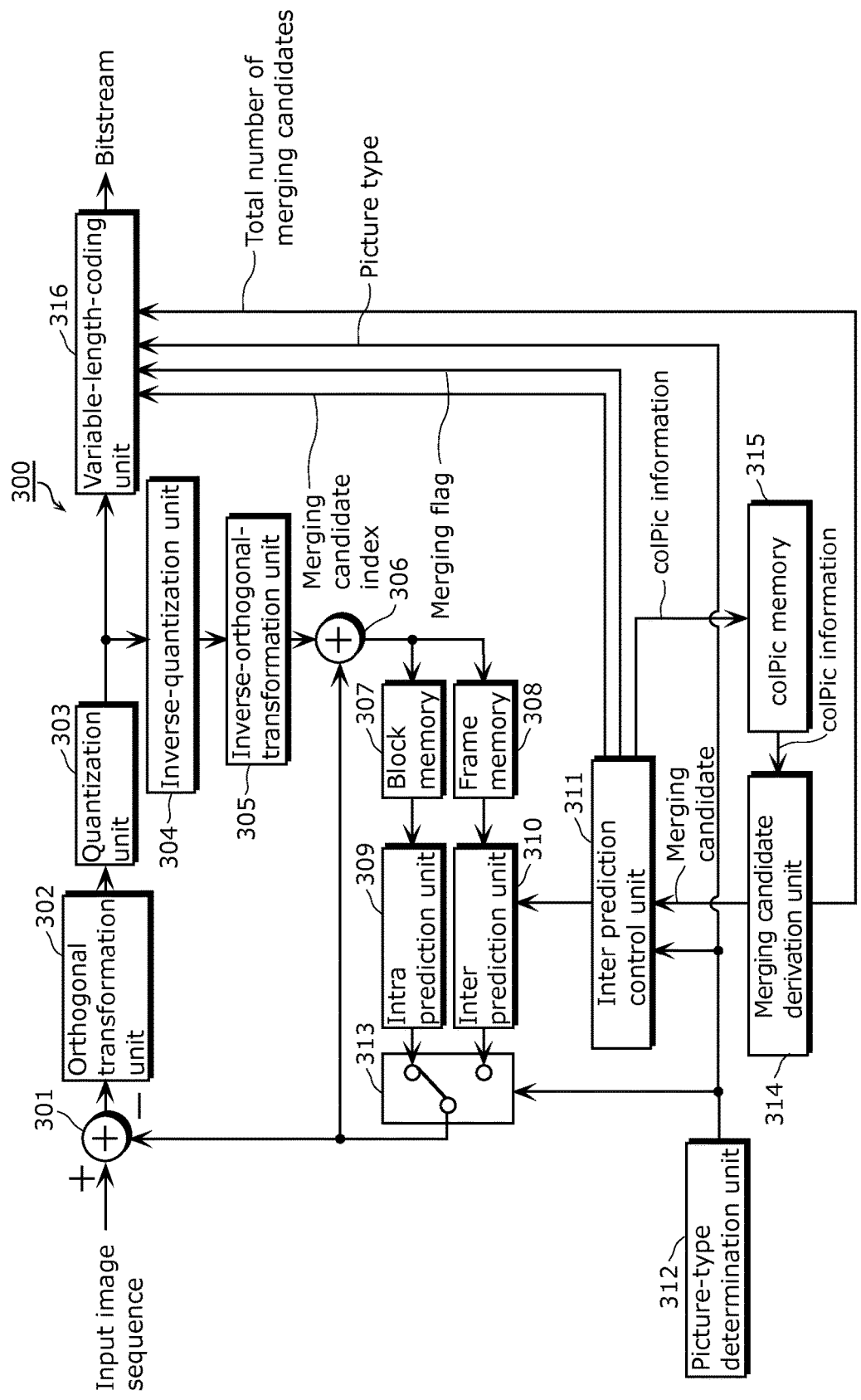
FIG. 14 is a block diagram showing a configuration of a picture coding apparatus according to Embodiment 3.

FIG. 14 is a block diagram showing a configuration of a picture coding apparatus 300 according to Embodiment 3. The picture coding apparatus 300 codes a picture on a block-by-block basis to generate a bitstream.

As shown in FIG. 14, the picture coding apparatus 300 includes a subtractor 301, an orthogonal transformation unit 302, a quantization unit 303, an inverse-quantization unit 304, an inverse-orthogonal transformation unit 305, an adder 306a block memory 307, a frame memory 308, an intra prediction unit 309, an inter prediction unit 310, an inter prediction control unit 311, a picture-type determination unit 312, a switch 313, a merging candidate derivation unit 314, a colPic memory 315, and a variable-length-coding unit 316.

The subtractor 301 subtracts, on a block-by-block basis, prediction picture data from input picture data included in an input image sequence to generate prediction error data.

The orthogonal transformation unit 302 transforms the generated prediction error data from picture domain into frequency domain.

The quantization unit 303 quantizes the prediction error data in a frequency domain as a result of the transform.

The inverse-quantization unit 304 inverse-quantizes the prediction error data quantized by the quantization unit 303.

The inverse-orthogonal-transformation unit 305 transforms the inverse-quantized prediction error data from frequency domain into picture domain.

The adder 306 generates reconstructed picture data by adding, on a block-by-block basis, prediction picture data and the prediction error data inverse-quantized by the inverse-orthogonal-transformation unit 305.

The block memory 307 stores the reconstructed picture data in units of a block.

The frame memory 308 stores the reconstructed picture data in units of a frame.

The picture-type determination unit 312 determines in which of the picture types of I-picture, B-picture, and P-picture the input picture data is to be coded. Then, the picture-type determination unit 312 generates picture-type information indicating the determined picture type.

The intra prediction unit 309 generates intra prediction picture data of a current block by performing intra prediction using reconstructed picture data stored in the block memory 307 in units of a block.

The inter prediction unit 310 generates inter prediction picture data of a current block by performing inter prediction using reconstructed picture data stored in the frame memory 308 in units of a frame and a motion vector derived by a process including motion estimation. For example, when the merging mode is selected as a prediction mode to be used, the inter prediction unit 310 generates prediction picture data of a current block by performing inter prediction using a merging candidate.

When a current block is coded using intra prediction, the switch 313 outputs intra prediction picture data generated by the intra prediction unit 309 as prediction picture data of the current block to the subtractor 301 and the adder 306. When a current block is coded using inter prediction, the switch 313 outputs inter prediction picture data generated by the inter prediction unit 310 as prediction picture data of the current block to the subtractor 301 and the adder 306.

As with the merging candidate derivation unit 110 in Embodiment 1, the merging candidate derivation unit 314 derives merging candidates. Specifically, the merging candidate derivation unit 314 performs processes for deriving merging candidates (the first derivation process and the second derivation process) using at least two different derivation methods (the first derivation method and the second derivation method). For example, the merging candidate derivation unit 314 derives merging candidates using neighboring blocks of a current block and colPic information stored in the colPic memory 315. The colPic information indicates information on a co-located block of the current block, such as a motion vector.

The merging candidate derivation unit 314 limits the total number of first merging candidates derived using the first derivation method but does not limit the total number of second merging candidates derived using the second derivation method. In other words, the merging candidate derivation unit 314 derives first merging candidates so that the total number of first merging candidates does not exceed a predetermined number. When the total number of derived first merging candidates is less than the size of a merging candidate list, the merging candidate derivation unit 314 derives second merging candidates until the total number of the derived first and second merging candidates becomes equivalent to the size of the merging candidate list.

In this manner, the total number of first merging candidates is limited and the total number of second merging candidates is not limited. The merging candidate derivation unit 314 can therefore derive a variety of merging candidates. Furthermore, the merging candidate derivation unit 314 derives merging candidates until the total number of the derived merging candidates becomes equivalent to the size of the merging candidate list. The merging candidate list is therefore more likely to include a merging candidate having a motion vector for accurate prediction. The merging candidate derivation unit 314 thereby contributes to increase in coding efficiency.

Furthermore, the merging candidate derivation unit 314 assigns merging candidate indices to the derived merging candidates. Then, the merging candidate derivation unit 314 transmits the merging candidates and the merging candidate indices to the inter prediction control unit 311. Furthermore, the merging candidate derivation unit 314 transmits the total number of the derived merging candidates (the number of merging candidates) to the variable-length-coding unit 316.

The inter prediction control unit 311 selects, from a prediction mode in which a motion vector derived by motion estimation is used (motion estimation mode) and a prediction mode in which a merging candidate is used (merging mode), a prediction mode which provides the smaller prediction error. Furthermore, the inter prediction control unit 313 transmits a merging flag indicating whether or not the selected prediction mode is the merging mode to the variable-length-coding unit 316. Furthermore, when the selected prediction mode is the merging mode, the inter prediction control unit 311 transmits a merging candidate index corresponding to the selected merging candidate to the variable-length-coding unit 316. Furthermore, the inter prediction control unit 311 transmits colPic information including a motion vector of the current block to the colPic memory 315.

The variable-length-coding unit 316 generates a bitstream by performing variable-length coding on the quantized prediction error data, the merging flag, and the picture-type information. Furthermore, the variable-length-coding unit 316 sets the total number of the derived merging candidates as the size of the merging candidate list. Then, the variable-length-coding unit 316 performs variable-length coding on a bit sequence by assigning, according to the size of the merging candidate list, a bit sequence to the merging candidate index to be used for coding of the current block.

Operations of the picture coding apparatus 300 in the above-described configuration will be described below.

Figure 15:
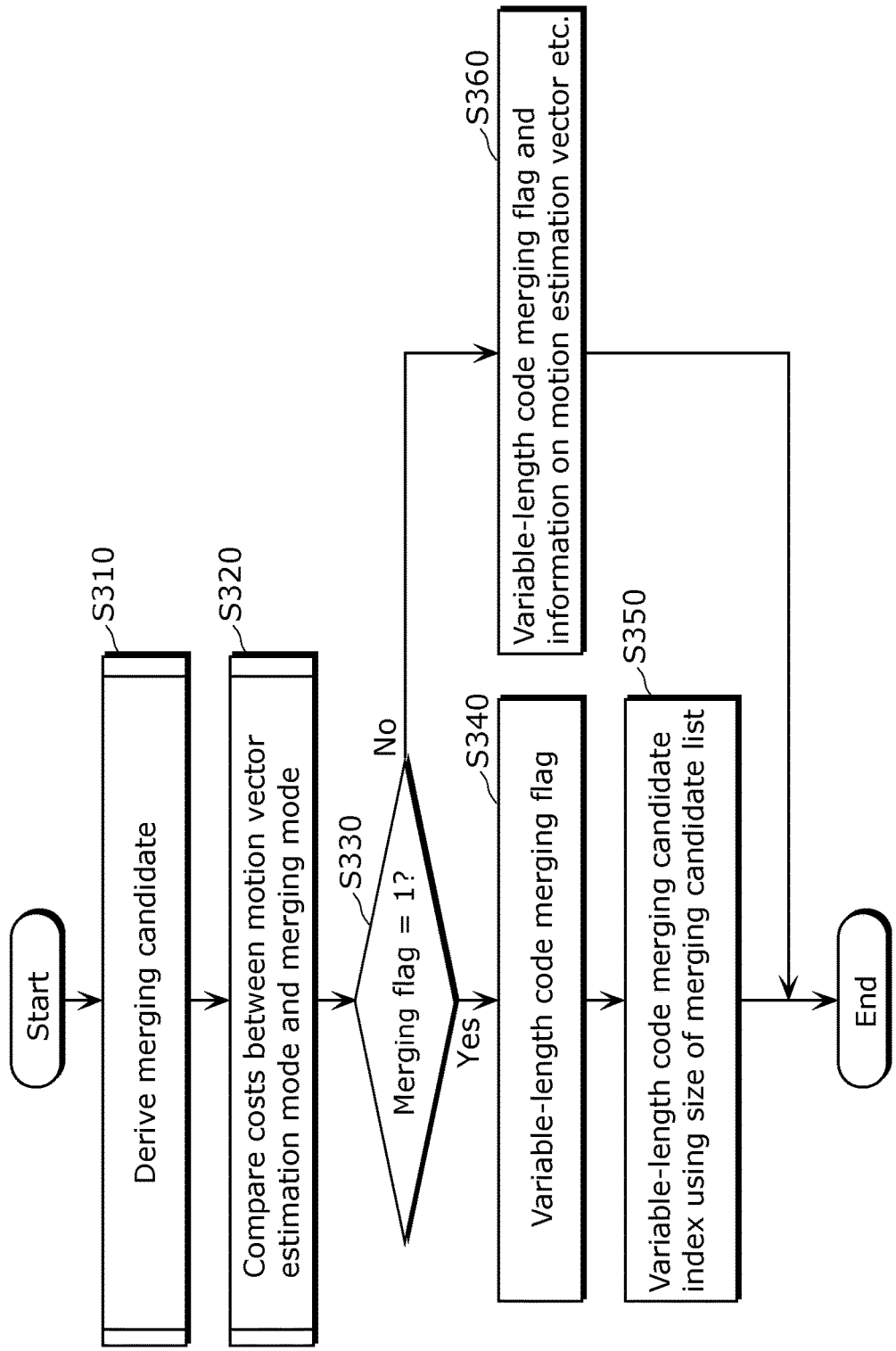
FIG. 15 is a flowchart showing processing operations of the picture coding apparatus according to Embodiment 3.

FIG. 15 is a flowchart showing processing operations of the picture coding apparatus 300 according to Embodiment 3.

In Step S310, the merging candidate derivation unit 314 derives merging candidates in the manner described in Embodiment 1.

In Step S320, the inter prediction control unit 311 selects a prediction mode based on comparison, using a method described later, between prediction error of a prediction picture generated using a motion vector derived by motion estimation and prediction error of a prediction picture generated using a merging candidate. The inter prediction control unit 311 sets the merging flag to "1" when the selected prediction mode is the merging mode, and sets the merging flag to "0" when otherwise. In Step S330, a determination is made as to whether or not the value of the merging flag is "1" (that is, the selected prediction mode is the merging mode).

When the result of the determination in Step S330 is true (Yes, S330), the variable-length-coding unit 316 attaches the merging flag to a bitstream in Step S340. In Step S350, the variable-length-coding unit 316 assigns a bit sequence according to the size of the merging candidate list as shown in FIG. 5 to the merging candidate index of merging candidates to be used for coding of the current picture. Then, the variable-length-coding unit 316 performs variable-length coding on the assigned bit sequence.

When the result of the determination in Step S330 is false (S333, No), the variable-length-coding unit 316 attaches a merging flag and information for motion estimation vector mode to a bitstream in Step S360.

Note that in Step S350, the variable-length-coding unit 316 need not attach a merging candidate index to a bitstream when, for example, the size of the merging candidate list is "1". The amount of information on the merging candidate index is thereby reduced.

Figure 16:
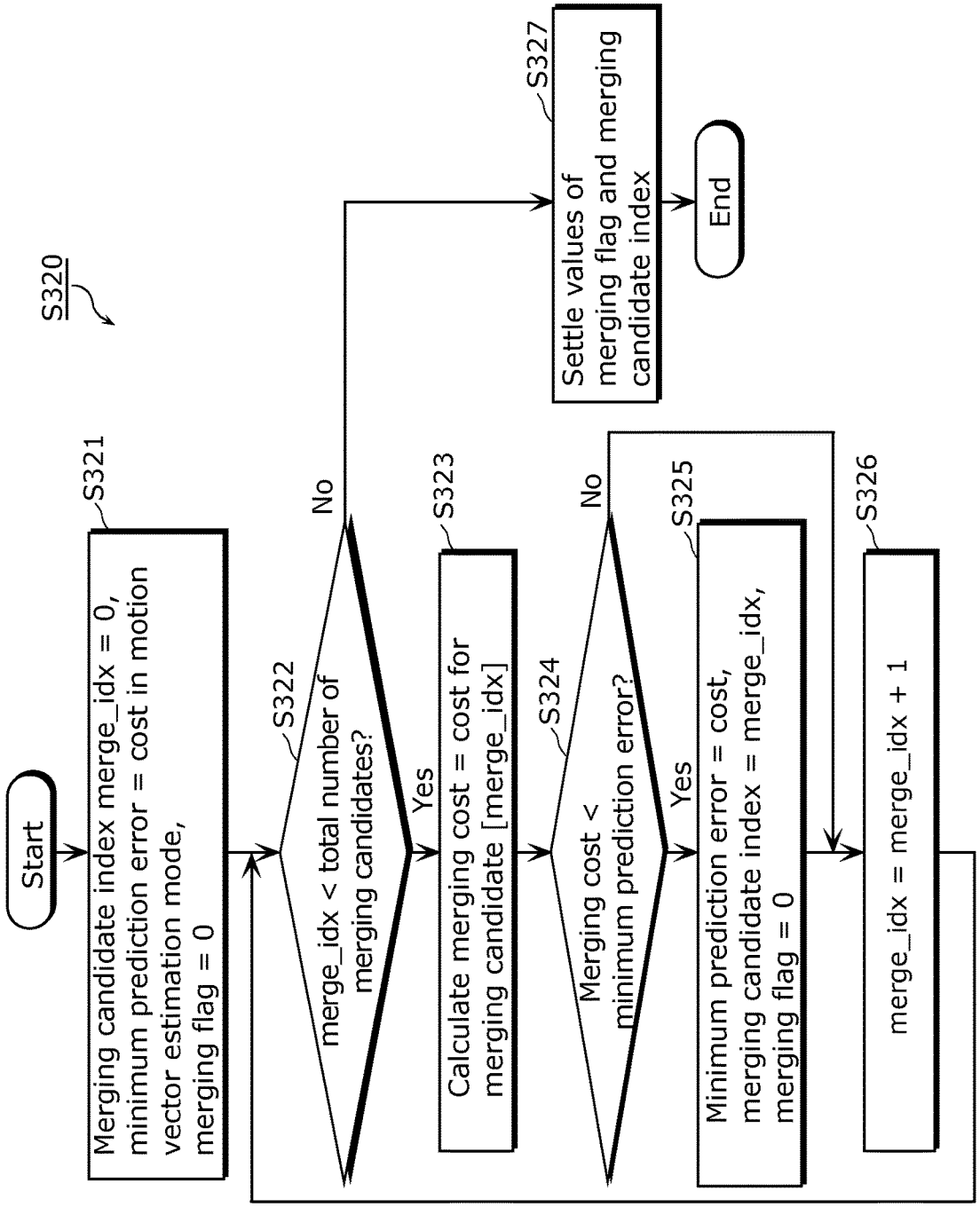
FIG. 16 is a flowchart showing the process for selecting a merging candidate according to Embodiment 3.

FIG. 16 is a flowchart showing details of the process in Step S320 in FIG. 15. Specifically, FIG. 16 illustrates a process for selecting a merging candidate. FIG. 16 will be described below.

In Step S321, the inter prediction control unit 311 initializes settings for the process. Specifically, the inter prediction control unit 311 sets a merging candidate index at "0", the minimum prediction error at the prediction error (cost) in the motion vector estimation mode, and a merging flag at "0". The cost is calculated using the following equation for an R-D optimization model, for example.

$$\text{Cost} = D + \lambda R \quad \text{(Equation 1)}$$

In Equation 1, D denotes coding distortion. For example, D is the sum of absolute differences between original pixel values of a current block to be coded and pixel values obtained by coding and decoding of the current block using a prediction picture generated using a motion vector. R denotes the amount of generated codes. For example, R is the amount of codes necessary for coding a motion vector used for generation of a prediction picture. $\lambda$ denotes an undetermined Lagrange multiplier.

In Step S322, the inter prediction control unit 311 determines whether or not the value of a merging candidate index is smaller than the total number of merging candidates of a current block. In other words, the inter prediction control unit 311 determines whether or not there is still any merging candidate on which the process from Step S323 to Step S325 has not been performed yet.

When the result of the determination in Step S322 is true (S322, Yes), in Step S323, the inter prediction control unit 311 calculates the cost for a merging candidate to which a merging candidate index is assigned. Then, in Step S324, the inter prediction control unit 311 determines whether or not the calculated cost for the merging candidate is smaller than the minimum prediction error.

When the result of the determination in Step S324 is true, (S324, Yes), the inter prediction control unit 311 updates the minimum prediction error, the merging candidate index, and the value of the merging flag in Step S325. When the result of the determination in Step S324 is false (S324, No), the inter prediction control unit 311 does not update the minimum prediction error, the merging candidate index, or the value of the merging flag.

In Step S326, the inter prediction control unit 311 increments the merging candidate index by one, and repeats the process from Step S322 to Step S326.

When the result of the determination in Step S322 is false (Step S322, No), that is, when there is no more merging candidate on which this process has not been performed, the inter prediction control unit 311 settles the values of the merging flag and the merging candidate index in Step S327.

Note that in Embodiment 3, it is not always necessary in the merging mode to attach a merging flag to a bitstream. For example, a merging flag need not be attached to a bitstream when the merging mode is forcibly selected for a current block which satisfies a predetermined condition. This reduces the amount of information, and coding efficiency thereby increases.

Note that the picture coding apparatus according to Embodiment 3 is not limited to the example described therein where the merging mode is used in which a current block is coded using a prediction direction, a motion vector, and a reference picture index copied from a neighboring block of the current block. For example, a current block may be coded in skip merging mode. In the skip merging mode, a current block is coded using a merging candidate as in the merging mode. When all items in prediction error data are "0" for the current block, a skip flag is set at "1" and the skip flag and a merging candidate index are attached to a bitstream. When prediction error includes an item which is not "0" for a current block, a skip flag is set at "0" and the skip flag, a merging flag, a merging candidate index, and the prediction error data are attached to a bitstream.

Note that the picture coding apparatus according to Embodiment 3 is not limited to the example described therein in which a current block is coded using a merging candidate. For example, a motion vector in the motion vector estimation mode may be coded using a merging candidate. Specifically, a difference may be calculated by subtracting a motion vector of a merging candidate indicated by a merging candidate index from a motion vector in the motion vector estimation mode. Then, the difference and the merging candidate index are attached to a bitstream. Optionally, a difference may be calculated by scaling a motion vector MV_Merge of a merging candidate using a reference picture index RefIdx_ME in the motion vector estimation mode and a reference picture index RefIdx_Merge of the merging candidate as represented by Equation 2, and subtracting a motion vector scaledMV_Merge of the merging candidate after the scaling from the motion vector in the motion vector estimation mode. Then, the calculated difference and the merging candidate index are attached to a bitstream.

$$\text{scaledMV\_Merge} = MV\_Merge \times (POC(\text{RefIdx\_ME}) - \text{curPOC})/(POC(\text{RefIdx \_Merge}) - \text{curPOC}) \quad \text{(Equation 2)}$$

Here, POC (RefIdx_ME) denotes the display order of reference picture indicated by a reference picture index RefIdx_ME. POC (RefIdx_Merge) denotes the display order of a reference picture indicated by a reference picture index RefIdx_Merge. curPOC denotes the display order of a current picture to be coded.

Embodiment 4

Embodiment 4 will be described below.

Figure 17:
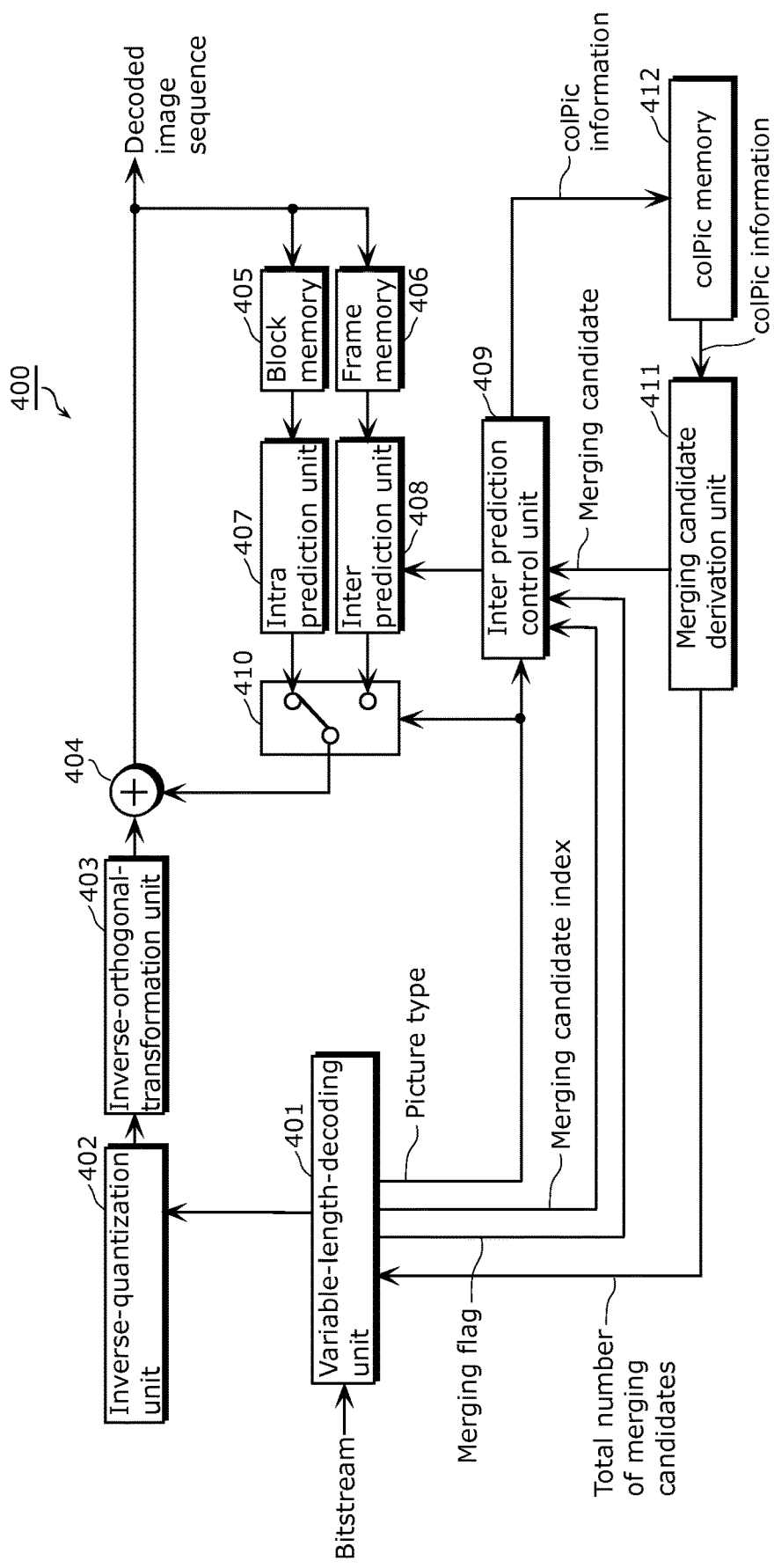
FIG. 17 is a block diagram showing a configuration of a picture decoding apparatus according to Embodiment 4.

FIG. 17 is a block diagram showing a configuration of a picture decoding apparatus 400 according to Embodiment 4. The picture decoding apparatus 400 is an apparatus corresponding to the picture coding apparatus 300 according to Embodiment 3. Specifically, for example, the picture decoding apparatus 400 decodes, on a block-by-block basis, coded pictures included in a bitstream generated by the picture coding apparatus 300 according to Embodiment 3.

As shown in FIG. 17, the picture decoding apparatus 400 includes a variable-length decoding unit 401, an inverse-quantization unit 402, an inverse-orthogonal-transformation unit 403, an adder 404, a block memory 405, a frame memory 406, an intra prediction unit 407, an inter prediction unit 408, an inter prediction control unit 409, a switch 410, a merging candidate derivation unit 411, and a colPic memory 412.

The variable-length-decoding unit 401 generates picture-type information, a merging flag, and a quantized coefficient by performing variable-length decoding on an input bitstream. Furthermore, the variable-length-decoding unit 401 variable-length decodes a merging candidate index using the size of a merging candidate list.

The inverse-quantization unit 402 inverse-quantizes the quantized coefficient obtained by the variable-length decoding.

The inverse-orthogonal-transformation unit 403 generates prediction error data by transforming an orthogonal transform coefficient obtained by the inverse quantization from frequency domain into picture domain.

The block memory 405 stores, in units of a block, decoded picture data generated by adding prediction error data and prediction picture data.

The frame memory 406 stores decoded picture data in units of a frame.

The intra prediction unit 407 generates prediction picture data of a current block by performing intra prediction using the decoded picture data stored in the block memory 405 in units of a block.

The inter prediction unit 408 generates prediction picture data of a current block by performing inter prediction using the decoded picture data stored in the frame memory 406 in units of a frame. For example, when a merging flag is set to 1, the inter prediction unit 408 generates prediction picture data of a current block by performing inter prediction using a merging candidate.

The switch 410 outputs, as prediction picture data of a current block, intra prediction picture data generated by the intra prediction unit 407 or inter prediction picture data generated by the inter prediction unit 408 to the adder 404.

The merging candidate derivation unit 411 performs processes for deriving merging candidates (the first derivation process and the second derivation process) using at least two different derivation methods (the first derivation method and the second derivation method) as in Embodiment 3. For example, the merging candidate derivation unit 411 derives merging candidates using neighboring blocks of a current block and colPic information stored in the colPic memory 412. The colPic information indicates information on a co-located block of the current block, such as a motion vector.

The merging candidate derivation unit 411 limits the total number of first merging candidates derived using the first derivation method but does not limit the total number of second merging candidate derived using the second derivation method. In other words, the merging candidate derivation unit 411 derives first merging candidates so that the total number of first merging candidates does not exceed a predetermined number. When the total number of derived first merging candidates is less than the size of a merging candidate list, the merging candidate derivation unit 411 derives second merging candidates until the total number of the derived first and second merging candidates becomes equivalent to the size of the merging candidate list.

In this manner, the total number of first merging candidates is limited and the total number of second merging candidates is not limited. The merging candidate derivation unit 411 can therefore derive a variety of merging candidates. Furthermore, the merging candidate derivation unit 411 derives merging candidates until the total number of derived merging candidates becomes equivalent to the size of the merging candidate list. The merging candidate list is therefore more likely to include a merging candidate having a motion vector for accurate prediction.

Furthermore, the merging candidate derivation unit 411 assigns merging candidate indices to the derived merging candidates. Then, the merging candidate derivation unit 411 transmits the merging candidates and the merging candidate indices to the inter prediction control unit 409. Furthermore, the merging candidate derivation unit 411 transmits the total number of the derived merging candidates (the number of merging candidates) to the variable-length-decoding unit 401.

The inter prediction control unit 409 causes the inter prediction unit 408 to generate an inter prediction picture using information for motion vector estimation mode, when a decoded merging flag has a value of "0". When a decoded merging flag has a value of "1", the inter prediction control unit 409 selects, based on a decoded merging candidate index, a merging candidate for inter prediction from the derived merging candidates. Then, the inter prediction control unit 409 causes the inter prediction unit 408 to generate an inter prediction picture using the selected merging candidate. Furthermore, the inter prediction control unit 409 transfers colPic information including the motion vector of the current block to the colPic memory 412.

Finally, the adder 404 generates decoded picture data by adding prediction picture data and prediction error data.

Figure 18:
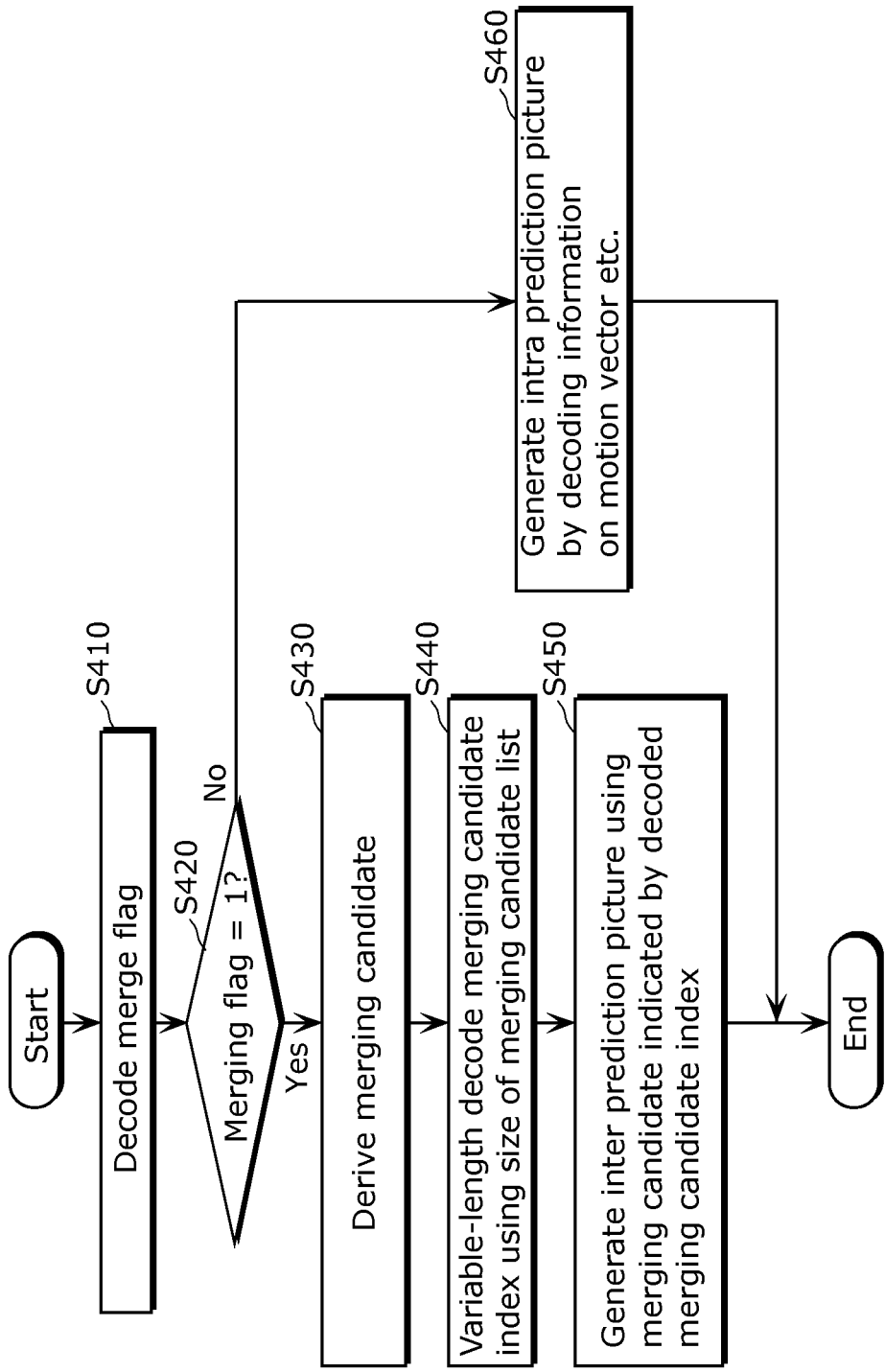
FIG. 18 is a flowchart showing processing operations of the picture decoding apparatus according to Embodiment 4.

FIG. 18 is a flowchart showing processing operations of the picture decoding apparatus 400 according to Embodiment 4.

In Step S414, the variable-length-decoding unit 401 decodes a merging flag.

When it is determined in Step S420 that the merging flag has a value of "1" (S420, Yes), a merging candidate is derived in Step S430 using the same method as the method used in Step S310 in FIG. 15.

In Step S440, the variable-length-decoding unit 401 performs variable-length decoding on a merging candidate index from a bitstream using the size of a merging candidate list.

In Step S450, the inter prediction control unit 409 generates inter prediction picture using a prediction direction, a motion vector, and a reference picture index which are included in the merging candidate indicated the decoded merging index.

When it is determined in Step S420 that the merging flag has a value of "0" (S420, No), in Step S460, the inter prediction unit 408 generates an inter prediction picture using information for motion vector estimation mode decoded by the variable-length-decoding unit 401.

Optionally, when the total number of merging candidates (the size of merging candidate list) derived in Step S430 is "1", a merging candidate index may be assumed to be "0" instead of being decoded.

Embodiment 5

In Embodiment 5, a process for deriving a zero merging candidate will be described in detail using drawings. The process for deriving a zero merging candidate described herein is an example of the first derivation process or the second derivation process.

Figure 19:
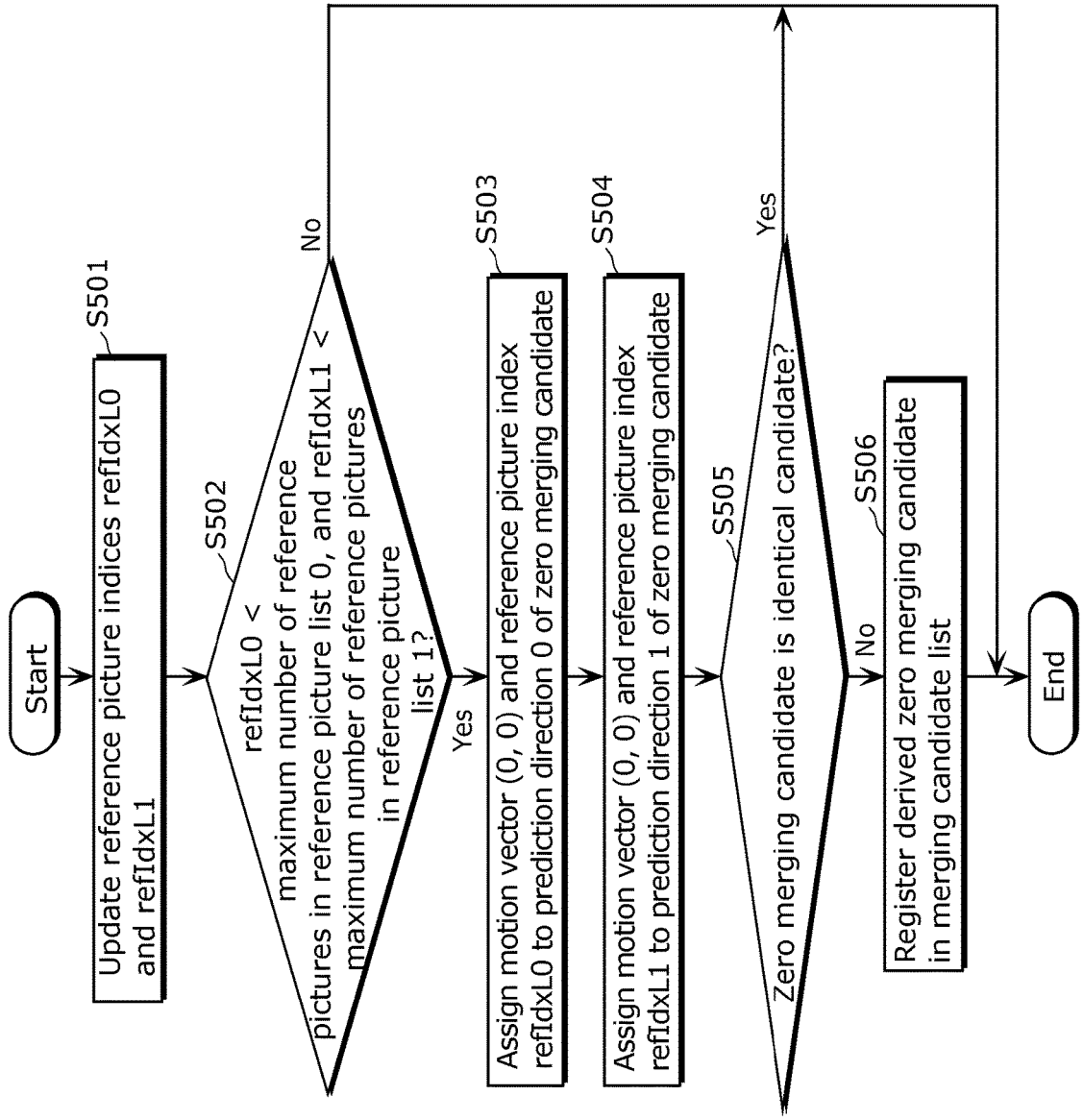
FIG. 19 is a flowchart showing derivation of a zero merging candidate according to Embodiment 5.

FIG. 19 is a flowchart showing the process for deriving a zero merging candidate according to Embodiment 5. Specifically, FIG. 19 shows part of processing operations of the merging candidate derivation unit 110, 210, 314, or 411 in Embodiments 1 to 4. In other words, FIG. 19 shows processing operations of the first derivation unit or the second derivation unit.

In Step S501, the merging candidate derivation unit updates the value of reference picture index refIdxL0 for the prediction direction 0 and the value of reference picture index refIdxL1 for the prediction direction 1 which are to be used for deriving a zero merging candidate. The reference picture indices refIdxL0 and refIdxL1 each have an initial value of "−1", and are incremented by "+1" each time the process in Step S501 is performed.

Specifically, in the first cycle of the process for deriving a merging candidate, a zero merging candidate including a motion vector having a value of zero (zero vector) and a reference picture index having a value of 0 is added to a merging candidate list as a zero merging candidate for stationary region. Next, in the second cycle of the process for deriving a merging candidate, a zero merging candidate including a motion vector having a value of zero (zero vector) and a reference picture index having a value of 1 is added to a merging candidate list.

In Step S502, the merging candidate derivation unit determines whether it is true or false that (i) the updated value of the reference picture index refIdxL0 for the prediction direction 0 is smaller than a maximum number of reference pictures in the reference picture list 0 for the prediction direction 0 and (ii) the updated value of the reference picture index refIdxL1 for the prediction direction 1 is smaller than a maximum number of reference pictures in the reference picture list 1 for the prediction direction 1.

When the result of the determination in Step S502 is true, (S502, Yes), the merging candidate derivation unit assigns a motion vector (0, 0) and the reference picture index refIdxL0 to the motion vector and reference picture index for the prediction direction 0 of the zero merging candidate in Step S503. Moreover, in Step S504, the merging candidate derivation unit assigns a motion vector (0, 0) and the reference picture index refIdxL1 to the motion vector and reference picture index for the prediction direction 1 of the zero merging candidate.

Figure 20:
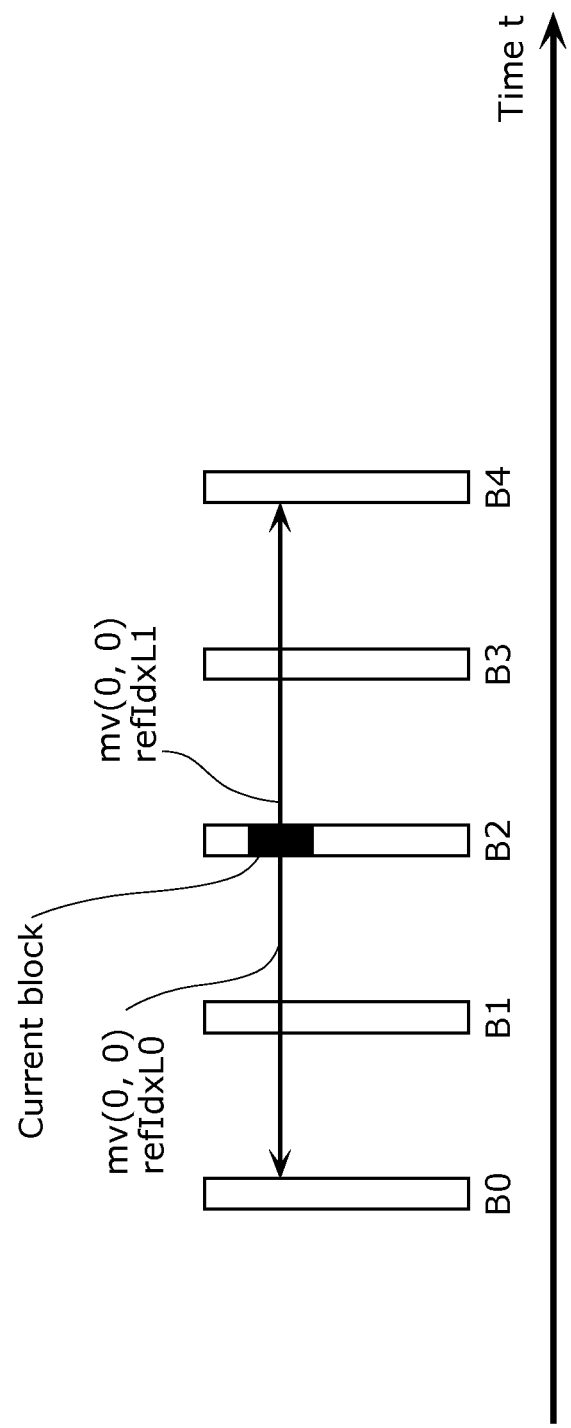
FIG. 20 shows an example of a derived zero merging candidate in Embodiment 5.

The merging candidate derivation unit thereby derives a bi-predictive zero merging candidate by the processes in Step S503 and Step S504. FIG. 20 shows an example of a derived zero merging candidate.

In Step S505, the merging candidate derivation unit determines whether or not the merging candidate list already includes a merging candidate which is identical in prediction direction, motion vector, and reference picture index to the derived zero merging candidate. In other words, the merging candidate derivation unit determines whether or not the derived zero merging candidate is an identical candidate.

When the result of Step S505 is false (S505, No), the merging candidate derivation unit registers the derived zero merging candidate in the merging candidate list in Step S506.

When the result of the determination in Step S502 is false (S502, No) or the result of the determination in Step S505 is true (S505, Yes), the merging candidate derivation unit does not register the derived zero merging candidate in the merging candidate list in Step S506.

The merging candidate derivation unit thereby derives a zero merging candidate which has a motion vector having zero values to referable reference pictures. Next, the merging candidate derivation unit adds the derived zero merging candidate to the merging candidate list. The picture coding apparatus thus can increase efficiency of coding in merging mode especially when a current block to be coded is a stationary region.

Note that the picture coding apparatus is not limited to the example described in Embodiment 5, in which a bi-predictive zero merging candidate is derived using a motion vector having zero values, a reference picture index for the prediction direction 0, and a reference picture index for the prediction direction 1. For example, the merging candidate derivation unit may derive a zero merging candidate for the prediction direction 0 using a motion vector having zero values and a reference picture index for the prediction direction 0. Similarly, the merging candidate derivation unit may derive a zero merging candidate for the prediction direction 1 using a motion vector having zero values and a reference picture index for the prediction direction 1.

Note that the picture coding apparatus is not limited to the example described in Embodiment 5, in which zero merging candidates are derived using reference picture indices starting from the value of 0 and incremented by +1. For example, the merging candidate derivation unit may derive zero merging candidates using reference picture indices in ascending order of distance from a current picture to reference pictures in display order.

Note that the picture coding apparatus is not limited to the example described in Embodiment 5, in which the merging candidate derivation unit determines in Step S505 in FIG. 19 whether or not a zero merging candidate is an identical candidate. For example, the merging candidate derivation unit may skip the determination in Step S505. This reduces computational complexity in deriving a merging candidate for the merging candidate derivation unit.

The merging candidate derivation unit according to Embodiment 5 thereby derives, as a first merging candidate or a second merging candidate, a merging candidate including zero vectors which are motion vectors for a stationary region, and coding efficiency therefore increases. More specifically, the merging candidate derivation unit derives a merging candidate including a motion vector which is a zero vector to a referable reference picture, and newly registers the derived merging candidate in a merging candidate list. The merging candidate derived in this manner is reliable when the current block is a stationary region, and coding efficiency therefore increases.

Note that the picture coding apparatus is not limited to the example described in Embodiment 5, in which a derived merging candidate includes a motion vector for a stationary region which is a zero vector. For example, a derived merging candidate may include a motion vector having a value slightly larger or smaller than a zero vector (0, 0) (for example, a motion vector (0, 1)) with consideration for small camera shake during video shooting. Optionally, a derived merging candidate may have a motion vector (OffsetX, OffsetY) which is provided by adding an offset parameter (OffsetX, OffsetY) to a header or the like of a sequence, a picture, or a slice.

Embodiment 6

In Embodiment 6, a process for deriving a combined merging candidate will be described in detail using a drawing. The process for deriving a combined merging candidate described herein is an example of the first derivation process or the second derivation process.

Figure 21:
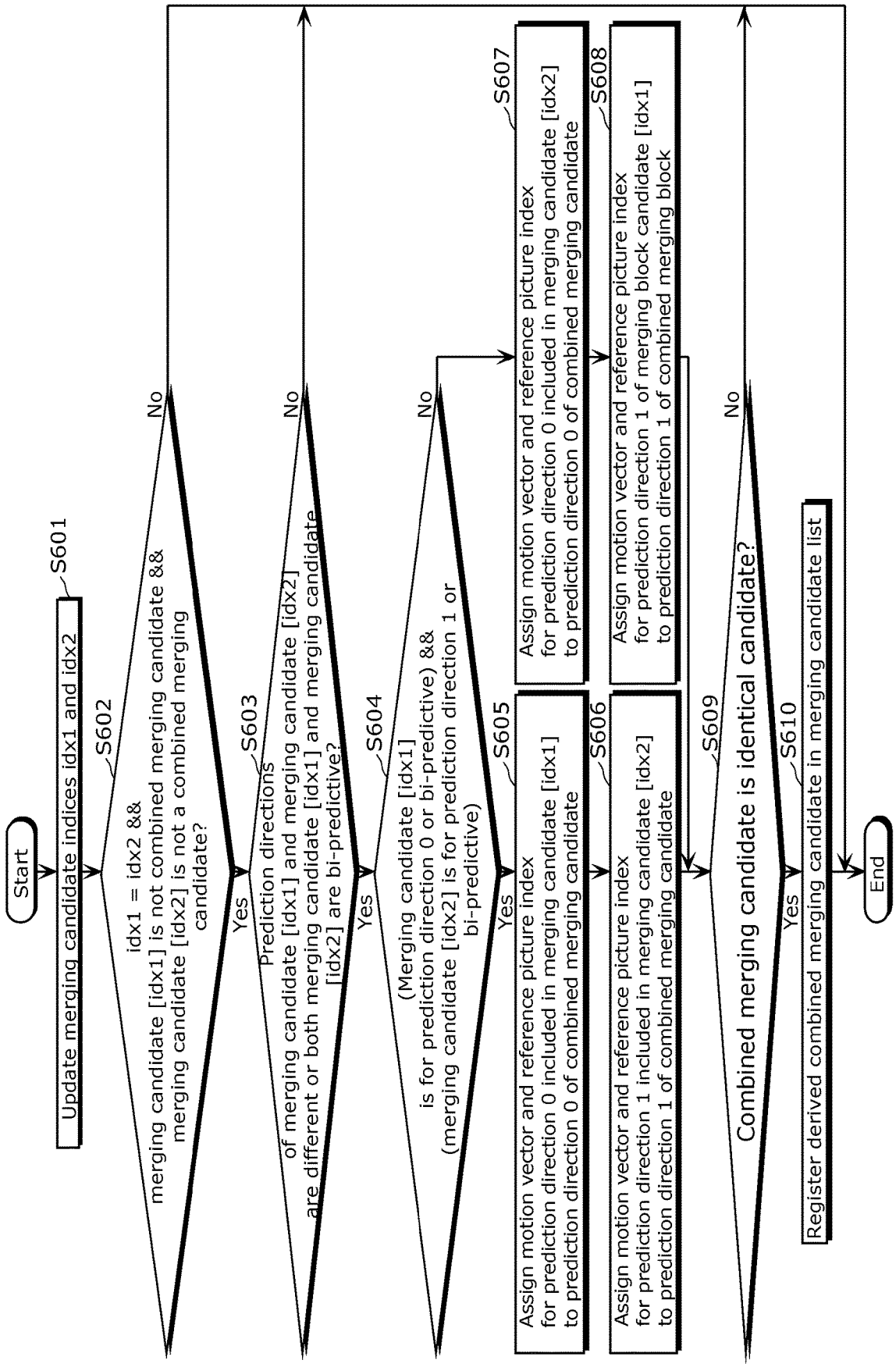
FIG. 21 is a flowchart showing derivation of a combined merging candidate according to Embodiment 6.

FIG. 21 is a flowchart showing the process for deriving a combined merging candidate according to Embodiment 6. Specifically, FIG. 21 shows part of processing operations of the merging candidate derivation unit 110, 210, 314, or 411 in Embodiments 1 to 4. In other words, FIG. 21 shows processing operations of the first derivation unit or the second derivation unit.

In Step S601, the merging candidate derivation unit updates merging candidate indices idx1 and idx2. The merging candidate indices idx1 and idx2 are indices for determining two merging candidates to be used for deriving a combined merging candidate.

For example, the merging candidate derivation unit updates merging candidate indices idx1 and idx2 to "0" and "1", respectively. In this case, the merging candidate derivation unit performs Steps S602 to S610 described below to derive a combined merging candidate by combining a set of a prediction direction, a motion vector, and a reference picture index included in a merging candidate [0] and a set of a prediction direction, a motion vector, and a reference picture index included in a merging candidate [1]. The merging candidate [0] is a merging candidate provided with a merging candidate index having a value of 0 in a merging candidate list, and the merging candidate [1] is a merging candidate provided with a merging candidate index having a value of 1 in the merging candidate list. The merging candidate derivation unit updates merging candidate indices idx1 and idx2 in Step S601 for each cycle of derivation of a combined merging candidate. Note that details of the process for updating the merging candidate indices idx1 and idx2 is not limited to a specific procedure. Any procedure is applicable through which a combined merging candidate is derived using any combination of merging candidates derived before the derivation of the combined merging candidate.

In Step S602, the merging candidate derivation unit determines whether it is true or false that (1) the values of the merging candidate indices idx1 and idx2 are not identical, (2) a merging candidate [idx1] is not a combined merging candidate, and (3) a merging candidate [idx2] is not a combined merging candidate.

When the result of the determination in Step S602 is true (S142, Yes), the merging candidate derivation unit determines in Step S603 whether at least one of the following is true: (1) the prediction directions of the merging candidate [idx1] and the merging candidate [idx2] are different; and (2) both the merging candidate [idx1] and the merging candidate [idx2] are bi-predictive. When the result of the determination in Step S603 is true, (S603, Yes), the merging candidate derivation unit determines in Step S604 whether both of the following are true: (1) the merging candidate [idx1] is a merging candidate for the prediction direction 0 or bi-predictive; and (2) the merging candidate [idx2] is a merging candidate for the prediction direction 1 or bi-predictive. In other words, the merging candidate derivation unit determines whether it is true or false that the merging candidate [idx1] includes at least a motion vector having the prediction direction 0, and the merging candidate [idx2] includes at least a motion vector having the prediction direction 1.

When the result of the determination in Step S604 is true (S604, Yes), the merging candidate derivation unit in Step S605 assigns the motion vector and reference picture index for the prediction direction 0 which are included in the merging candidate [idx1] to the motion vector and reference picture index for the prediction direction 0 of the combined merging candidate. Moreover, in Step S606, the merging candidate derivation unit assigns the motion vector and reference picture index for the prediction direction 1 which are included in the merging candidate [idx2] to the motion vector and reference picture index for the prediction direction 1 of the combined merging candidate. The merging candidate derivation unit thereby derives a bi-predictive combined merging candidate.

When the result of the determination in Step S604 is false (S604, No), the merging candidate derivation unit in Step S607 assigns the motion vector and reference picture index for the prediction direction 0 which are included in the merging candidate [idx2] to the motion vector and reference picture index for the prediction direction 0 of the combined merging candidate. Moreover, in Step S608, the merging candidate derivation unit assigns the motion vector and reference picture index for the prediction direction 1 which are included in the merging candidate [idx1] to the motion vector and reference picture index for the prediction direction 1 of the combined merging candidate. The merging candidate derivation unit thereby derives a bi-predictive combined merging candidate.

In Step S609, the merging candidate derivation unit determines whether or not the merging candidate list already includes a merging candidate which is identical in prediction direction, motion vector, and reference picture index to the derived combined merging candidate. In other words, the merging candidate derivation unit determines whether or not the derived combined merging candidate is an identical candidate.

When the result of Step S609 is false (S609, No), the merging candidate derivation unit registers the derived combined merging candidate in the merging candidate list in Step S610.

When the result of the determination in Step S602 or Step S603 is false (S602 or S603, No), the merging candidate derivation unit does not register the derived combined merging candidate in the merging candidate list.

In this manner, the merging candidate derivation unit derives a combined merging candidate and registers the derived combined merging candidate in a merging candidate list.

Note that the picture coding apparatus is not limited to the example described in Embodiment 6, in which the merging candidate derivation unit determines in Step S609 whether or not a combined merging candidate is an identical candidate. For example, the merging candidate derivation unit may skip the determination in Step S609. This reduces computational complexity in deriving a merging candidate for the merging candidate derivation unit.

In this manner, the merging candidate derivation unit according to Embodiment 6 derives a bi-predictive merging candidate by making a combination from previously derived merging candidates. The merging candidate derivation unit is thus capable of deriving a new bi-predictive first merging candidate even when previously derived merging candidates include no bi-predictive merging candidate. As a result, the merging candidate derivation unit increases the variety of merging candidates, and coding efficiency thereby increases.

Embodiment 7

In Embodiment 7, a process for deriving a scaling merging candidate will be described in detail using drawings. The process for deriving a scaling merging candidate described herein is an example of the first derivation process or the second derivation process.

Figure 22:
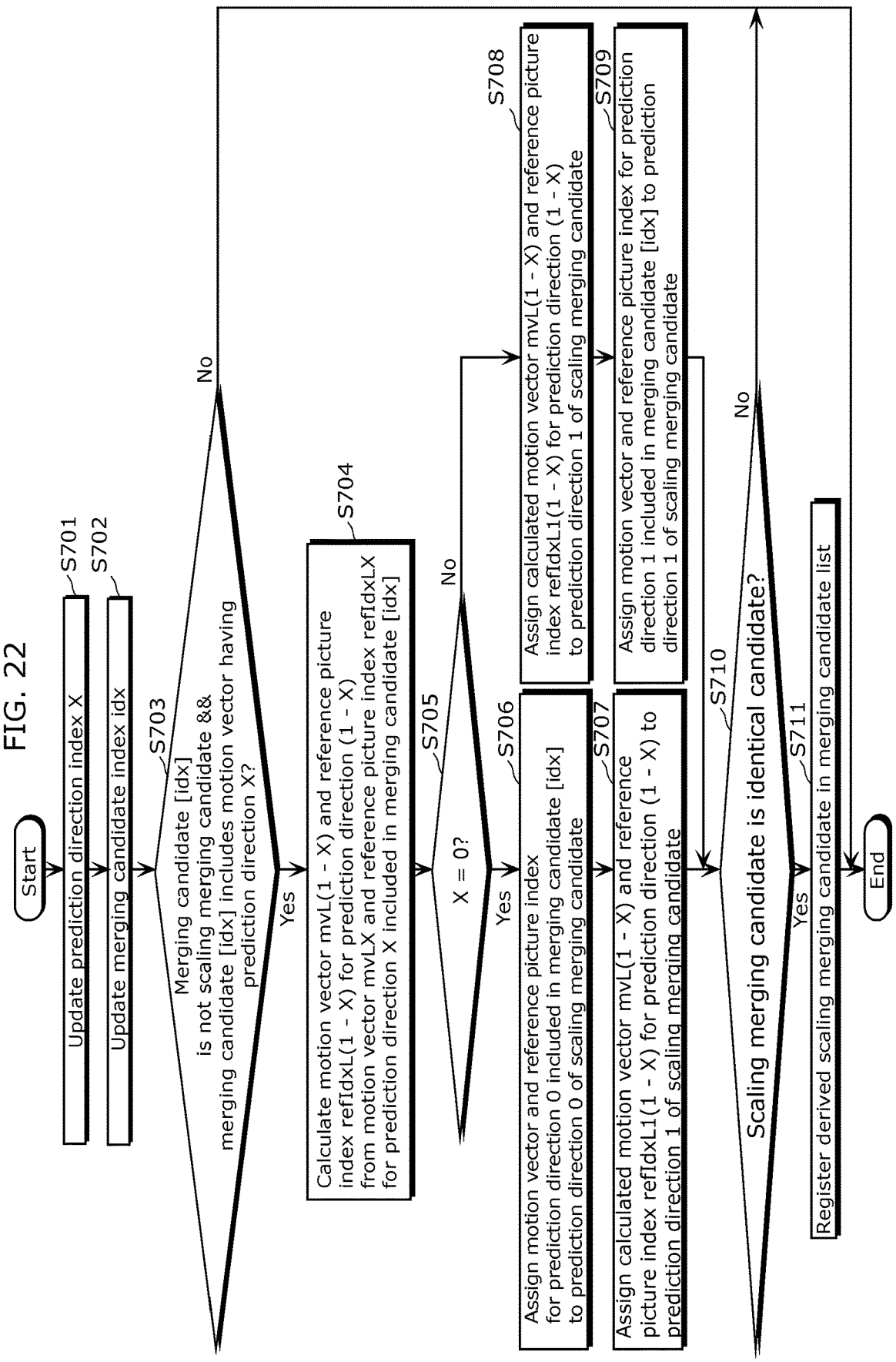
FIG. 22 is a flowchart showing derivation of a scaling merging candidate according to Embodiment 7.

FIG. 22 is a flowchart showing the process for deriving a scaling merging candidate according to Embodiment 7. Specifically, FIG. 22 shows part of processing operations of the merging candidate derivation unit 110, 210, 314, or 411 in Embodiments 1 to 4. In other words, FIG. 22 shows processing operations of the first derivation unit or the second derivation unit.

In Step S701, the merging candidate derivation unit updates a prediction direction index X. In Step S702, the merging candidate derivation unit updates a merging candidate index idx. The prediction direction index X and the merging candidate index idx are indices for determination of a prediction direction and a merging candidate which are used for deriving a scaling merging candidate.

For example, the merging candidate derivation unit updates the prediction direction index X to "0" and the merging candidate index idx to "0". In this case, the merging candidate derivation unit performs Steps S702 to S711 described below to derive a scaling merging candidate using a motion vector and a reference picture index for a prediction direction 0 included in a merging candidate [0], which is provided with a merging candidate index of 0 in a merging candidate list. The merging candidate derivation unit updates the prediction direction X in Step S701 and the merging candidate index idx in Step S702 for each cycle of derivation of a scaling merging candidate.

In Step S703, the merging candidate derivation unit determines whether it is true or false that (i) the merging candidate [idx] is not a scaling merging candidate and (ii) the merging candidate [idx] includes a motion vector having a prediction direction X. When the result of the determination in Step S703 is true (S703, Yes), the merging candidate derivation unit in Step S704 calculates a motion vector mvL(1−X) and a reference picture index refIdxL(1−X) for a prediction direction (1−X) using the motion vector mvLX and reference picture index refIdxLX for the prediction direction X which are included in the merging candidate [idx]. For example, the merging candidate derivation unit calculates the mvL(1−X) and refIdxL(1−X) using Equations 2 and 3 shown below.

$$refIdxL(1-X)=refIdxLX \quad \text{(Equation 3)}$$

$$mvL(1-X)=mvLX \times (POC(refIdxL(1-X))-curPOC)/(POC(refIdxLX)-curPOC) \quad \text{(Equation 4)}$$

POC (refIdxLX) denotes the display order of a reference picture indicated by a reference picture index refIdxLX. POC (refIdxLX (1−X)) denotes the display order of a reference picture indicated by a reference picture index refIdxLX (1−X). curPOC denotes the display order of a current picture to be coded.

Figure 23:
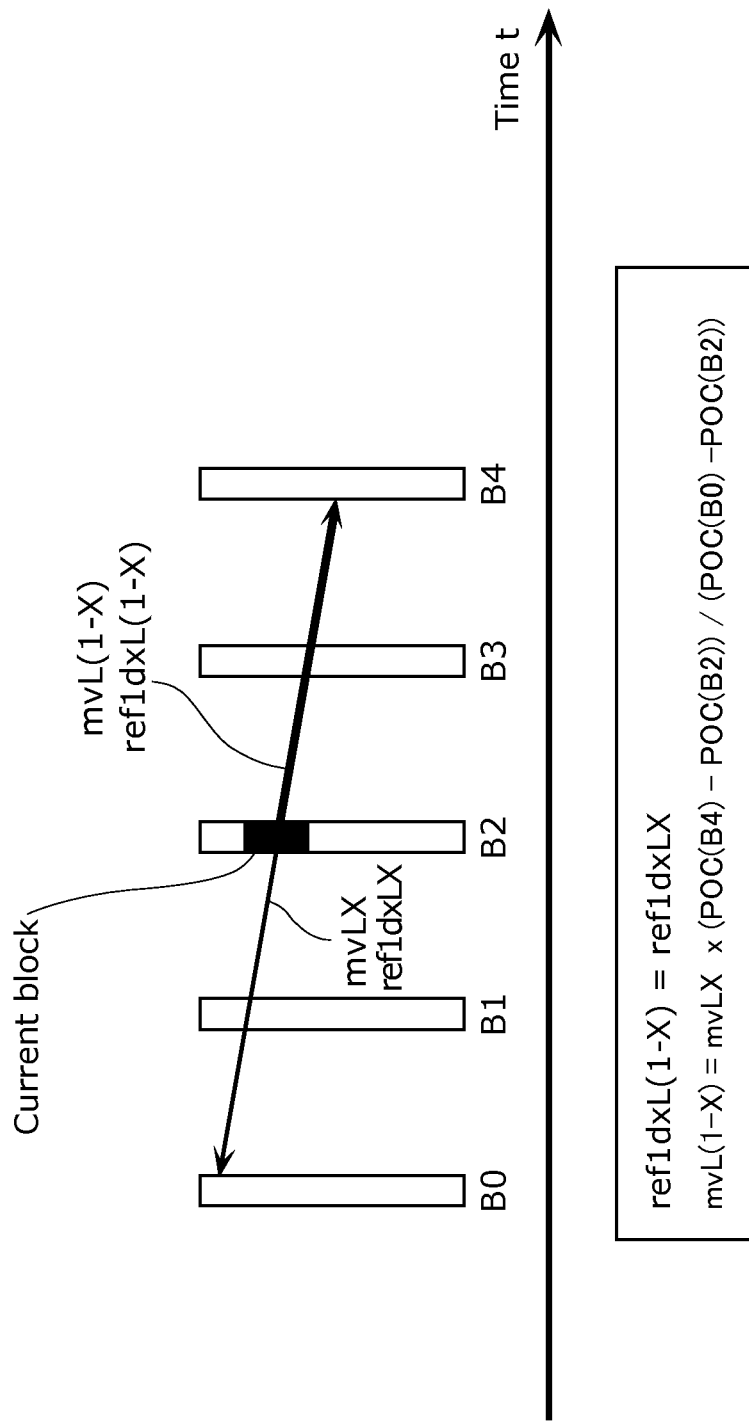
FIG. 23 shows an example of a motion vector and a reference picture index calculated in Embodiment 7.

FIG. 23 shows an example of a motion vector and a reference picture index calculated in Embodiment 7. As shown in FIG. 23, the merging candidate derivation unit performs scaling using a motion vector mvLX and a reference picture index refIdxLX, which are a motion vector and a reference picture index for one prediction direction (prediction direction X) and included in a merging candidate, to calculate a motion vector mvL(1−X) and a reference picture index refIdxL(1−X), which are a motion vector and a reference picture index for the other prediction direction (a prediction direction (1−X)).

In Step S705, the merging candidate derivation unit determines whether or not the value of the prediction direction index X is "0". When the result of the determination in Step S705 is true (S705, Yes), the merging candidate derivation unit in Step S706 assigns the motion vector and reference picture index for the prediction direction 0 which are included in the merging candidate [idx1] to the motion vector and reference picture index for the prediction direction 0 of the scaling merging candidate. Moreover, in Step S707, the merging candidate derivation unit assigns the calculated motion vector mvL(1−X) and reference picture index refIdxL1(1−X) for the prediction direction (1−X) to the motion vector and reference picture index for the prediction direction 1 of the scaling merging candidate. The merging candidate derivation unit thereby derives a bi-predictive scaling merging candidate.

When the result of the determination in Step S705 is false (that is, when the value of the prediction direction X is "1") (S705, No), the merging candidate derivation unit in Step S708 assigns the calculated motion vector mvL(1−X) and reference picture index refIdxL1(1−X) for the prediction direction (1−X) to the motion vector and reference picture index for the prediction direction 0 of the scaling merging candidate. Moreover, in Step S709, the merging candidate derivation unit assigns the motion vector and reference picture index for the prediction direction X which are included in the merging candidate [idx] to the motion vector and reference picture index for the prediction direction 1 of the scaling merging candidate. The merging candidate derivation unit thereby derives a bi-predictive scaling merging candidate.

In Step S710, the merging candidate derivation unit determines whether or not the merging candidate list already includes a merging candidate which is identical in prediction direction, motion vector, and reference picture index to the derived scaling merging candidate. In other words, the merging candidate derivation unit determines whether or not the derived scaling merging candidate is an identical candidate.

When the result of Step S710 is false (S710, No), the merging candidate derivation unit registers the derived scaling merging candidate in the merging candidate list in Step S711.

When the result of the determination in Step S703 is false (S703, No), or when the result of the determination in Step S710 is true (S710, Yes), the merging candidate derivation unit does not register the derived scaling merging candidate in the merging candidate list.

In this manner, the merging candidate derivation unit derives a scaling merging candidate and registers the derived scaling merging candidate in a merging candidate list.

Note that the merging candidate derivation unit need not add a derived scaling merging candidate to a merging candidate list when POC (refIdxLX) and POC (refIdxL(1−X)) are identical (that is, refIdxLX and refIdxL(1−X) indicates the same picture), and thus providing mvL(1−X) and mvLX having the same values. Also note that when the value of a calculated refIdxL(1−X) is not included in a reference picture list L(1−X), the merging candidate derivation unit need not register a scaling merging candidate in a merging candidate list.

Optionally, the merging candidate derivation unit may calculate mvL(1−X) by directly assigning− mvLX to mvL (1−X) only when a condition that the values of POC (refIdxLX) and POC (refIdxL(1−X)) are different and a condition that the absolute values of (POC (refIdxL(1−X))−curPOC) and (POC (refIdxLX)− curPOC) are equal are both satisfied. The former condition is satisfied when the picture indicated by refIdxLX and the picture indicated by refIdxL (1−X) are different. The latter condition is satisfied when the picture indicated by refIdxLX and the picture indicated by refIdxL(1−X) are equidistant in display order from the current picture. When both are satisfied, mvL(1−X) is the inverse vector of mvLX. When this is the case, the merging candidate derivation unit can derive a scaling merging candidate without performing the scaling represented by Equation 4. Coding efficiency thereby increases with a small increase in computational complexity.

Note that the picture coding apparatus is not limited to the example described in Embodiment 7, in which the merging candidate derivation unit determines in Step S710 whether or not a scaling merging candidate is an identical candidate. For example, the merging candidate derivation unit may skip the determination in Step S710. This reduces computational complexity in deriving a merging candidate for the merging candidate derivation unit.

Although the picture coding apparatus and picture decoding apparatus according to one or more aspects of the present disclosure have been described using exemplary embodiments, the present invention is not limited to the exemplary embodiments. Those skilled in the art will readily appreciate that many modifications of the exemplary embodiments or embodiments in which the constituent elements of the exemplary embodiments are combined are possible without materially departing from the novel teachings and advantages described in the present disclosure. All such modifications and embodiments are also within scopes of the one or more aspects.

In the exemplary embodiments, each of the constituent elements may be implemented as a piece of dedicated hardware or implemented by executing a software program appropriate for the constituent element. The constituent elements may be implemented by a program execution unit such as a CPU or a processor which reads and executes a software program recorded on a recording medium such as a hard disk or a semiconductor memory. Here, examples of the software program which implements the picture coding apparatus or the picture decoding apparatus in the embodiments include a program as follows.

One is a program which causes a computer to execute a picture coding method for coding a picture on a block-by-block basis to generate a bitstream, and the method includes: performing a first derivation process for deriving a first merging candidate which includes a candidate set of a prediction direction, a motion vector, and a reference picture index for use in coding of a current block; performing a second derivation process for deriving a second merging candidate which includes a candidate set of a prediction direction, a motion vector, and a reference picture index for use in the coding of the current block, the second derivation process being different from the first derivation process; selecting a merging candidate to be used in the coding of the current block from among the first merging candidate and the second merging candidate; and attaching an index for identifying the selected merging candidate to the bitstream, wherein in the performing of a first derivation process, the first derivation process is performed so that a total number of the first merging candidates does not exceed a predetermined number, and the second derivation process is performed when the total number of the first merging candidates is less than a predetermined maximum number of merging candidates.

Another is a program which causes a computer to execute a picture decoding method for decoding, on a block-by-block basis, a coded image included in a bitstream, and the method includes: performing a first derivation process for deriving a first merging candidate which includes a candidate set of a prediction direction, a motion vector, and a reference picture index for use in decoding of a current block; performing a second derivation process for deriving a second merging candidate which includes a candidate set of a prediction direction, a motion vector, and a reference picture index for use in the decoding of the current block, the second derivation process being different from the first derivation process; obtaining an index from the bitstream; and selecting, based on the obtained index, a merging candidate to be used in the decoding of the current block from among the first merging candidate and the second merging candidate, wherein in the performing of a first derivation process, the first derivation process is performed so that a total number of the first merging candidates does not exceed a predetermined number, and the second derivation process is performed when the total number of the first merging candidates is less than a predetermined maximum number of merging candidates.

Embodiment 8

The processing described in each of embodiments can be simply implemented in an independent computer system, by recording, in a recording medium, a program for implementing the configurations of the moving picture coding method (image coding method) and the moving picture decoding method (image decoding method) described in each of embodiments. The recording media may be any recording media as long as the program can be recorded, such as a magnetic disk, an optical disk, a magnetic optical disk, an IC card, and a semiconductor memory.

Hereinafter, the applications to the moving picture coding method (image coding method) and the moving picture decoding method (image decoding method) described in each of embodiments and systems using thereof will be described. The system has a feature of having an image coding and decoding apparatus that includes an image coding apparatus using the image coding method and an image decoding apparatus using the image decoding method. Other configurations in the system can be changed as appropriate depending on the cases.

Figure 24:
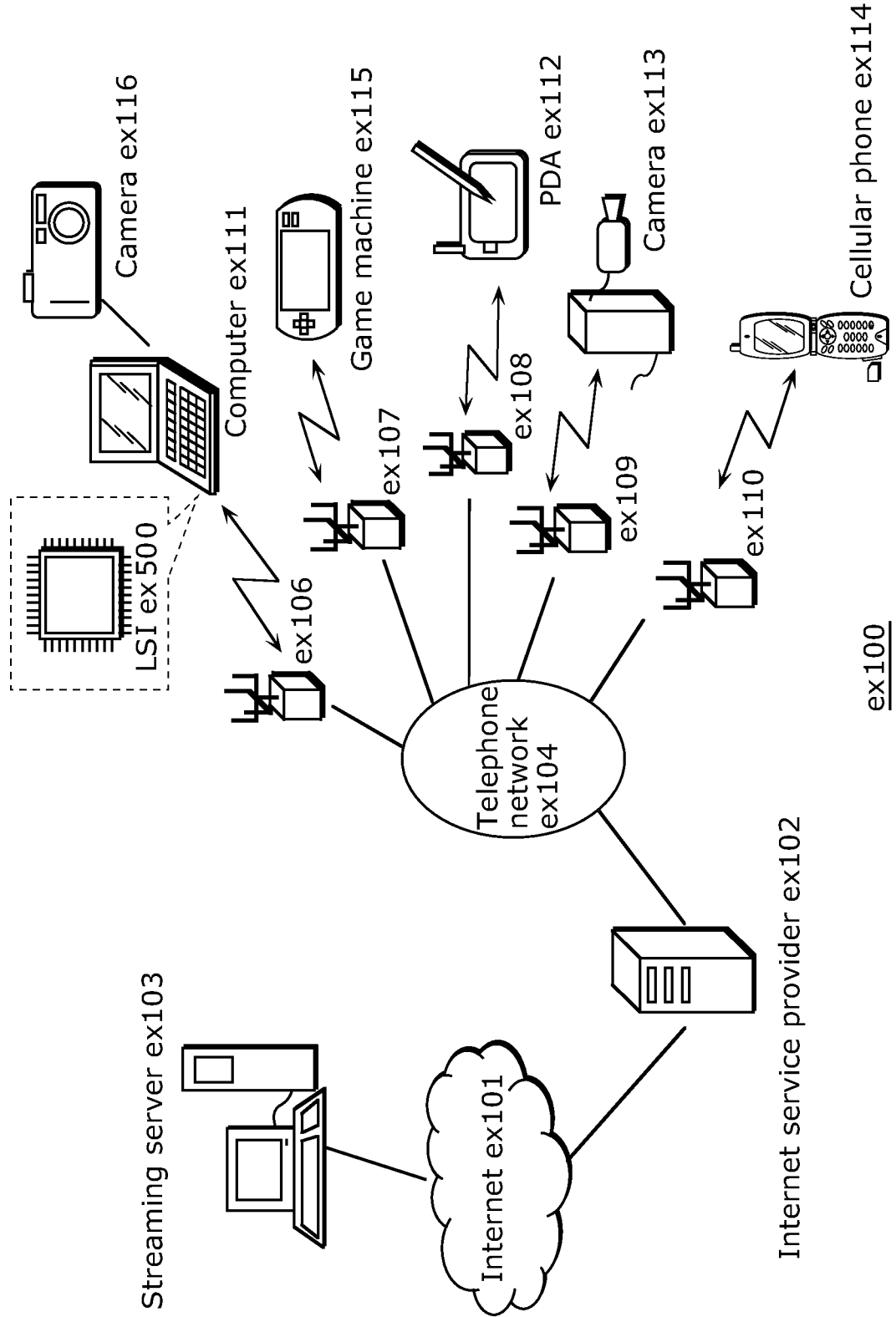
FIG. 24 shows an overall configuration of a content providing system for implementing content distribution services.

FIG. 24 illustrates an overall configuration of a content providing system ex100 for implementing content distribution services. The area for providing communication services is divided into cells of desired size, and base stations ex106, ex107, ex108, ex109, and ex110 which are fixed wireless stations are placed in each of the cells.

The content providing system ex100 is connected to devices, such as a computer ex111, a personal digital assistant (PDA) ex112, a camera ex113, a cellular phone ex114 and a game machine ex115, via the Internet ex101, an Internet service provider ex102, a telephone network ex104, as well as the base stations ex106 to ex110, respectively.

However, the configuration of the content providing system ex100 is not limited to the configuration shown in FIG. 24, and a combination in which any of the elements are connected is acceptable. In addition, each device may be directly connected to the telephone network ex104, rather than via the base stations ex106 to ex110 which are the fixed wireless stations. Furthermore, the devices may be interconnected to each other via a short distance wireless communication and others.

The camera ex113, such as a digital video camera, is capable of capturing video. A camera ex116, such as a digital camera, is capable of capturing both still images and video. Furthermore, the cellular phone ex114 may be the one that meets any of the standards such as Global System for Mobile Communications (GSM) (registered trademark), Code Division Multiple Access (CDMA), Wideband-Code Division Multiple Access (W-CDMA), Long Term Evolution (LTE), and High Speed Packet Access (HSPA). Alternatively, the cellular phone ex114 may be a Personal Handyphone System (PHS).

In the content providing system ex100, a streaming server ex103 is connected to the camera ex113 and others via the telephone network ex104 and the base station ex109, which enables distribution of images of a live show and others. In such a distribution, a content (for example, video of a music live show) captured by the user using the camera ex113 is coded as described above in each of embodiments (i.e., the camera functions as the image coding apparatus according to an aspect of the present disclosure), and the coded content is transmitted to the streaming server ex103. On the other hand, the streaming server ex103 carries out stream distribution of the transmitted content data to the clients upon their requests. The clients include the computer ex111, the PDA ex112, the camera ex113, the cellular phone ex114, and the game machine ex115 that are capable of decoding the above-mentioned coded data. Each of the devices that have received the distributed data decodes and reproduces the coded data (i.e., functions as the image decoding apparatus according to an aspect of the present disclosure).

The captured data may be coded by the camera ex113 or the streaming server ex103 that transmits the data, or the coding processes may be shared between the camera ex113 and the streaming server ex103. Similarly, the distributed data may be decoded by the clients or the streaming server ex103, or the decoding processes may be shared between the clients and the streaming server ex103. Furthermore, the data of the still images and video captured by not only the camera ex113 but also the camera ex116 may be transmitted to the streaming server ex103 through the computer ex111. The coding processes may be performed by the camera ex116, the computer ex111, or the streaming server ex103, or shared among them.

Furthermore, the coding and decoding processes may be performed by an LSI ex500 generally included in each of the computer ex111 and the devices. The LSI ex500 may be configured of a single chip or a plurality of chips. Software for coding and decoding video may be integrated into some type of a recording medium (such as a CD-ROM, a flexible disk, and a hard disk) that is readable by the computer ex111 and others, and the coding and decoding processes may be performed using the software. Furthermore, when the cellular phone ex114 is equipped with a camera, the video data obtained by the camera may be transmitted. The video data is data coded by the LSI ex500 included in the cellular phone ex114.

Furthermore, the streaming server ex103 may be composed of servers and computers, and may decentralize data and process the decentralized data, record, or distribute data.

As described above, the clients may receive and reproduce the coded data in the content providing system ex100. In other words, the clients can receive and decode information transmitted by the user, and reproduce the decoded data in real time in the content providing system ex100, so that the user who does not have any particular right and equipment can implement personal broadcasting.

Figure 25:
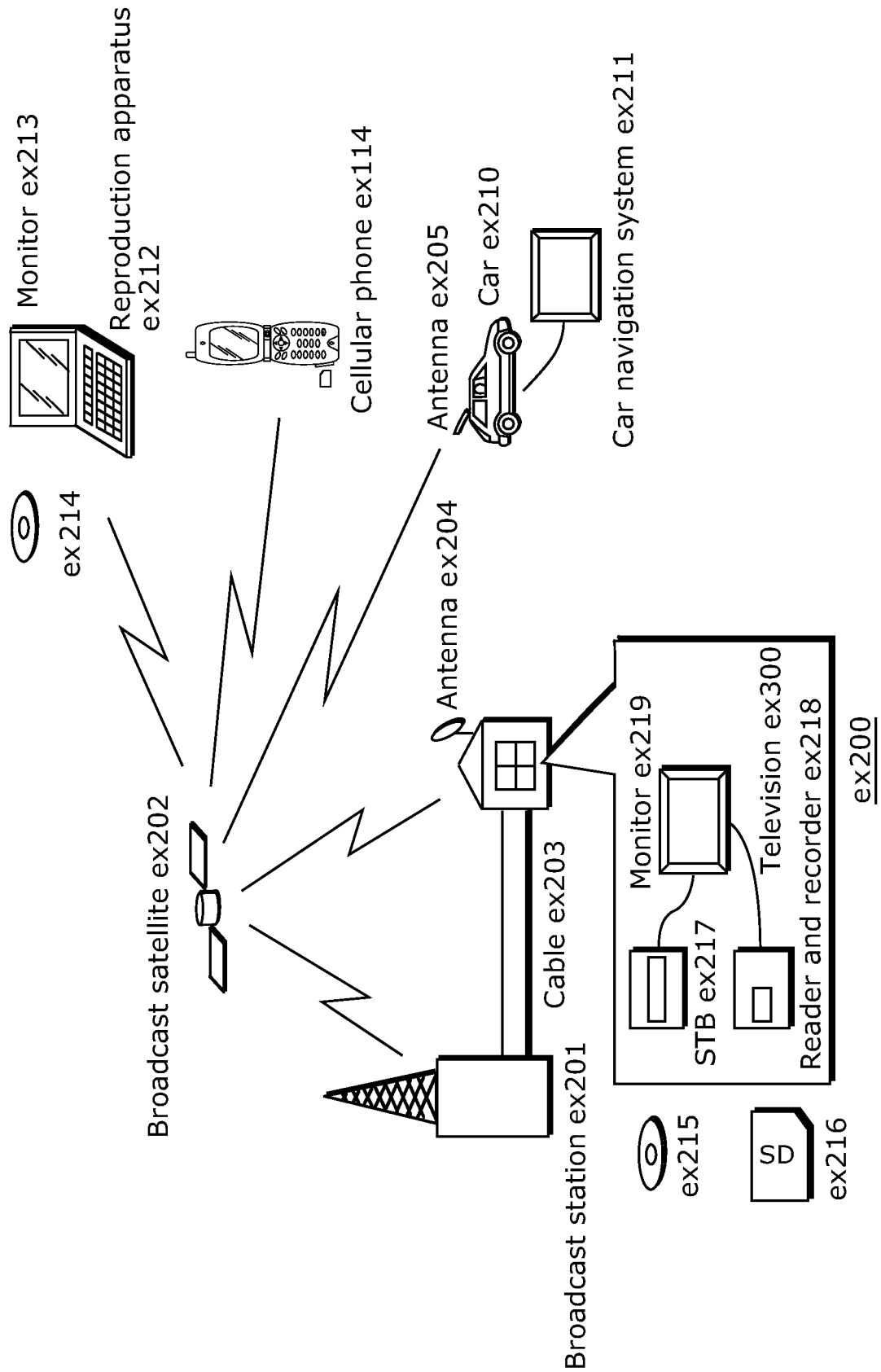
FIG. 25 shows an overall configuration of a digital broadcasting system.

Aside from the example of the content providing system ex100, at least one of the moving picture coding apparatus (image coding apparatus) and the moving picture decoding apparatus (image decoding apparatus) described in each of embodiments may be implemented in a digital broadcasting system ex200 illustrated in FIG. 25. More specifically, a broadcast station ex201 communicates or transmits, via radio waves to a broadcast satellite ex202, multiplexed data obtained by multiplexing audio data and others onto video data. The video data is data coded by the moving picture coding method described in each of embodiments (i.e., data coded by the image coding apparatus according to an aspect of the present disclosure). Upon receipt of the multiplexed data, the broadcast satellite ex202 transmits radio waves for broadcasting. Then, a home-use antenna ex204 with a satellite broadcast reception function receives the radio waves. Next, a device such as a television (receiver) ex300 and a set top box (STB) ex217 decodes the received multiplexed data, and reproduces the decoded data (i.e., functions as the image decoding apparatus according to an aspect of the present disclosure).

Furthermore, a reader/recorder ex218 (i) reads and decodes the multiplexed data recorded on a recording medium ex215, such as a DVD and a BD, or (i) codes video signals in the recording medium ex215, and in some cases, writes data obtained by multiplexing an audio signal on the coded data. The reader/recorder ex218 can include the moving picture decoding apparatus or the moving picture coding apparatus as shown in each of embodiments. In this case, the reproduced video signals are displayed on the monitor ex219, and can be reproduced by another device or system using the recording medium ex215 on which the multiplexed data is recorded. It is also possible to implement the moving picture decoding apparatus in the set top box ex217 connected to the cable ex203 fOr a cable television or to the antenna ex204 for satellite and/or terrestrial broadcasting, so as to display the video signals on the monitor ex219 of the television ex300. The moving picture decoding apparatus may be implemented not in the set top box but in the television ex300.

Figure 26:
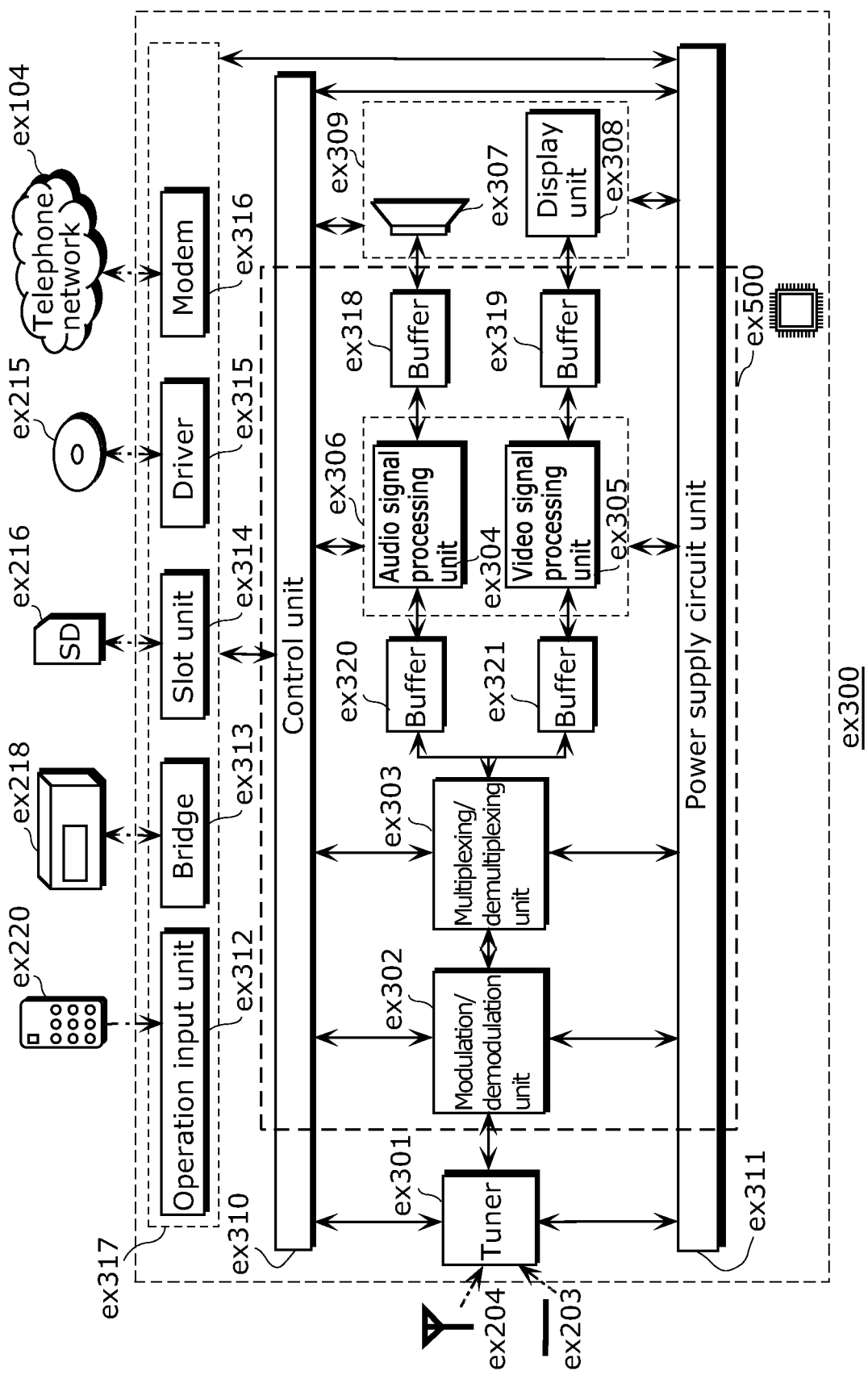
FIG. 26 shows a block diagram illustrating an example of a configuration of a television.

FIG. 26 illustrates the television (receiver) ex300 that uses the moving picture coding method and the moving picture decoding method described in each of embodiments. The television ex300 includes: a tuner ex301 that obtains or provides multiplexed data obtained by multiplexing audio data onto video data, through the antenna ex204 or the cable ex203, etc. that receives a broadcast; a modulation/demodulation unit ex302 that demodulates the received multiplexed data or modulates data into multiplexed data to be supplied outside; and a multiplexing/demultiplexing unit ex303 that demultiplexes the modulated multiplexed data into video data and audio data, or multiplexes video data and audio data coded by a signal processing unit ex306 into data.

The television ex300 further includes: a signal processing unit ex306 including an audio signal processing unit ex304 and a video signal processing unit ex305 that decode audio data and video data and code audio data and video data, respectively (which function as the image coding apparatus and the image decoding apparatus according to the aspects of the present disclosure); and an output unit ex309 including a speaker ex307 that provides the decoded audio signal, and a display unit ex308 that displays the decoded video signal, such as a display. Furthermore, the television ex300 includes an interface unit ex317 including an operation input unit ex312 that receives an input of a user operation. Furthermore, the television ex300 includes a control unit ex310 that controls overall each constituent element of the television ex300, and a power supply circuit unit ex311 that supplies power to each of the elements. Other than the operation input unit ex312, the interface unit ex317 may include: a bridge ex313 that is connected to an external device, such as the reader/recorder ex218; a slot unit ex314 for enabling attachment of the recording medium ex216, such as an SD card; a driver ex315 to be connected to an external recording medium, such as a hard disk; and a modem ex316 to be connected to a telephone network. Here, the recording medium ex216 can electrically record information using a non-volatile/volatile semiconductor memory element for storage. The constituent elements of the television ex300 are connected to each other through a synchronous bus.

First, the configuration in which the television ex300 decodes multiplexed data obtained from outside through the antenna ex204 and others and reproduces the decoded data will be described. In the television ex300, upon a user operation through a remote controller ex220 and others, the multiplexing/demultiplexing unit ex303 demultiplexes the multiplexed data demodulated by the modulation/demodulation unit ex302, under control of the control unit ex310 including a CPU. Furthermore, the audio signal processing unit ex304 decodes the demultiplexed audio data, and the video signal processing unit ex305 decodes the demultiplexed video data, using the decoding method described in each of embodiments, in the television ex300. The output unit ex309 provides the decoded video signal and audio signal outside, respectively. When the output unit ex309 provides the video signal and the audio signal, the signals may be temporarily stored in buffers ex318 and ex319, and others so that the signals are reproduced in synchronization with each other. Furthermore, the television ex300 may read multiplexed data not through a broadcast and others but from the recording media ex215 and ex216, such as a magnetic disk, an optical disk, and a SD card. Next, a configuration in which the television ex300 codes an audio signal and a video signal, and transmits the data outside or writes the data on a recording medium will be described. In the television ex300, upon a user operation through the remote controller ex220 and others, the audio signal processing unit ex304 codes an audio signal, and the video signal processing unit ex305 codes a video signal, under control of the control unit ex310 using the coding method described in each of embodiments. The multiplexing/demultiplexing unit ex303 multiplexes the coded video signal and audio signal, and provides the resulting signal outside. When the multiplexing/demultiplexing unit ex303 multiplexes the video signal and the audio signal, the signals may be temporarily stored in the buffers ex320 and ex321, and others so that the signals are reproduced in synchronization with each other. Here, the buffers ex318, ex319, ex320, and ex321 may be plural as illustrated, or at least one buffer may be shared in the television ex300. Furthermore, data may be stored in a buffer so that the system overflow and underflow may be avoided between the modulation/demodulation unit ex302 and the multiplexing/demultiplexing unit ex303, for example.

Furthermore, the television ex300 may include a configuration for receiving an AV input from a microphone or a camera other than the configuration for obtaining audio and video data from a broadcast or a recording medium, and may code the obtained data. Although the television ex300 can code, multiplex, and provide outside data in the description, it may be capable of only receiving, decoding, and providing outside data but not the coding, multiplexing, and providing outside data.

Furthermore, when the reader/recorder ex218 reads or writes multiplexed data from or on a recording medium, one of the television ex300 and the reader/recorder ex218 may decode or code the multiplexed data, and the television ex300 and the reader/recorder ex218 may share the decoding or coding.

Figure 27:
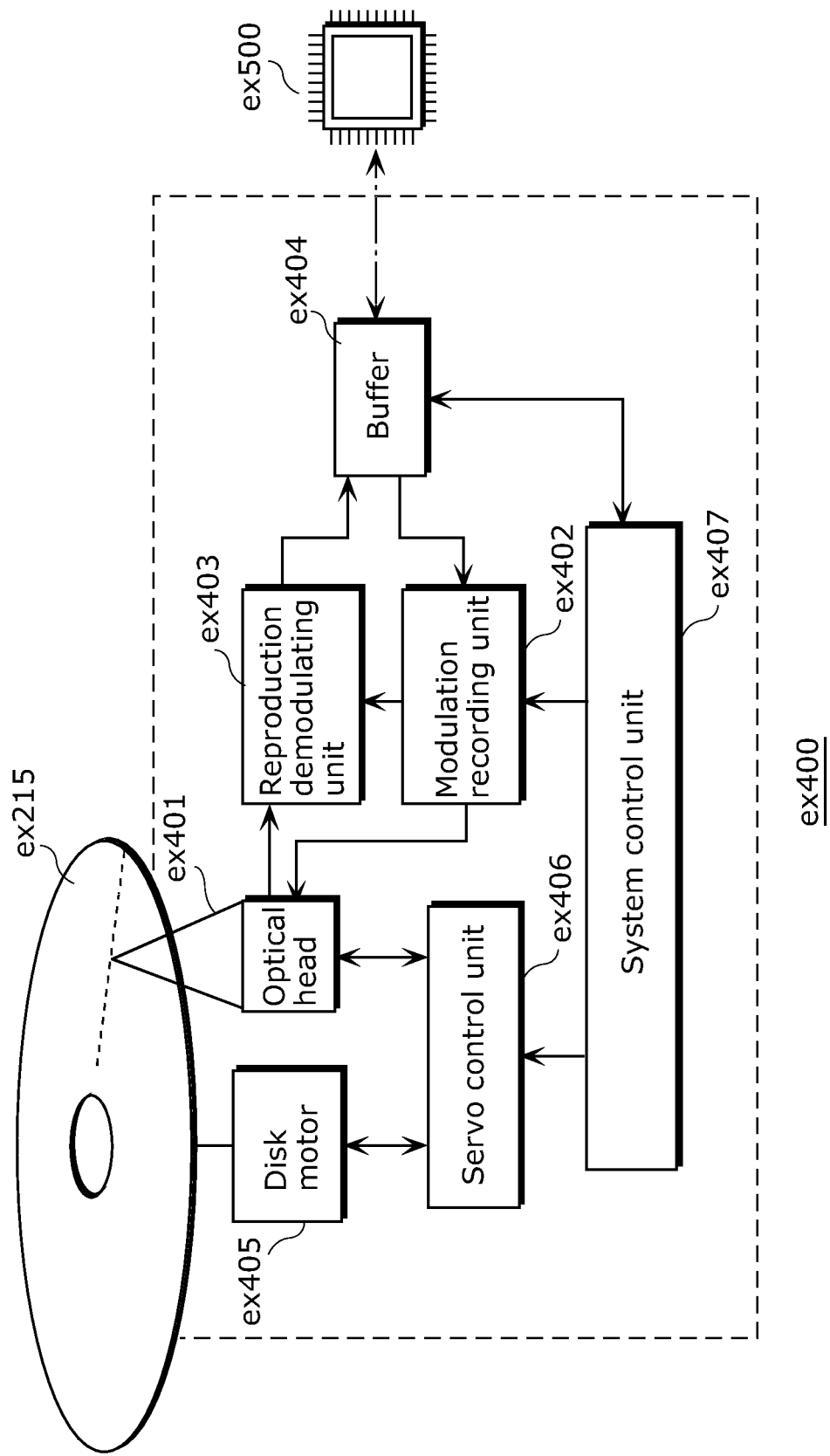
FIG. 27 shows a block diagram illustrating an example of a configuration of an information reproducing/recording unit that reads and writes information from and on a recording medium that is an optical disk.

As an example, FIG. 27 illustrates a configuration of an information reproducing/recording unit ex400 when data is read or written from or on an optical disk. The information reproducing/recording unit ex400 includes constituent elements ex401, ex402, ex403, ex404, ex405, ex406, and ex407 to be described hereinafter. The optical head ex401 irradiates a laser spot in a recording surface of the recording medium ex215 that is an optical disk to write information, and detects reflected light from the recording surface of the recording medium ex215 to read the information. The modulation recording unit ex402 electrically drives a semiconductor laser included in the optical head ex401, and modulates the laser light according to recorded data. The reproduction demodulating unit ex403 amplifies a reproduction signal obtained by electrically detecting the reflected light from the recording surface using a photo detector included in the optical head ex401, and demodulates the reproduction signal by separating a signal component recorded on the recording medium ex215 to reproduce the necessary information. The buffer ex404 temporarily holds the information to be recorded on the recording medium ex215 and the information reproduced from the recording medium ex215. The disk motor ex405 rotates the recording medium ex215. The servo control unit ex406 moves the optical head ex401 to a predetermined information track while controlling the rotation drive of the disk motor ex405 so as to follow the laser spot. The system control unit ex407 controls overall the information reproducing/recording unit ex400. The reading and writing processes can be implemented by the system control unit ex407 using various information stored in the buffer ex404 and generating and adding new information as necessary, and by the modulation recording unit ex402, the reproduction demodulating unit ex403, and the servo control unit ex406 that record and reproduce information through the optical head ex401 while being operated in a coordinated manner. The system control unit ex407 includes, for example, a microprocessor, and executes processing by causing a computer to execute a program for read and write.

Although the optical head ex401 irradiates a laser spot in the description, it may perform high-density recording using near field light.

Figure 28:
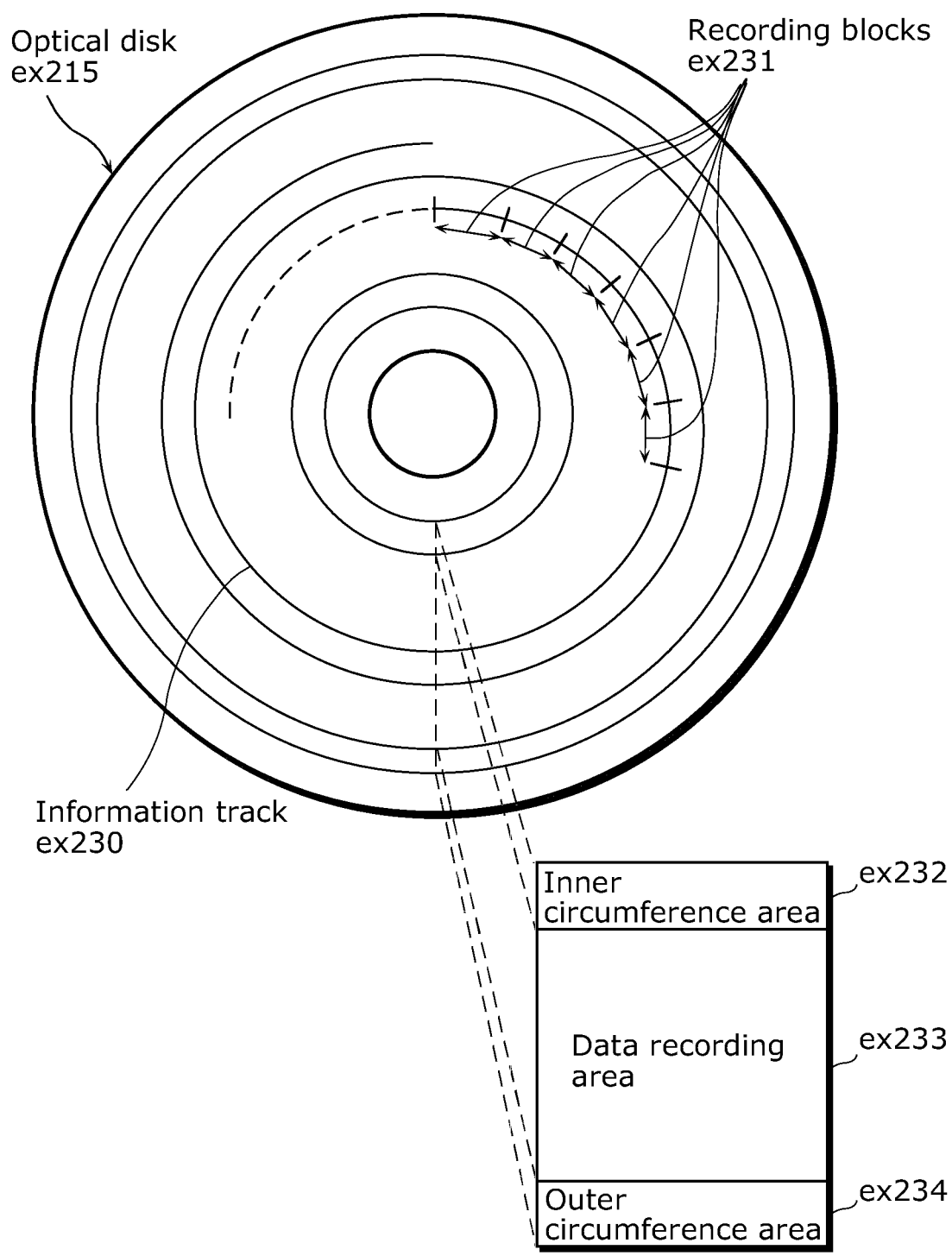
FIG. 28 shows an example of a configuration of a recording medium that is an optical disk.

FIG. 28 illustrates the recording medium ex215 that is the optical disk. On the recording surface of the recording medium ex215, guide grooves are spirally formed, and an information track ex230 records, in advance, address information indicating an absolute position on the disk according to change in a shape of the guide grooves. The address information includes information for determining positions of recording blocks ex231 that are a unit for recording data. Reproducing the information track ex230 and reading the address information in an apparatus that records and reproduces data can lead to determination of the positions of the recording blocks. Furthermore, the recording medium ex215 includes a data recording area ex233, an inner circumference area ex232, and an outer circumference area ex234. The data recording area ex233 is an area for use in recording the user data. The inner circumference area ex232 and the outer circumference area ex234 that are inside and outside of the data recording area ex233, respectively are for specific use except for recording the user data. The information reproducing/recording unit 400 reads and writes coded audio, coded video data, or multiplexed data obtained by multiplexing the coded audio and video data, from and on the data recording area ex233 of the recording medium ex215.

Although an optical disk having a layer, such as a DVD and a BD is described as an example in the description, the optical disk is not limited to such, and may be an optical disk having a multilayer structure and capable of being recorded on a part other than the surface. Furthermore, the optical disk may have a structure for multidimensional recording/reproduction, such as recording of information using light of colors with different wavelengths in the same portion of the optical disk and for recording information having different layers from various angles.

Furthermore, a car ex210 having an antenna ex205 can receive data from the satellite ex202 and others, and reproduce video on a display device such as a car navigation system ex211 set in the car ex210, in the digital broadcasting system ex200. Here, a configuration of the car navigation system ex211 will be a configuration, for example, including a GPS receiving unit from the configuration illustrated in FIG. 26. The same will be true for the configuration of the computer ex111, the cellular phone ex114, and others.

Figure 29A:
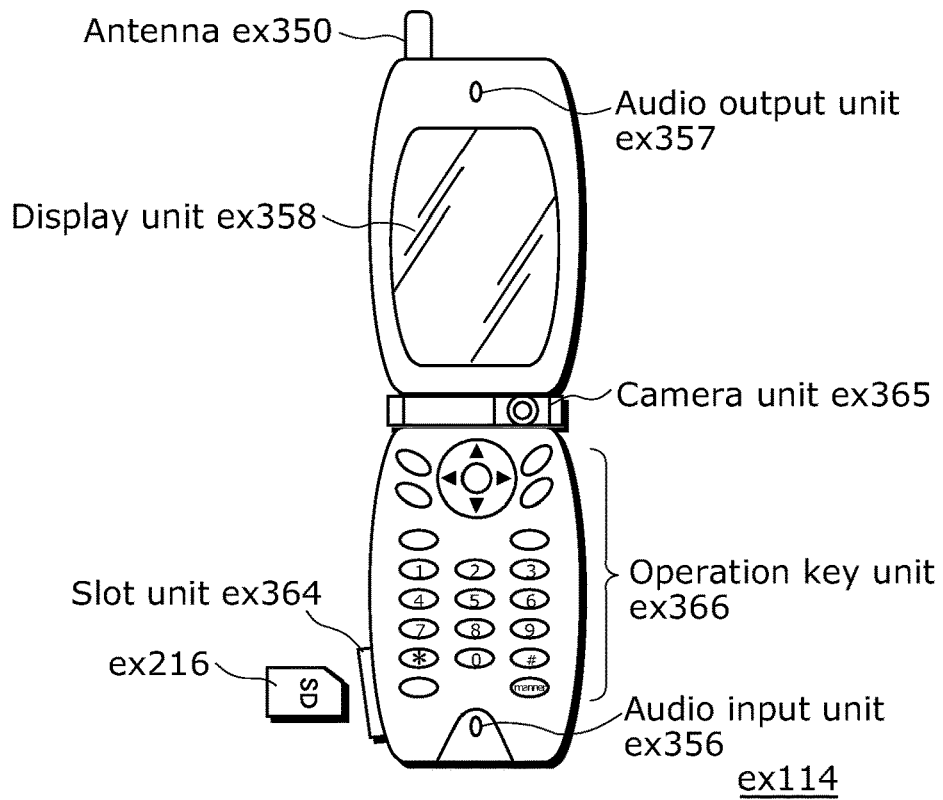
FIG. 29A shows an example of a cellular phone.

FIG. 29A illustrates the cellular phone ex114 that uses the moving picture coding method and the moving picture decoding method described in embodiments. The cellular phone ex114 includes: an antenna ex350 for transmitting and receiving radio waves through the base station ex110; a camera unit ex365 capable of capturing moving and still images; and a display unit ex358 such as a liquid crystal display for displaying the data such as decoded video captured by the camera unit ex365 or received by the antenna ex350. The cellular phone ex114 further includes: a main body unit including an operation key unit ex366; an audio output unit ex357 such as a speaker for output of audio; an audio input unit ex356 such as a microphone for input of audio; a memory unit ex367 for storing captured video or still pictures, recorded audio, coded or decoded data of the received video, the still pictures, e-mails, or others; and a slot unit ex364 that is an interface unit for a recording medium that stores data in the same manner as the memory unit ex367.

Figure 29B:
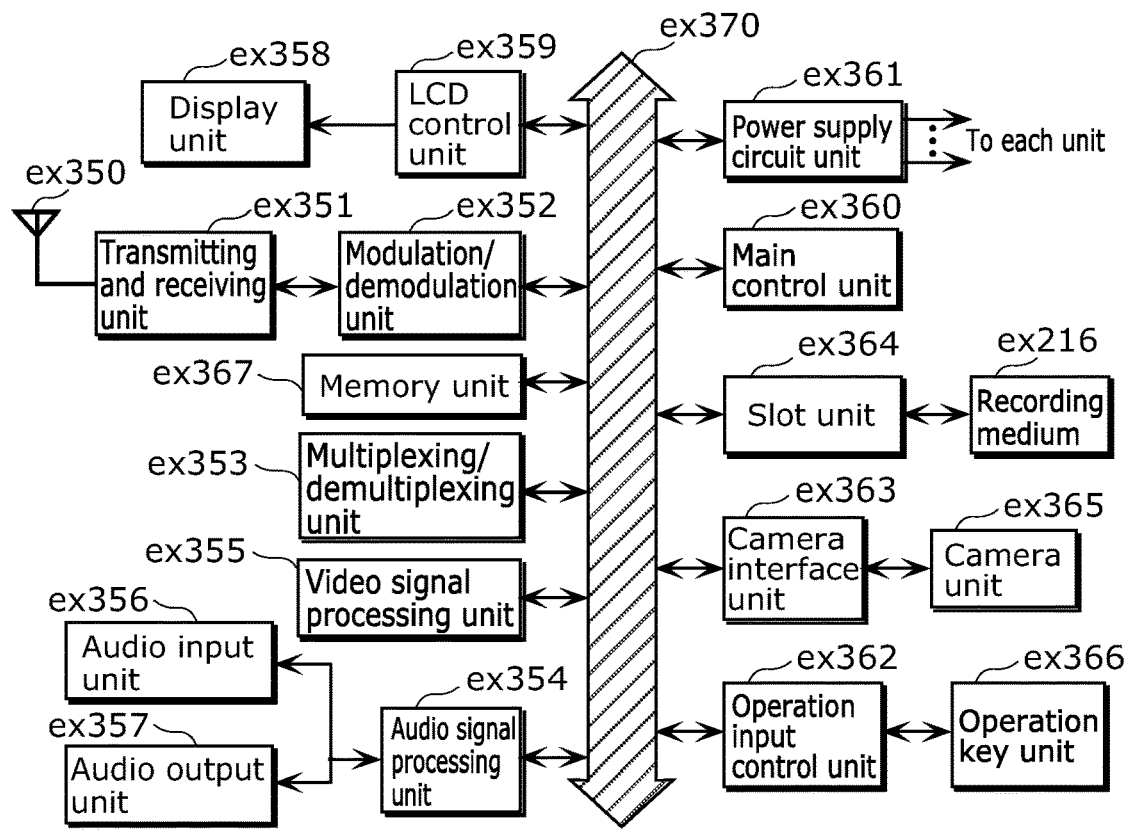
FIG. 29B is a block diagram showing an example of a configuration of a cellular phone.

Next, an example of a configuration of the cellular phone ex114 will be described with reference to FIG. 29B. In the cellular phone ex114, a main control unit ex360 designed to control overall each unit of the main body including the display unit ex358 as well as the operation key unit ex366 is connected mutually, via a synchronous bus ex370, to a power supply circuit unit ex361, an operation input control unit ex362, a video signal processing unit ex355, a camera interface unit ex363, a liquid crystal display (LCD) control unit ex359, a modulation/demodulation unit ex352, a multiplexing/demultiplexing unit ex353, an audio signal processing unit ex354, the slot unit ex364, and the memory unit ex367.

When a call-end key or a power key is turned ON by a user's operation, the power supply circuit unit ex361 supplies the respective units with power from a battery pack so as to activate the cell phone ex114.

In the cellular phone ex114, the audio signal processing unit ex354 converts the audio signals collected by the audio input unit ex356 in voice conversation mode into digital audio signals under the control of the main control unit ex360 including a CPU, ROM, and RAM. Then, the modulation/demodulation unit ex352 performs spread spectrum processing on the digital audio signals, and the transmitting and receiving unit ex351 performs digital-to-analog conversion and frequency conversion on the data, so as to transmit the resulting data via the antenna ex350. Also, in the cellular phone ex114, the transmitting and receiving unit ex351 amplifies the data received by the antenna ex350 in voice conversation mode and performs frequency conversion and the analog-to-digital conversion on the data. Then, the modulation/demodulation unit ex352 performs inverse spread spectrum processing on the data, and the audio signal processing unit ex354 converts it into analog audio signals, so as to output them via the audio output unit ex357.

Furthermore, when an e-mail in data communication mode is transmitted, text data of the e-mail inputted by operating the operation key unit ex366 and others of the main body is sent out to the main control unit ex360 via the operation input control unit ex362. The main control unit ex360 causes the modulation/demodulation unit ex352 to perform spread spectrum processing on the text data, and the transmitting and receiving unit ex351 performs the digital-to-analog conversion and the frequency conversion on the resulting data to transmit the data to the base station ex110 via the antenna ex350. When an e-mail is received, processing that is approximately inverse to the processing for transmitting an e-mail is performed on the received data, and the resulting data is provided to the display unit ex358.

When video, still images, or video and audio in data communication mode is or are transmitted, the video signal processing unit ex355 compresses and codes video signals supplied from the camera unit ex365 using the moving picture coding method shown in each of embodiments (i.e., functions as the image coding apparatus according to the aspect of the present disclosure), and transmits the coded video data to the multiplexing/demultiplexing unit ex353. In contrast, during when the camera unit ex365 captures video, still images, and others, the audio signal processing unit ex354 codes audio signals collected by the audio input unit ex356, and transmits the coded audio data to the multiplexing/demultiplexing unit ex353.

The multiplexing/demultiplexing unit ex353 multiplexes the coded video data supplied from the video signal processing unit ex355 and the coded audio data supplied from the audio signal processing unit ex354, using a predetermined method. Then, the modulation/demodulation unit (modulation/demodulation circuit unit) ex352 performs spread spectrum processing on the multiplexed data, and the transmitting and receiving unit ex351 performs digital-to-analog conversion and frequency conversion on the data so as to transmit the resulting data via the antenna ex350.

When receiving data of a video file which is linked to a Web page and others in data communication mode or when receiving an e-mail with video and/or audio attached, in order to decode the multiplexed data received via the antenna ex350, the multiplexing/demultiplexing unit ex353 demultiplexes the multiplexed data into a video data bit stream and an audio data bit stream, and supplies the video signal processing unit ex355 with the coded video data and the audio signal processing unit ex354 with the coded audio data, through the synchronous bus ex370. The video signal processing unit ex355 decodes the video signal using a moving picture decoding method corresponding to the moving picture coding method shown in each of embodiments (i.e., functions as the image decoding apparatus according to the aspect of the present disclosure), and then the display unit ex358 displays, for instance, the video and still images included in the video file linked to the Web page via the LCD control unit ex359. Furthermore, the audio signal processing unit ex354 decodes the audio signal, and the audio output unit ex357 provides the audio.

Furthermore, similarly to the television ex300, a terminal such as the cellular phone ex114 probably have 3 types of implementation configurations including not only (i) a transmitting and receiving terminal including both a coding apparatus and a decoding apparatus, but also (ii) a transmitting terminal including only a coding apparatus and (iii) a receiving terminal including only a decoding apparatus. Although the digital broadcasting system ex200 receives and transmits the multiplexed data obtained by multiplexing audio data onto video data in the description, the multiplexed data may be data obtained by multiplexing not audio data but character data related to video onto video data, and may be not multiplexed data but video data itself.

As such, the moving picture coding method and the moving picture decoding method in each of embodiments can be used in any of the devices and systems described. Thus, the advantages described in each of embodiments can be obtained.

Furthermore, various modifications and revisions can be made in any of the embodiments in the present disclosure.

Embodiment 9

Video data can be generated by switching, as necessary, between (i) the moving picture coding method or the moving picture coding apparatus shown in each of embodiments and (ii) a moving picture coding method or a moving picture coding apparatus in conformity with a different standard, such as MPEG-2, MPEG-4 AVC, and VC-1.

Here, when a plurality of video data that conforms to the different standards is generated and is then decoded, the decoding methods need to be selected to conform to the different standards. However, since to which standard each of the plurality of the video data to be decoded conforms cannot be detected, there is a problem that an appropriate decoding method cannot be selected.

In order to solve the problem, multiplexed data obtained by multiplexing audio data and others onto video data has a structure including identification information indicating to which standard the video data conforms. The specific structure of the multiplexed data including the video data generated in the moving picture coding method and by the moving picture coding apparatus shown in each of embodiments will be hereinafter described. The multiplexed data is a digital stream in the MPEG-2 Transport Stream format.

FIG. 30 illustrates a structure of the multiplexed data. As illustrated in FIG. 30, the multiplexed data can be obtained by multiplexing at least one of a video stream, an audio stream, a presentation graphics stream (PG), and an interactive graphics stream. The video stream represents primary video and secondary video of a movie, the audio stream (IG) represents a primary audio part and a secondary audio part to be mixed with the primary audio part, and the presentation graphics stream represents subtitles of the movie. Here, the primary video is normal video to be displayed on a screen, and the secondary video is video to be displayed on a smaller window in the primary video. Furthermore, the interactive graphics stream represents an interactive screen to be generated by arranging the GUI components on a screen. The video stream is coded in the moving picture coding method or by the moving picture coding apparatus shown in each of embodiments, or in a moving picture coding method or by a moving picture coding apparatus in conformity with a conventional standard, such as MPEG-2, MPEG-4 AVC, and VC-1. The audio stream is coded in accordance with a standard, such as Dolby-AC-3, Dolby Digital Plus, MLP, DTS, DTS-HD, and linear PCM.

Each stream included in the multiplexed data is identified by PID. For example, 0x1011 is allocated to the video stream to be used for video of a movie, 0x1100 to 0x111F are allocated to the audio streams, 0x1200 to 0x121F are allocated to the presentation graphics streams, 0x1400 to 0x141F are allocated to the interactive graphics streams, 0x1B00 to 0x1B1F are allocated to the video streams to be used for secondary video of the movie, and 0x1A00 to 0x1A1F are allocated to the audio streams to be used for the secondary audio to be mixed with the primary audio.

Figure 31:
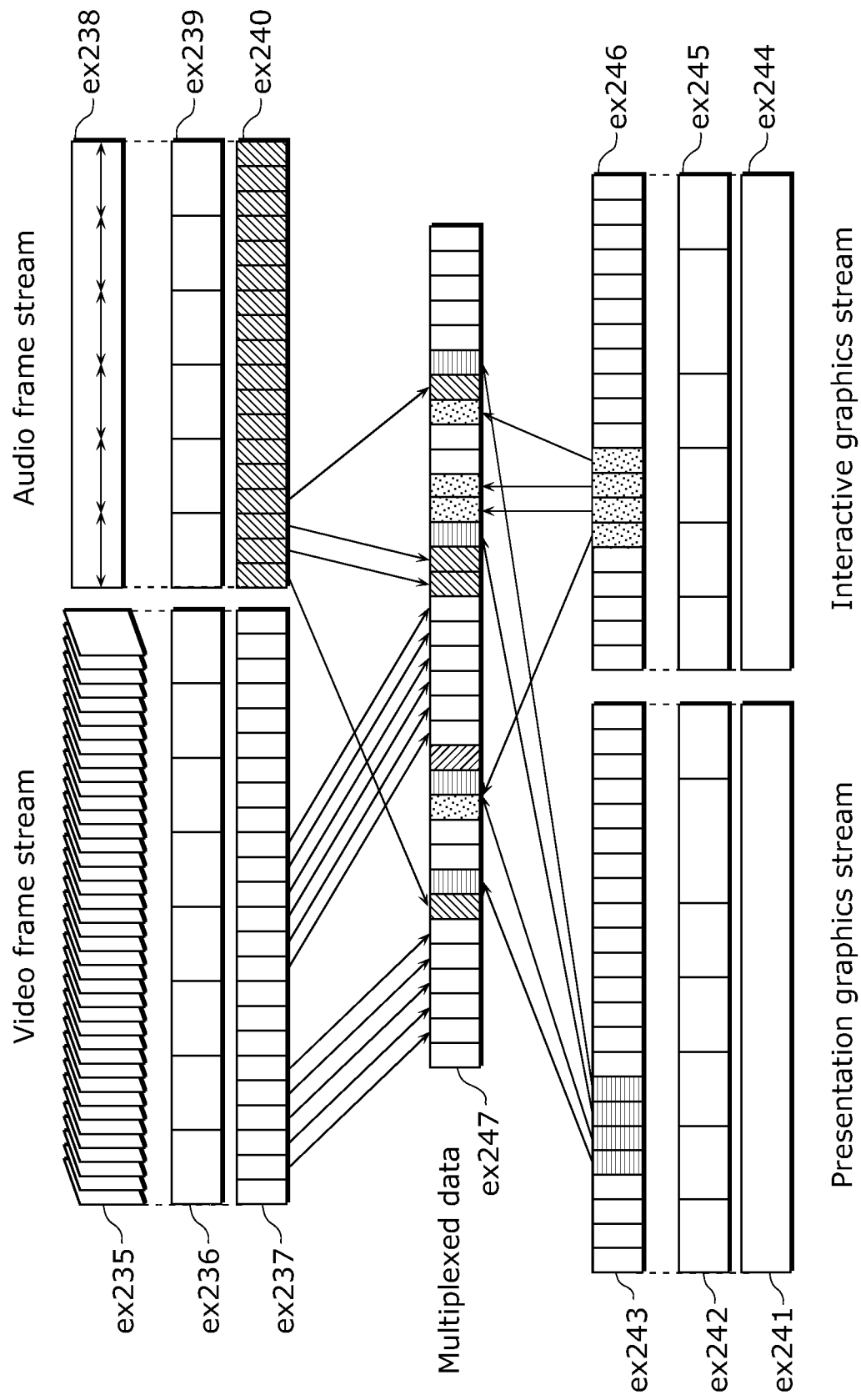
FIG. 31 schematically shows how each stream is multiplexed in multiplexed data.

FIG. 31 schematically illustrates how data is multiplexed. First, a video stream ex235 composed of video frames and an audio stream ex238 composed of audio frames are transformed into a stream of PES packets ex236 and a stream of PES packets ex239, and further into TS packets ex237 and TS packets ex240, respectively. Similarly, data of a presentation graphics stream ex241 and data of an interactive graphics stream ex244 are transformed into a stream of PES packets ex242 and a stream of PES packets ex245, and further into TS packets ex243 and TS packets ex246, respectively. These TS packets are multiplexed into a stream to obtain multiplexed data ex247.

Figure 32:
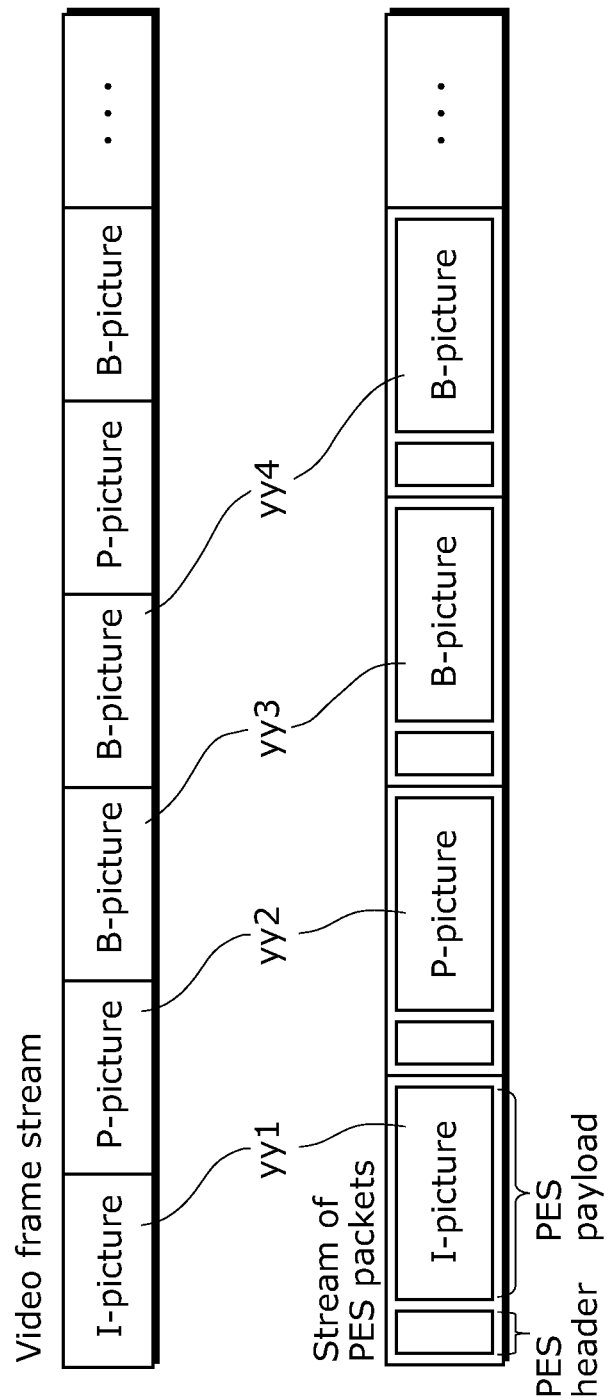
FIG. 32 shows how a video stream is stored in a stream of PES packets in more detail.

FIG. 32 illustrates how a video stream is stored in a stream of PES packets in more detail. The first bar in FIG. 32 shows a video frame stream in a video stream. The second bar shows the stream of PES packets. As indicated by arrows denoted as yy1, yy2, yy3, and yy4 in FIG. 32, the video stream is divided into pictures as I pictures, B pictures, and P pictures each of which is a video presentation unit, and the pictures are stored in a payload of each of the PES packets. Each of the PES packets has a PES header, and the PES header stores a Presentation Time-Stamp (PTS) indicating a display time of the picture, and a Decoding Time-Stamp (DTS) indicating a decoding time of the picture.

FIG. 33 illustrates a format of TS packets to be finally written on the multiplexed data. Each of the TS packets is a 188-byte fixed length packet including a 4-byte TS header having information, such as a PID for identifying a stream and a 184-byte TS payload for storing data. The PES packets are divided, and stored in the TS payloads, respectively. When a BD ROM is used, each of the TS packets is given a 4-byte TP_Extra_Header, thus resulting in 192-byte source packets. The source packets are written on the multiplexed data. The TP_Extra_Header stores information such as an Arrival_Time_Stamp (ATS). The ATS shows a transfer start time at which each of the TS packets is to be transferred to a PID filter. The source packets are arranged in the multiplexed data as shown at the bottom of FIG. 33. The numbers incrementing from the head of the multiplexed data are called source packet numbers (SPNs).

Each of the TS packets included in the multiplexed data includes not only streams of audio, video, subtitles and others, but also a Program Association Table (PAT), a Program Map Table (PMT), and a Program Clock Reference (PCR). The PAT shows what a PID in a PMT used in the multiplexed data indicates, and a PID of the PAT itself is registered as zero. The PMT stores PIDs of the streams of video, audio, subtitles and others included in the multiplexed data, and attribute information of the streams corresponding to the PIDs. The PMT also has various descriptors relating to the multiplexed data. The descriptors have information such as copy control information showing whether copying of the multiplexed data is permitted or not. The PCR stores STC time information corresponding to an ATS showing when the PCR packet is transferred to a decoder, in order to achieve synchronization between an Arrival Time Clock (ATC) that is a time axis of ATSs, and an System Time Clock (STC) that is a time axis of PTSs and DTSs.

Figure 34:
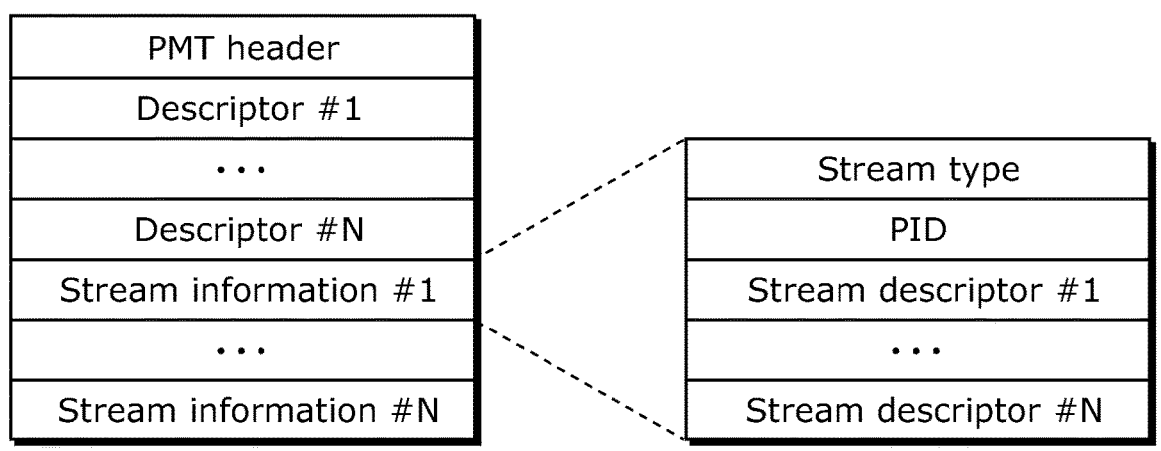
FIG. 34 shows a data structure of a PMT.

FIG. 34 illustrates the data structure of the PMT in detail. A PMT header is disposed at the top of the PMT. The PMT header describes the length of data included in the PMT and others. A plurality of descriptors relating to the multiplexed data is disposed after the PMT header. Information such as the copy control information is described in the descriptors. After the descriptors, a plurality of pieces of stream information relating to the streams included in the multiplexed data is disposed. Each piece of stream information includes stream descriptors each describing information, such as a stream type for identifying a compression codec of a stream, a stream PID, and stream attribute information (such as a frame rate or an aspect ratio). The stream descriptors are equal in number to the number of streams in the multiplexed data.

When the multiplexed data is recorded on a recording medium and others, it is recorded together with multiplexed data information files.

Figure 35:
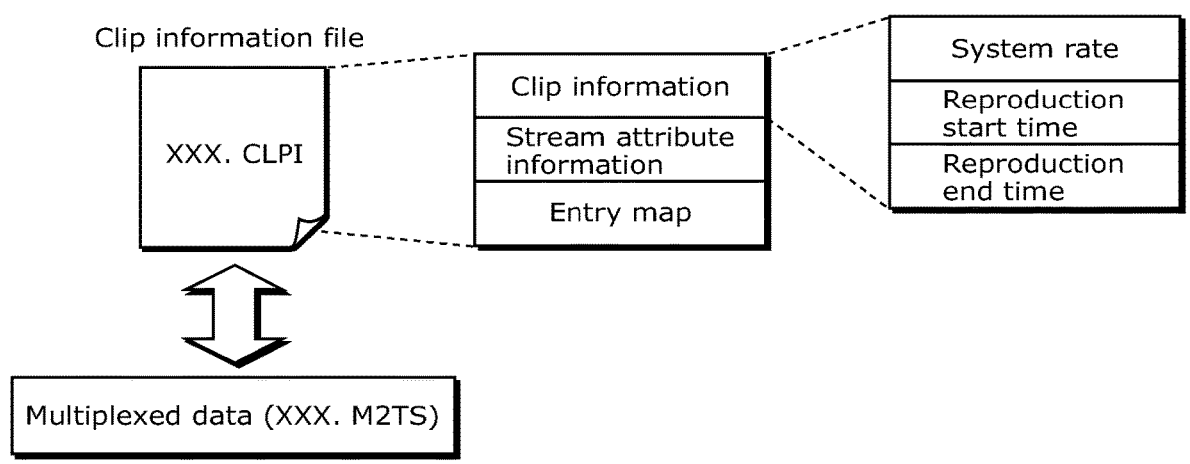
FIG. 35 shows an internal structure of multiplexed data information.

Each of the multiplexed data information files is management information of the multiplexed data as shown in FIG. 35. The multiplexed data information files are in one to one correspondence with the multiplexed data, and each of the files includes multiplexed data information, stream attribute information, and an entry map.

As illustrated in FIG. 35, the multiplexed data information includes a system rate, a reproduction start time, and a reproduction end time. The system rate indicates the maximum transfer rate at which a system target decoder to be described later transfers the multiplexed data to a PID filter. The intervals of the ATSs included in the multiplexed data are set to not higher than a system rate. The reproduction start time indicates a PTS in a video frame at the head of the multiplexed data. An interval of one frame is added to a PTS in a video frame at the end of the multiplexed data, and the PTS is set to the reproduction end time.

Figure 36:
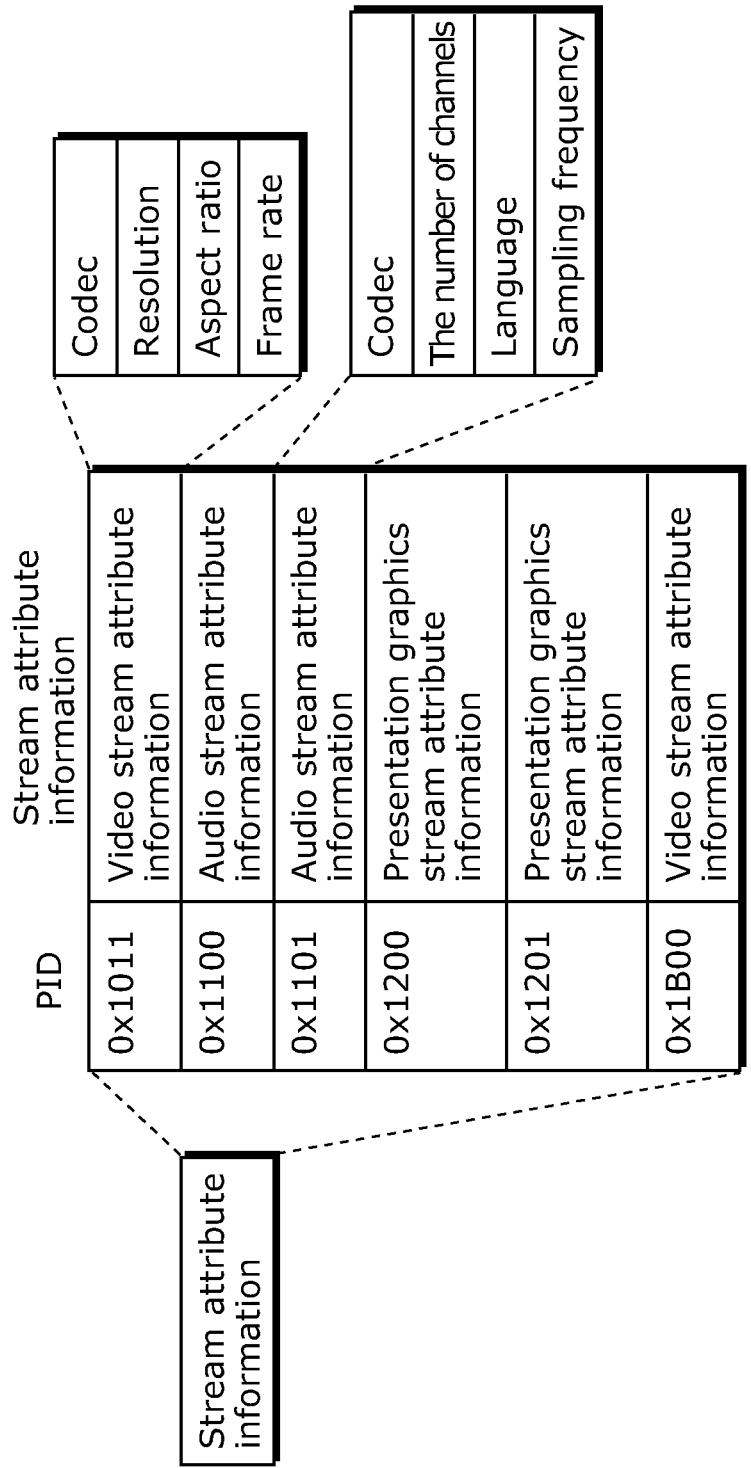
FIG. 36 shows an internal structure of stream attribute information.

As shown in FIG. 36, a piece of attribute information is registered in the stream attribute information, for each PID of each stream included in the multiplexed data. Each piece of attribute information has different information depending on whether the corresponding stream is a video stream, an audio stream, a presentation graphics stream, or an interactive graphics stream. Each piece of video stream attribute information carries information including what kind of compression codec is used for compressing the video stream, and the resolution, aspect ratio and frame rate of the pieces of picture data that is included in the video stream. Each piece of audio stream attribute information carries information including what kind of compression codec is used for compressing the audio stream, how many channels are included in the audio stream, which language the audio stream supports, and how high the sampling frequency is. The video stream attribute information and the audio stream attribute information are used for initialization of a decoder before the player plays back the information.

In the present embodiment, the multiplexed data to be used is of a stream type included in the PMT. Furthermore, when the multiplexed data is recorded on a recording medium, the video stream attribute information included in the multiplexed data information is used. More specifically, the moving picture coding method or the moving picture coding apparatus described in each of embodiments includes a step or a unit for allocating unique information indicating video data generated by the moving picture coding method or the moving picture coding apparatus in each of embodiments, to the stream type included in the PMT or the video stream attribute information. With the configuration, the video data generated by the moving picture coding method or the moving picture coding apparatus described in each of embodiments can be distinguished from video data that conforms to another standard.

Figure 37:
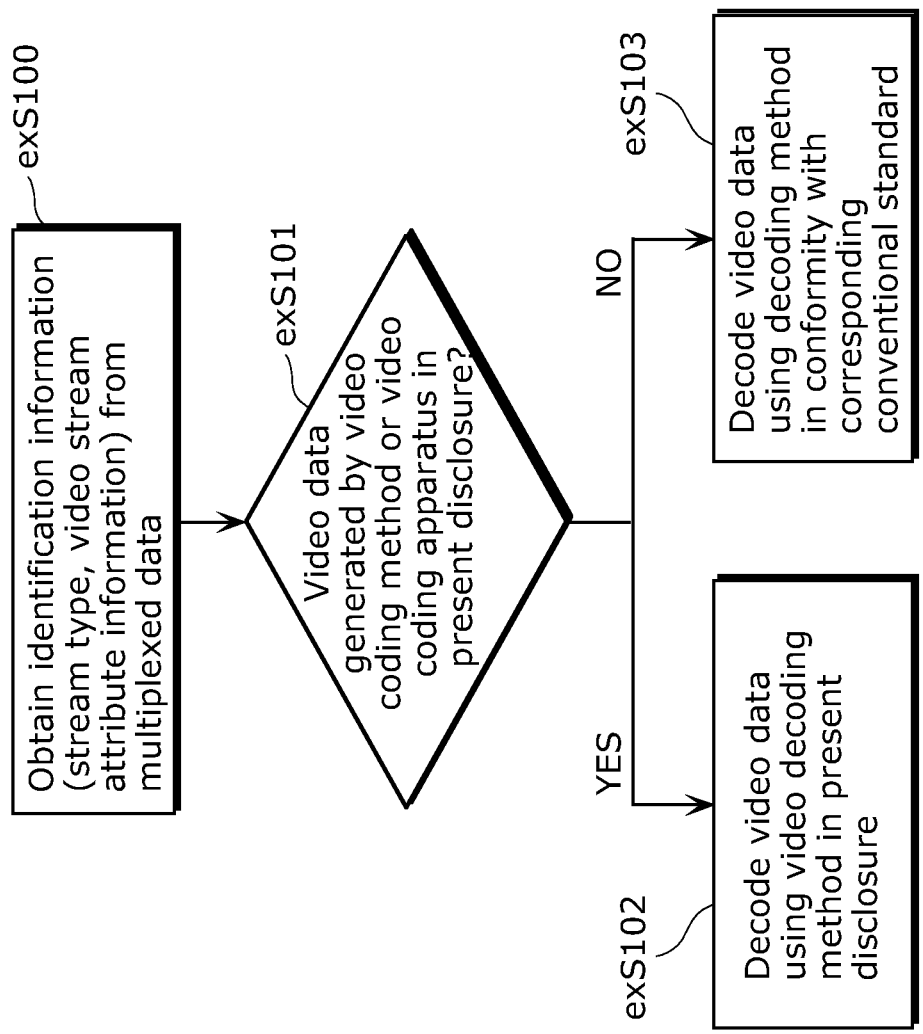
FIG. 37 shows steps for identifying video data.

Furthermore, FIG. 37 illustrates steps of the moving picture decoding method according to the present embodiment. In Step exS100, the stream type included in the PMT or the video stream attribute information included in the multiplexed data information is obtained from the multiplexed data. Next, in Step exS101, it is determined whether or not the stream type or the video stream attribute information indicates that the multiplexed data is generated by the moving picture coding method or the moving picture coding apparatus in each of embodiments. When it is determined that the stream type or the video stream attribute information indicates that the multiplexed data is generated by the moving picture coding method or the moving picture coding apparatus in each of embodiments, in Step exS102, decoding is performed by the moving picture decoding method in each of embodiments. Furthermore, when the stream type or the video stream attribute information indicates conformance to the conventional standards, such as MPEG-2, MPEG-4 AVC, and VC-1, in Step exS103, decoding is performed by a moving picture decoding method in conformity with the conventional standards.

As such, allocating a new unique value to the stream type or the video stream attribute information enables determination whether or not the moving picture decoding method or the moving picture decoding apparatus that is described in each of embodiments can perform decoding. Even when multiplexed data that conforms to a different standard is input, an appropriate decoding method or apparatus can be selected. Thus, it becomes possible to decode information without any error. Furthermore, the moving picture coding method or apparatus, or the moving picture decoding method or apparatus in the present embodiment can be used in the devices and systems described above.

Embodiment 10

Figure 38:
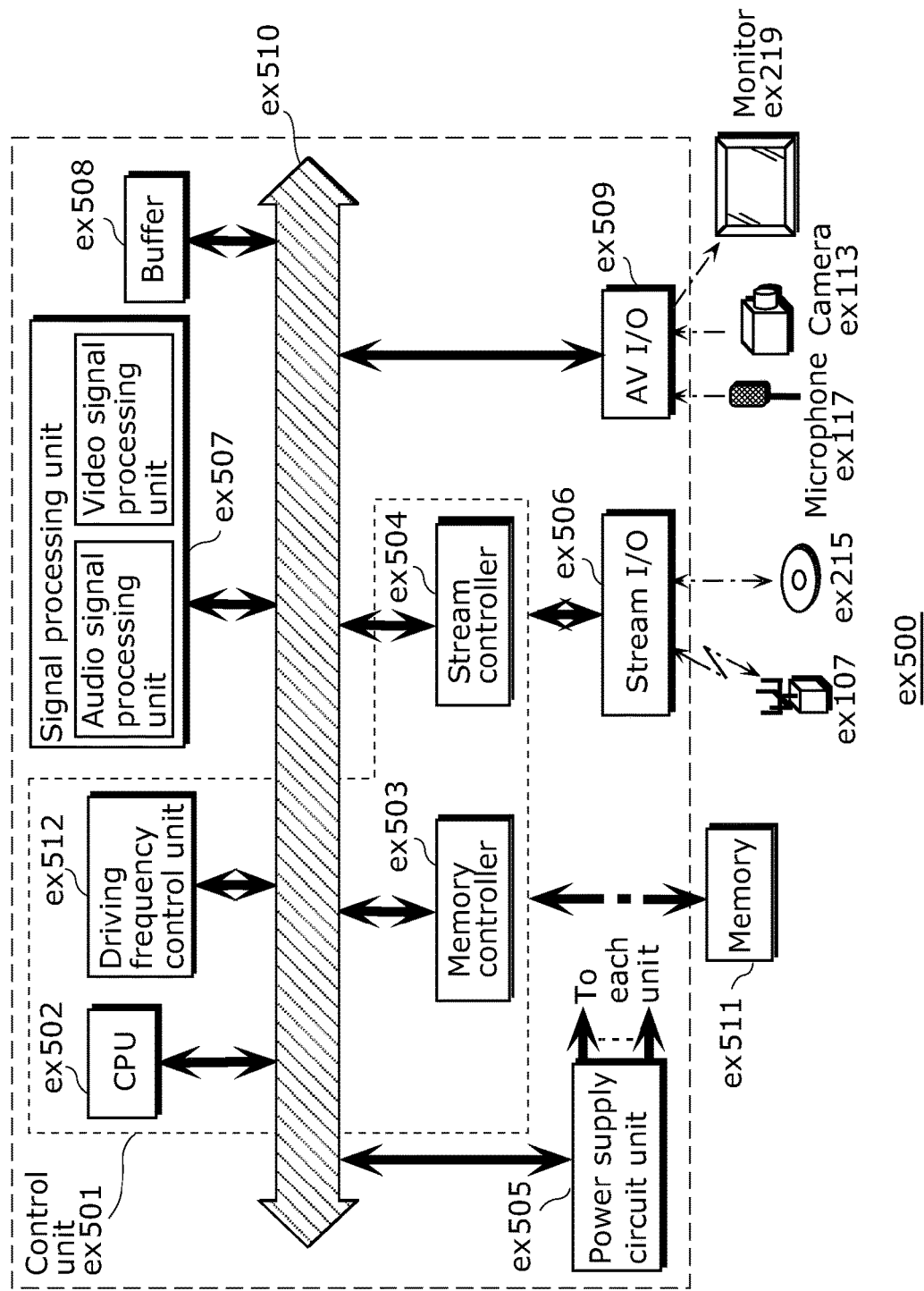
FIG. 38 shows an example of a configuration of an integrated circuit for implementing the moving picture coding method and the moving picture decoding method according to each of embodiments.

Each of the moving picture coding method, the moving picture coding apparatus, the moving picture decoding method, and the moving picture decoding apparatus in each of embodiments is typically achieved in the form of an integrated circuit or a Large Scale Integrated (LSI) circuit. As an example of the LSI, FIG. 38 illustrates a configuration of the LSI ex500 that is made into one chip. The LSI ex500 includes elements ex501, ex502, ex503, ex504, ex505, ex506, ex507, ex508, and ex509 to be described below, and the elements are connected to each other through a bus ex510. The power supply circuit unit ex505 is activated by supplying each of the elements with power when the power supply circuit unit ex505 is turned on.

For example, when coding is performed, the LSI ex500 receives an AV signal from a microphone ex117, a camera ex113, and others through an AV IO ex509 under control of a control unit ex501 including a CPU ex502, a memory controller ex503, a stream controller ex504, and a driving frequency control unit ex512. The received AV signal is temporarily stored in an external memory ex511, such as an SDRAM. Under control of the control unit ex501, the stored data is segmented into data portions according to the processing amount and speed to be transmitted to a signal processing unit ex507. Then, the signal processing unit ex507 codes an audio signal and/or a video signal. Here, the coding of the video signal is the coding described in each of embodiments. Furthermore, the signal processing unit ex507 sometimes multiplexes the coded audio data and the coded video data, and a stream IO ex506 provides the multiplexed data outside. The provided multiplexed data is transmitted to the base station ex107, or written on the recording medium ex215. When data sets are multiplexed, the data should be temporarily stored in the buffer ex508 so that the data sets are synchronized with each other.

Although the memory ex511 is an element outside the LSI ex500, it may be included in the LSI ex500. The buffer ex508 is not limited to one buffer, but may be composed of buffers. Furthermore, the LSI ex500 may be made into one chip or a plurality of chips.

Furthermore, although the control unit ex501 includes the CPU ex502, the memory controller ex503, the stream controller ex504, the driving frequency control unit ex512, the configuration of the control unit ex501 is not limited to such. For example, the signal processing unit ex507 may further include a CPU. Inclusion of another CPU in the signal processing unit ex507 can improve the processing speed. Furthermore, as another example, the CPU ex502 may serve as or be a part of the signal processing unit ex507, and, for example, may include an audio signal processing unit. In such a case, the control unit ex501 includes the signal processing unit ex507 or the CPU ex502 including a part of the signal processing unit ex507.

The name used here is LSI, but it may also be called IC, system LSI, super LSI, or ultra LSI depending on the degree of integration.

Moreover, ways to achieve integration are not limited to the LSI, and a special circuit or a general purpose processor and so forth can also achieve the integration. Field Programmable Gate Array (FPGA) that can be programmed after manufacturing LSIs or a reconfigurable processor that allows re-configuration of the connection or configuration of an LSI can be used for the same purpose.

In the future, with advancement in semiconductor technology, a brand-new technology may replace LSI. The functional blocks can be integrated using such a technology. The possibility is that the present disclosure is applied to biotechnology.

Embodiment 11

When video data generated in the moving picture coding method or by the moving picture coding apparatus described in each of embodiments is decoded, compared to when video data that conforms to a conventional standard, such as MPEG-2, MPEG-4 AVC, and VC-1 is decoded, the processing amount probably increases. Thus, the LSI ex500 needs to be set to a driving frequency higher than that of the CPU ex502 to be used when video data in conformity with the conventional standard is decoded. However, when the driving frequency is set higher, there is a problem that the power consumption increases.

Figure 39:
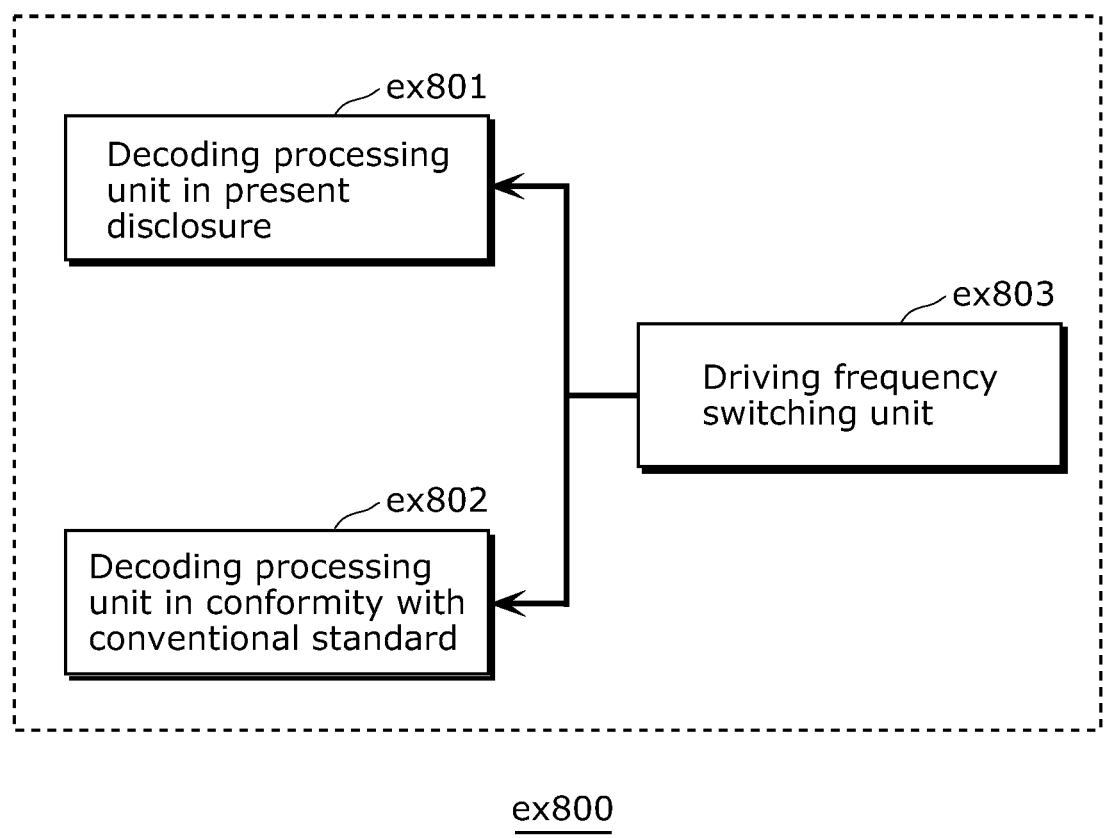
FIG. 39 shows a configuration for switching between driving frequencies.

In order to solve the problem, the moving picture decoding apparatus, such as the television ex300 and the LSI ex500 is configured to determine to which standard the video data conforms, and switch between the driving frequencies according to the determined standard. FIG. 39 illustrates a configuration ex800 in the present embodiment. A driving frequency switching unit ex803 sets a driving frequency to a higher driving frequency when video data is generated by the moving picture coding method or the moving picture coding apparatus described in each of embodiments. Then, the driving frequency switching unit ex803 instructs a decoding processing unit ex801 that executes the moving picture decoding method described in each of embodiments to decode the video data. When the video data conforms to the conventional standard, the driving frequency switching unit ex803 sets a driving frequency to a lower driving frequency than that of the video data generated by the moving picture coding method or the moving picture coding apparatus described in each of embodiments. Then, the driving frequency switching unit ex803 instructs the decoding processing unit ex802 that conforms to the conventional standard to decode the video data.

More specifically, the driving frequency switching unit ex803 includes the CPU ex502 and the driving frequency control unit ex512 in FIG. 38. Here, each of the decoding processing unit ex801 that executes the moving picture decoding method described in each of embodiments and the decoding processing unit ex802 that conforms to the conventional standard corresponds to the signal processing unit ex507 in FIG. 38. The CPU ex502 determines to which standard the video data conforms. Then, the driving frequency control unit ex512 determines a driving frequency based on a signal from the CPU ex502. Furthermore, the signal processing unit ex507 decodes the video data based on the signal from the CPU ex502. For example, the identification information described in Embodiment B is probably used for identifying the video data. The identification information is not limited to the one described in Embodiment B but may be any information as long as the information indicates to which standard the video data conforms. For example, when which standard video data conforms to can be determined based on an external signal for determining that the video data is used for a television or a disk, etc., the determination may be made based on such an external signal. Furthermore, the CPU ex502 selects a driving frequency based on, for example, a look-up table in which the standards of the video data are associated with the driving frequencies as shown in FIG. 41. The driving frequency can be selected by storing the look-up table in the buffer ex508 and in an internal memory of an LSI, and with reference to the look-up table by the CPU ex502.

Figure 40:
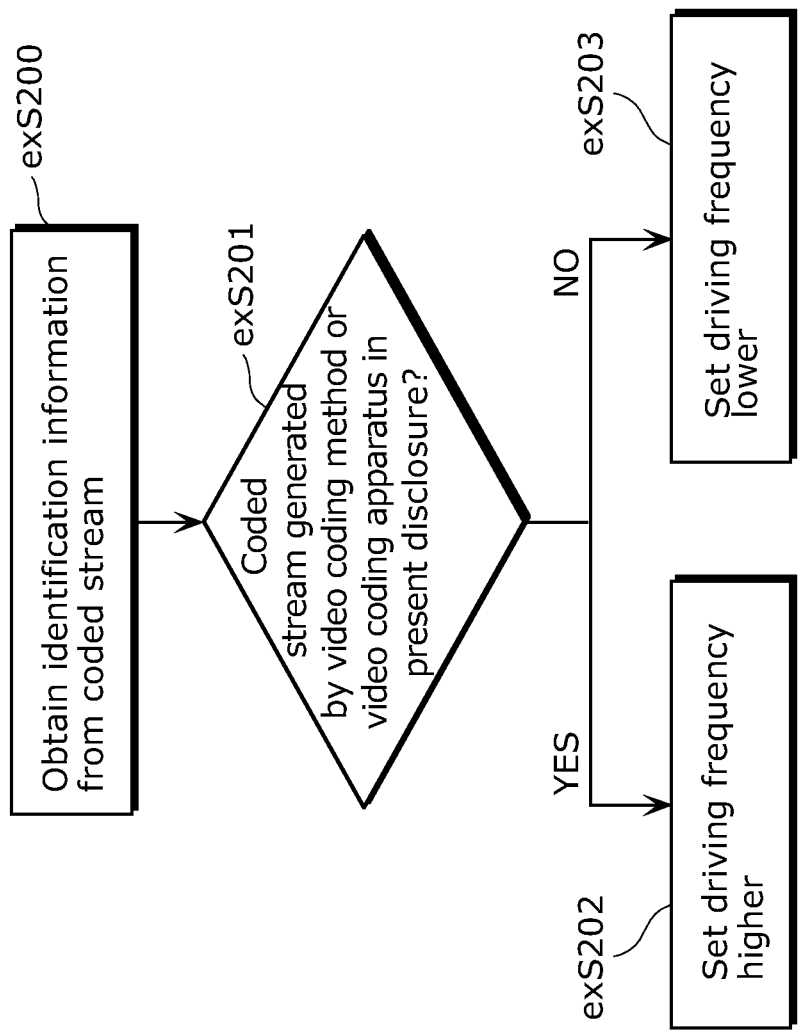
FIG. 40 shows steps for identifying video data and switching between driving frequencies.

FIG. 40 illustrates steps for executing a method in the present embodiment. First, in Step exS200, the signal processing unit ex507 obtains identification information from the multiplexed data. Next, in Step exS201, the CPU ex502 determines whether or not the video data is generated by the coding method and the coding apparatus described in each of embodiments, based on the identification information. When the video data is generated by the moving picture coding method and the moving picture coding apparatus described in each of embodiments, in Step exS202, the CPU ex502 transmits a signal for setting the driving frequency to a higher driving frequency to the driving frequency control unit ex512. Then, the driving frequency control unit ex512 sets the driving frequency to the higher driving frequency. On the other hand, when the identification information indicates that the video data conforms to the conventional standard, such as MPEG-2, MPEG-4 AVC, and VC-1, in Step exS203, the CPU ex502 transmits a signal for setting the driving frequency to a lower driving frequency to the driving frequency control unit ex512. Then, the driving frequency control unit ex512 sets the driving frequency to the lower driving frequency than that in the case where the video data is generated by the moving picture coding method and the moving picture coding apparatus described in each of embodiment.

Furthermore, along with the switching of the driving frequencies, the power conservation effect can be improved by changing the voltage to be applied to the LSI ex500 or an apparatus including the LSI ex500. For example, when the driving frequency is set lower, the voltage to be applied to the LSI ex500 or the apparatus including the LSI ex500 is probably set to a voltage lower than that in the case where the driving frequency is set higher.

Furthermore, when the processing amount for decoding is larger, the driving frequency may be set higher, and when the processing amount for decoding is smaller, the driving frequency may be set lower as the method for setting the driving frequency. Thus, the setting method is not limited to the ones described above. For example, when the processing amount for decoding video data in conformity with MPEG-4 AVC is larger than the processing amount for decoding video data generated by the moving picture coding method and the moving picture coding apparatus described in each of embodiments, the driving frequency is probably set in reverse order to the setting described above.

Furthermore, the method for setting the driving frequency is not limited to the method for setting the driving frequency lower. For example, when the identification information indicates that the video data is generated by the moving picture coding method and the moving picture coding apparatus described in each of embodiments, the voltage to be applied to the LSI ex500 or the apparatus including the LSI ex500 is probably set higher. When the identification information indicates that the video data conforms to the conventional standard, such as MPEG-2, MPEG-4 AVC, and VC-1, the voltage to be applied to the LSI ex500 or the apparatus including the LSI ex500 is probably set lower. As another example, when the identification information indicates that the video data is generated by the moving picture coding method and the moving picture coding apparatus described in each of embodiments, the driving of the CPU ex502 does not probably have to be suspended. When the identification information indicates that the video data conforms to the conventional standard, such as MPEG-2, MPEG-4 AVC, and VC-1, the driving of the CPU ex502 is probably suspended at a given time because the CPU ex502 has extra processing capacity. Even when the identification information indicates that the video data is generated by the moving picture coding method and the moving picture coding apparatus described in each of embodiments, in the case where the CPU ex502 has extra processing capacity, the driving of the CPU ex502 is probably suspended at a given time. In such a case, the suspending time is probably set shorter than that in the case where when the identification information indicates that the video data conforms to the conventional standard, such as MPEG-2, MPEG-4 AVC, and VC-1.

Accordingly, the power conservation effect can be improved by switching between the driving frequencies in accordance with the standard to which the video data conforms. Furthermore, when the LSI ex500 or the apparatus including the LSI ex500 is driven using a battery, the battery life can be extended with the power conservation effect.

Embodiment 12

There are cases where a plurality of video data that conforms to different standards, is provided to the devices and systems, such as a television and a cellular phone. In order to enable decoding the plurality of video data that conforms to the different standards, the signal processing unit ex507 of the LSI ex500 needs to conform to the different standards. However, the problems of increase in the scale of the circuit of the LSI ex500 and increase in the cost arise with the individual use of the signal processing units ex507 that conform to the respective standards.

Figure 42A:
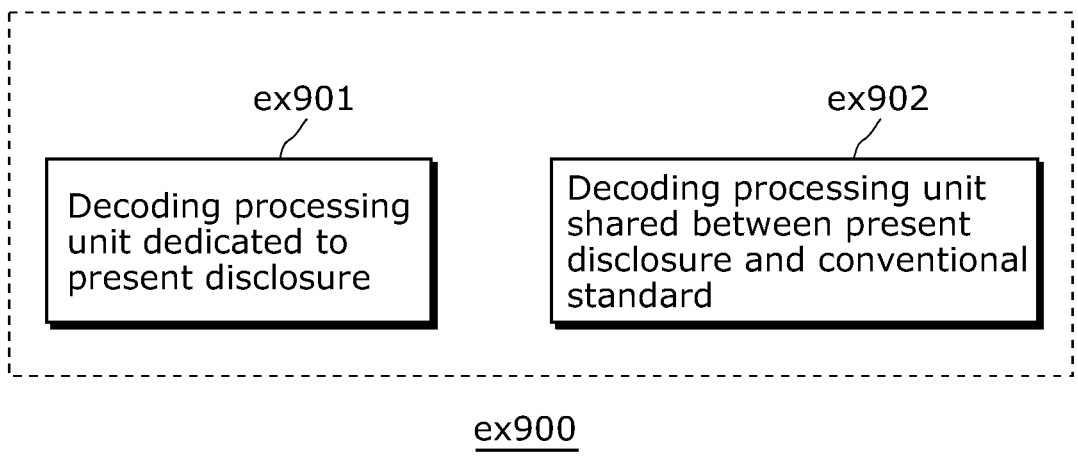
FIG. 42A is a diagram showing an example of a configuration for sharing a module of a signal processing unit.

In order to solve the problem, what is conceived is a configuration in which the decoding processing unit for implementing the moving picture decoding method described in each of embodiments and the decoding processing unit that conforms to the conventional standard, such as MPEG-2, MPEG-4 AVC, and VC-1 are partly shared. Ex900 in FIG. 42A shows an example of the configuration. For example, the moving picture decoding method described in each of embodiments and the moving picture decoding method that conforms to MPEG-4 AVC have, partly in common, the details of processing, such as entropy coding, inverse quantization, deblocking filtering, and motion compensated prediction. The details of processing to be shared probably include use of a decoding processing unit ex902 that conforms to MPEG-4 AVC. In contrast, a dedicated decoding processing unit ex901 is probably used for other processing unique to an aspect of the present disclosure. Since the aspect of the present disclosure is characterized by inverse quantization in particular, for example, the dedicated decoding processing unit ex901 is used for inverse quantization. Otherwise, the decoding processing unit is probably shared for one of the entropy decoding, deblocking filtering, and motion compensation, or all of the processing. The decoding processing unit for implementing the moving picture decoding method described in each of embodiments may be shared for the processing to be shared, and a dedicated decoding processing unit may be used for processing unique to that of MPEG-4 AVC.

Figure 42B:
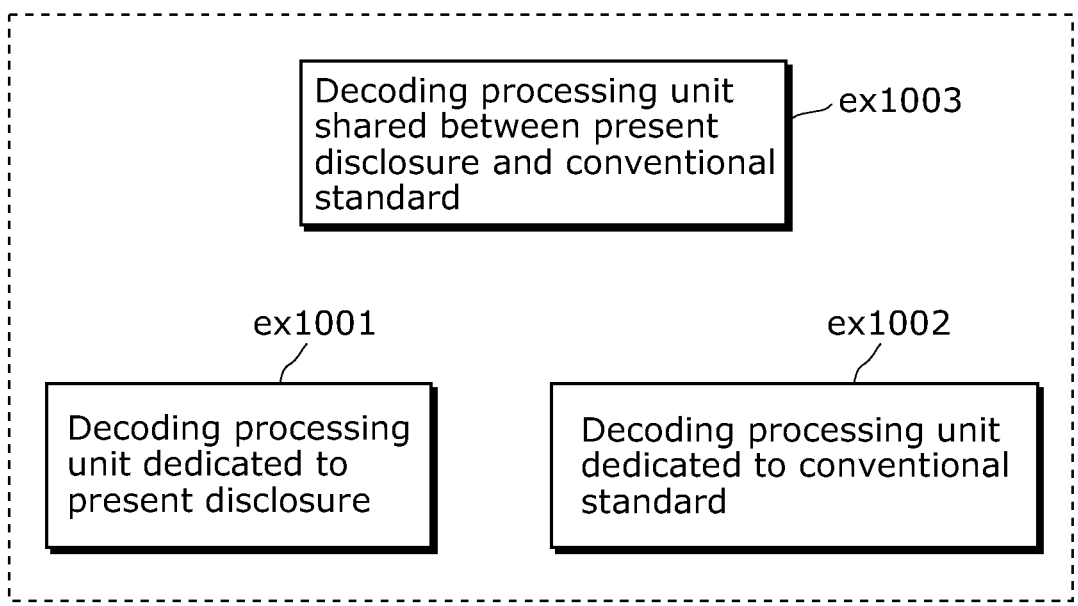
FIG. 42B is a diagram showing another example of a configuration for sharing a module of the signal processing unit.

Furthermore, ex1000 in FIG. 42B shows another example in that processing is partly shared. This example uses a configuration including a dedicated decoding processing unit ex1001 that supports the processing unique to an aspect of the present disclosure, a dedicated decoding processing unit ex1002 that supports the processing unique to another conventional standard, and a decoding processing unit ex1003 that supports processing to be shared between the moving picture decoding method according to the aspect of the present disclosure and the conventional moving picture decoding method. Here, the dedicated decoding processing units ex1001 and ex1002 are not necessarily specialized for the processing according to the aspect of the present disclosure and the processing of the conventional standard, respectively, and may be the ones capable of implementing general processing. Furthermore, the configuration of the present embodiment can be implemented by the LSI ex500.

As such, reducing the scale of the circuit of an LSI and reducing the cost are possible by sharing the decoding processing unit for the processing to be shared between the moving picture decoding method according to the aspect of the present disclosure and the moving picture decoding method in conformity with the conventional standard.

The herein disclosed subject matter is to be considered descriptive and illustrative only, and the appended Claims are of a scope intended to cover and encompass not only the particular embodiment(s) disclosed, but also equivalent structures, methods, and/or uses.

INDUSTRIAL APPLICABILITY

The picture coding method and picture decoding method according to one or more exemplary embodiments disclosed herein are advantageously applicable to a method of coding moving pictures and a method of decoding moving pictures.

The invention claimed is:

1. A picture decoding method for decoding, on a block-by-block basis, a coded image included in a bitstream, the method comprising:
   performing a third derivation process for deriving third merging candidates, each of the third merging candidates including a candidate set of a third prediction direction number, a third motion vector, and a third reference picture index for use in decoding of a current block, the third motion vector and the third reference picture index being used for decoding another block, the other block being decoded before the current block is decoded, and the other block being different from the current block;

performing a first derivation process for deriving a first merging candidate which includes a candidate set of a first prediction direction number which indicates bi-predication, a first motion vector, a first reference picture index, a fourth motion vector, and a fourth reference picture index for use in the decoding of the current block, the first motion vector and the first reference picture index being included in one of the third merging candidates, the fourth motion vector and the fourth reference picture index being included in another one of the third merging candidates;

performing a second derivation process for deriving a second merging candidate which includes a candidate set of a second prediction direction number, a second motion vector, and a second reference picture index for use in the decoding of the current block, the second motion vector being a zero motion vector;

obtaining an index from the bitstream; and selecting, based on the obtained index, a merging candidate to be used in the decoding of the current block from among the first merging candidate, the second merging candidate, and the third merging candidates, wherein in the performing of a first derivation process, the first derivation process is performed so that a total number of the first merging candidates does not exceed a first predetermined number, the second derivation process is performed when a total number of the first to third merging candidates is less than a second predetermined number, the second predetermined number being a maximum number of the merging candidates, and the second predetermined number is different from the first predetermined number when the second derivation process is performed.

2. The picture decoding method according to claim 1, wherein the first predetermined number depends on a maximum number of the first merging candidates to be derived using the first derivation process.

3. The picture decoding method according to claim 1, further comprising switching a decoding process between a first decoding process conforming to a first standard and a second decoding process conforming to a second standard, according to identification information attached to the bitstream and indicating either the first standard or the second standard, wherein when the decoding process after the switching is the first decoding process, the first decoding process is performed by performing the first derivation process, the second derivation process, the obtaining, and the selecting.

4. A picture decoding apparatus which decodes, on a block-by-block basis, a coded image included in a bitstream, the apparatus comprising:

a processor; and a non-transitory memory having stored thereon executable instructions, which when executed by the processor, cause the processor to perform:

performing a third derivation process for deriving third merging candidates, each of the third merging candidates including a candidate set of a third prediction direction number, a third motion vector, and a third reference picture index for use in decoding of a current block, the third motion vector and the third reference picture index being used for decoding another block, the other block being decoded before the current block is decoded, and the other block being different from the current block;

performing a first derivation process for deriving a first merging candidate which includes a candidate set of a first prediction direction number which indicates a bi-prediction, a first motion vector, a first reference picture index, a fourth motion vector, and a fourth reference picture index for use in the decoding of the current block, the first motion vector and the first reference picture index being included in one of the third merging candidates, the fourth motion vector and the fourth reference picture index being included in another one of the third merging candidates;

performing a second derivation process for deriving a second merging candidate which includes a candidate set of a second prediction direction number, a second motion vector, and a second reference picture index for use in the decoding of the current block, the second motion vector being a zero motion vector;

obtaining an index from the bitstream; and selecting, based on the obtained index, a merging candidate to be used in the decoding of the current block from among the first merging candidate, the second merging candidate, and the third merging candidates, wherein the first derivation process is performed so that a total number of the first merging candidates does not exceed a first predetermined number, the second derivation process is performed when a total number of the first to third merging candidates is less than a second predetermined number, the second predetermined number being a maximum number of the merging candidates, and the second predetermined number is different from the first predetermined number when the second derivation process is performed.

5. The picture decoding method according to claim 1, wherein the other block is adjacent to the current block in the picture.

6. The picture decoding method according to claim 1, wherein the first predetermined number is less than the second predetermined number.

* * * * *